United States Patent [19]
Jones et al.

[11] Patent Number: 4,998,206
[45] Date of Patent: Mar. 5, 1991

[54] AUTOMATED METHOD AND APPARATUS FOR FABRICATING SHEET METAL PARTS AND THE LIKE USING MULTIPLE MANUFACTURING STATIONS

[75] Inventors: Everett E. Jones, Wichita, Kans.; Albert G. Gaspar, Hebron, Conn.

[73] Assignee: The Boeing Company, Seattle, Wash.

[21] Appl. No.: 226,552

[22] Filed: Jul. 29, 1988

[51] Int. Cl.⁵ ............................................. G06F 15/46
[52] U.S. Cl. ................................... 364/468; 364/472; 364/474.11; 364/474.24; 364/132; 364/513
[58] Field of Search ............................... 364/191–193, 364/468, 469, 472, 474.24, 476, 478, 513, 474.11, 200 MS File, 900 MS File, 132; 29/568, 564, 564.1; 901/6–8

[56] References Cited

U.S. PATENT DOCUMENTS

| | | | |
|---|---|---|---|
| 3,654,616 | 4/1972 | Dunne et al. | 901/8 X |
| 3,890,552 | 6/1975 | Devol et al. | 901/8 X |
| 4,260,940 | 4/1981 | Engelberger et al. | 318/568 X |
| 4,309,600 | 1/1982 | Perry et al. | 364/468 X |
| 4,369,563 | 1/1983 | Williamson | 29/563 X |
| 4,427,431 | 1/1984 | Mumford | 364/476 X |
| 4,472,783 | 9/1984 | Johnstone et al. | 364/468 X |
| 4,495,588 | 1/1985 | Nio | 364/513 |
| 4,517,653 | 5/1985 | Tsuchihashi et al. | 364/193 X |
| 4,571,694 | 2/1986 | Inaba et al. | 364/192 X |
| 4,602,345 | 7/1986 | Yokoyama | 364/191 X |
| 4,613,943 | 9/1986 | Miyake et al. | 364/191 X |
| 4,698,766 | 10/1987 | Entwistle et al. | 364/468 |
| 4,700,308 | 10/1987 | Jones | 364/468 |

Primary Examiner—Joseph Ruggiero
Attorney, Agent, or Firm—Finnegan, Henderson, Farabow, Garrett & Dunner

[57] ABSTRACT

A method and apparatus for fabricating sheet metal parts using workpiece manipulators to transfer a workpiece from one work station to another and position the workpiece for each operation to be performed. The invention eliminates the need of individual operators and can be managed under microprocessor control using known positions along selected X and Y axes about which programming is performed.

A unified design and manufacturing system includes a computer-aided design (CAD) system and a microprocessor-controlled fabrication system consisting of a plurality of manufacturing stations which perform manufacturing and transporting operations upon a workpiece. Design information for a part is entered through the CAD system and includes a reference point. The design information is combined with manufacturing process planning information to produce a part definition data file which is used by the microprocessor-controlled fabrication system to perform machine operations upon a workpiece to produce the part according to the design information. In the microprocessor-controlled fabrication system, the reference point, as entered in the CAD system, is associated with a specific point upon the workpiece. During all times, the manufacturing stations maintain a known orientation between the specified location on the workpiece and axes of the microprocessor-controlled fabrication system.

13 Claims, 29 Drawing Sheets

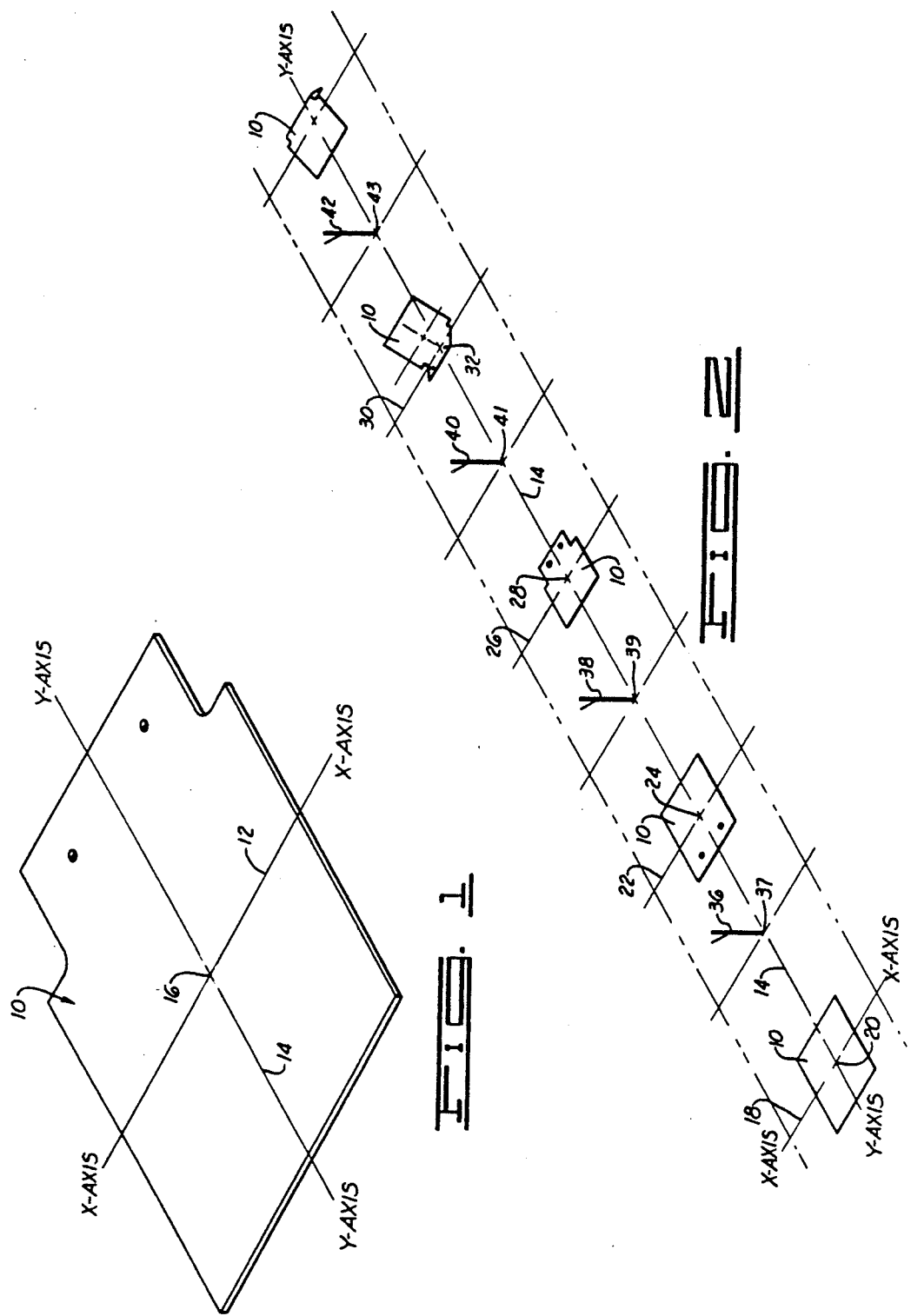

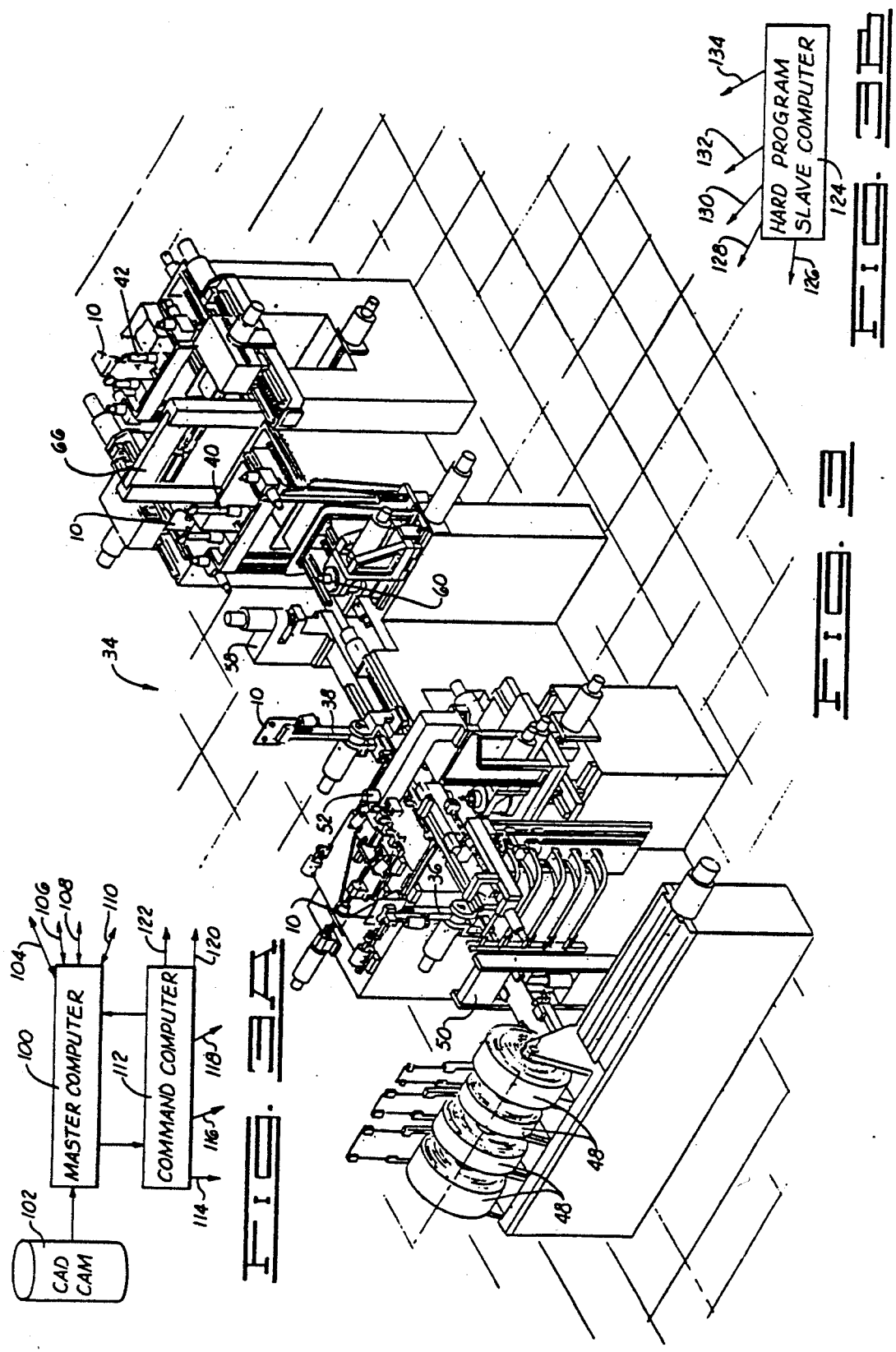

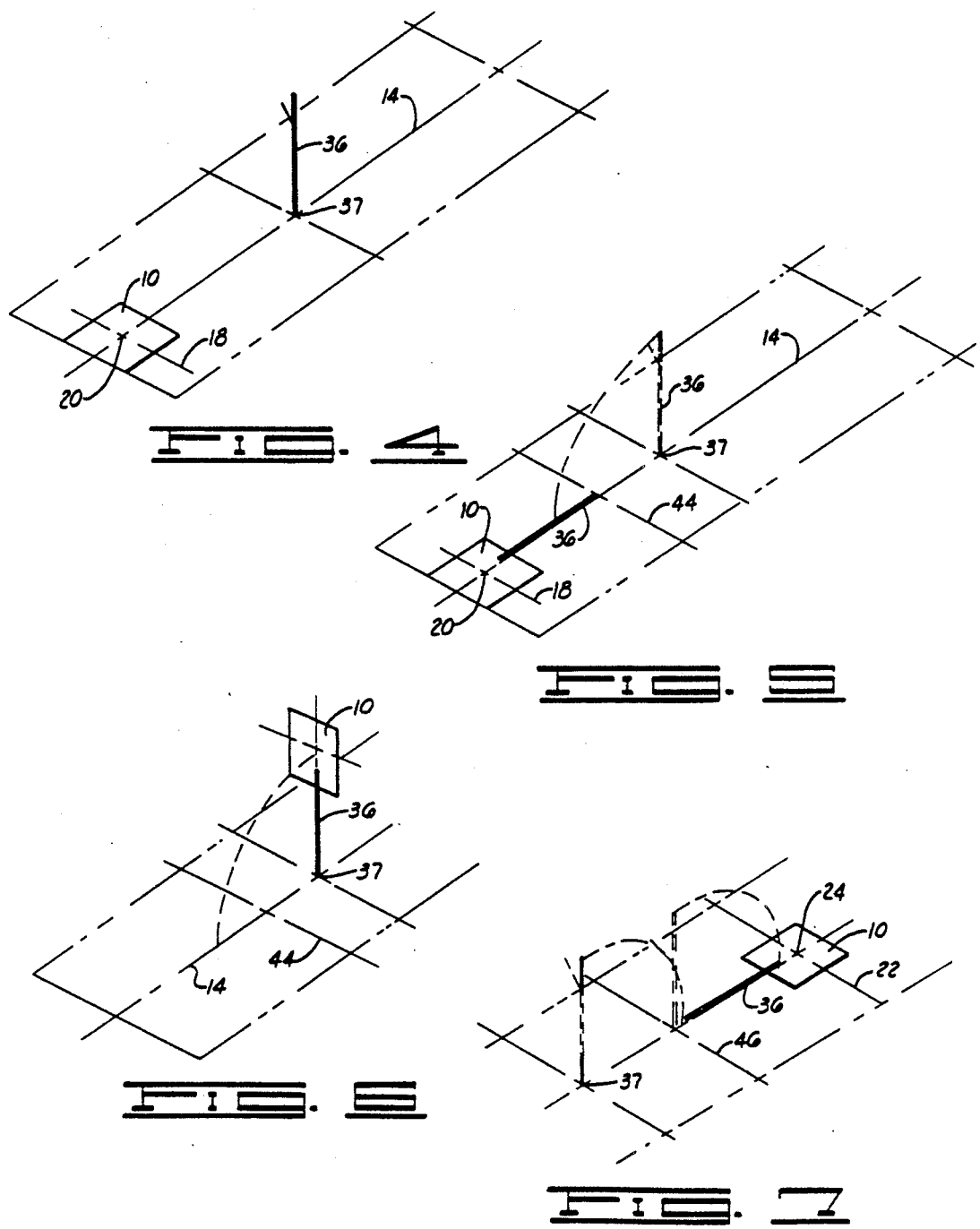

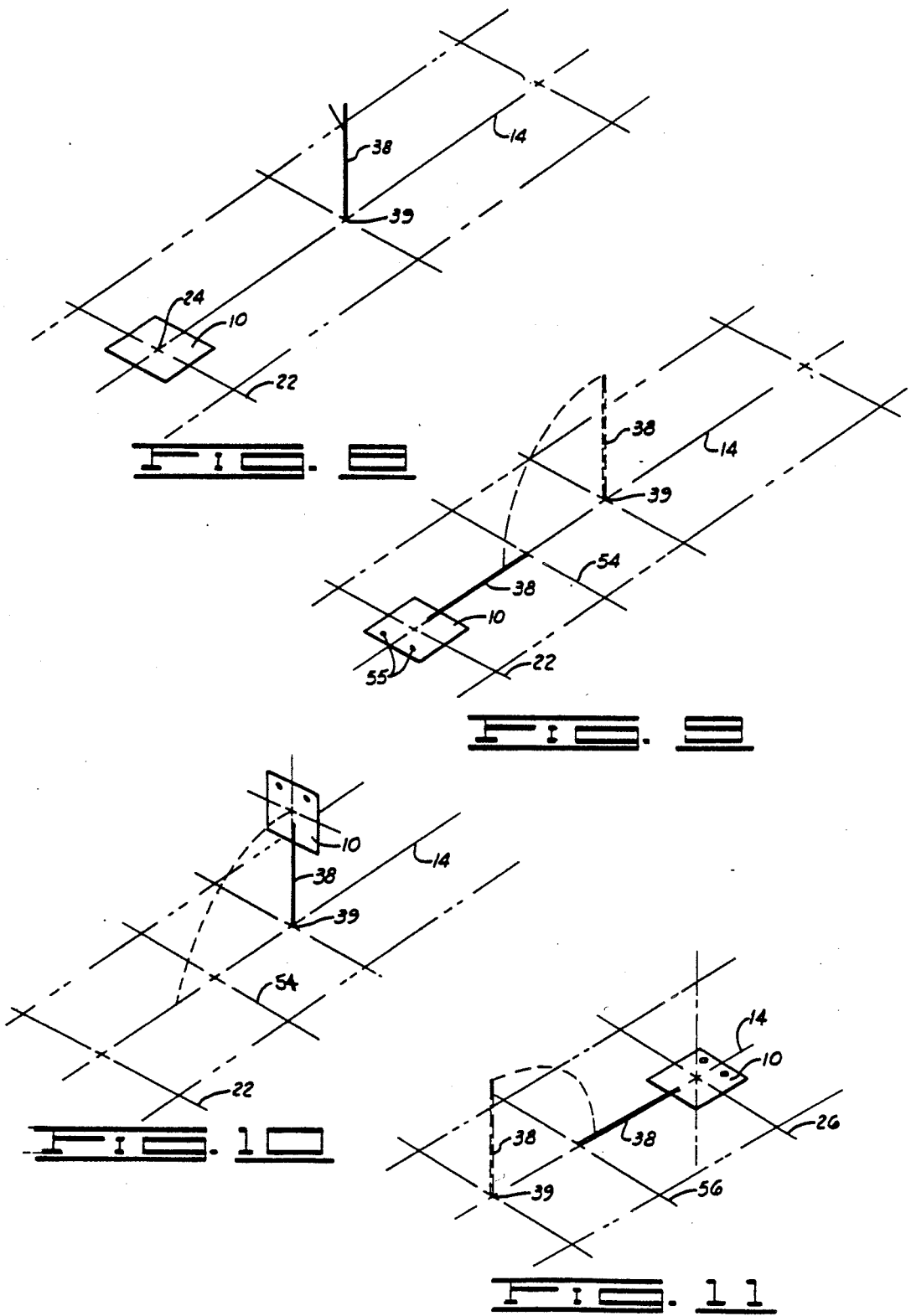

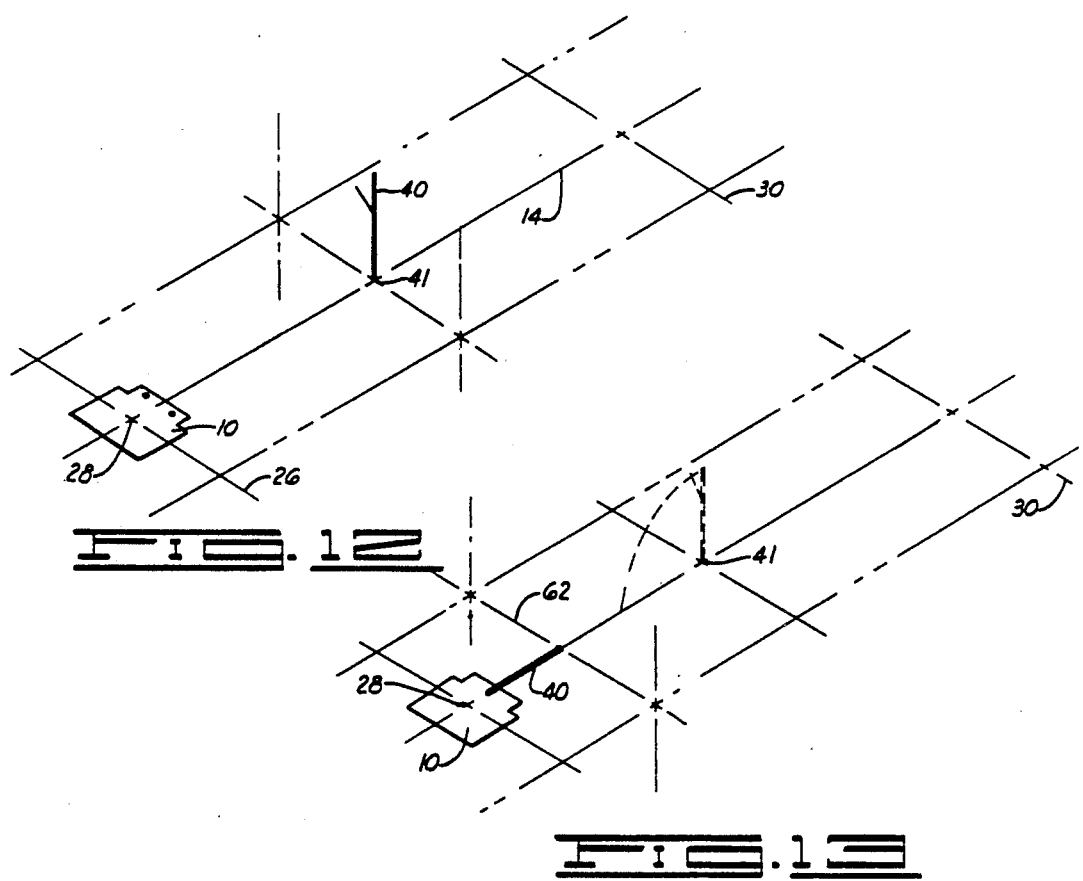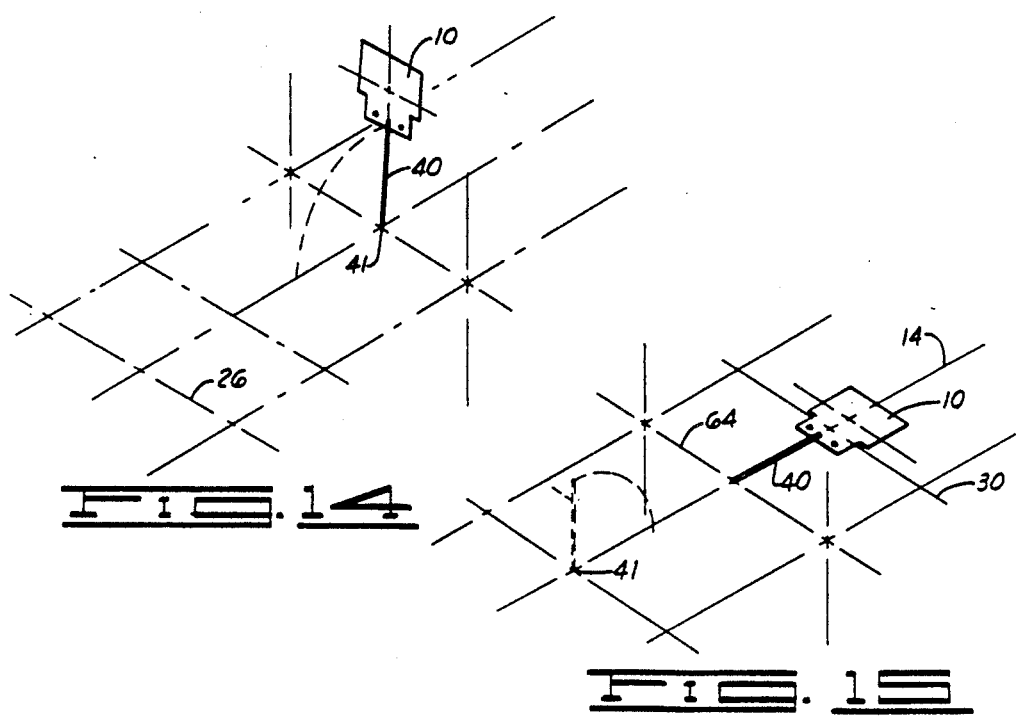

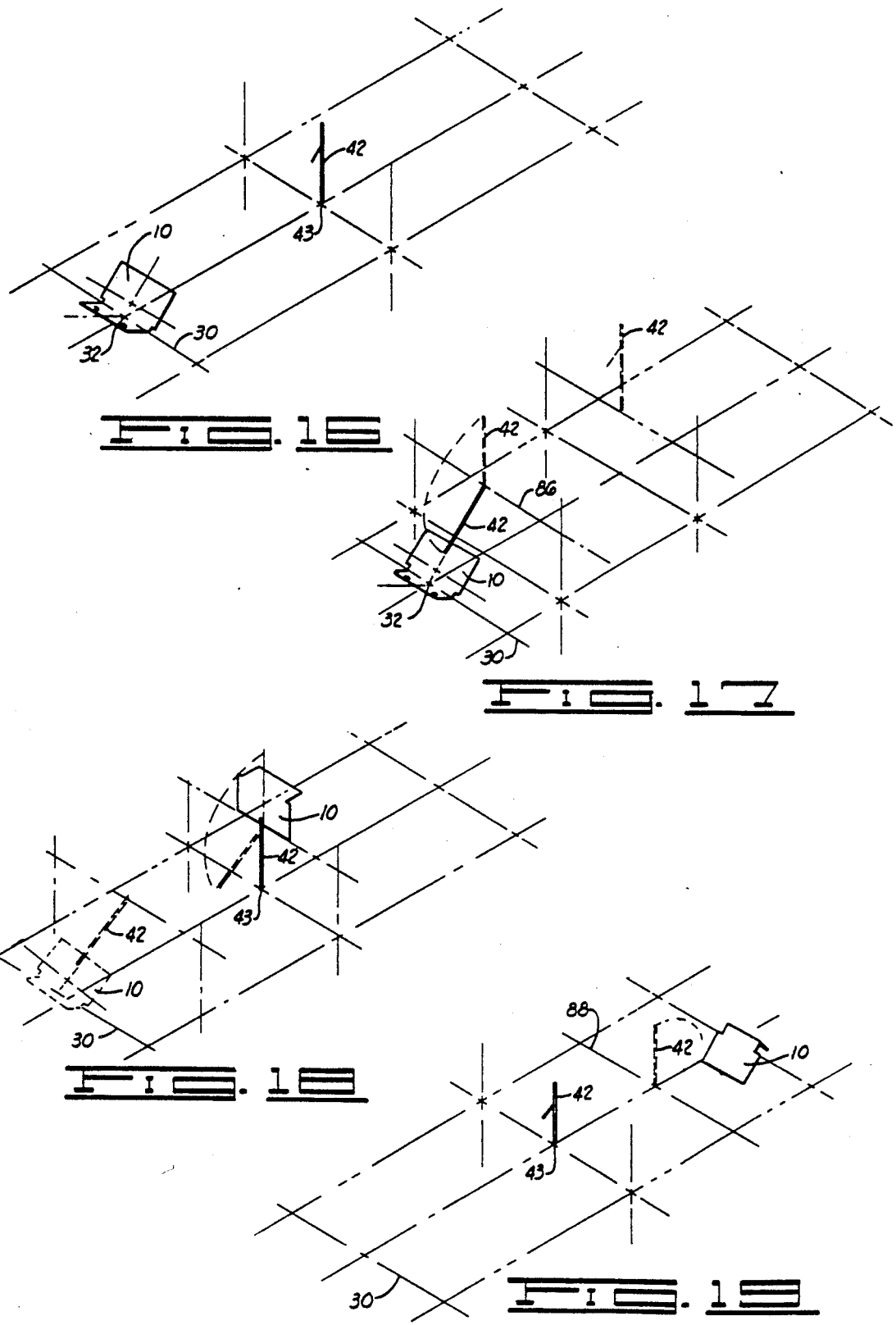

FIG. 37

```
'DRILL'
'CENTER - X =', 3.2000
'CENTER - Y =', 1.4750
'RADIUS   =', 0.0781
' '

'DRILL'
'CENTER - X =', 2.7750
'CENTER - Y =', 1.4750
'RADIUS   =', 0.0781
' '

'DRILL'
'CENTER - X =', 2.3500
'CENTER - Y =', 1.4750
'RADIUS   =', 0.0781
' '

'DRILL'
'CENTER - X =', 1.9250
'CENTER - Y =', 1.4750
'RADIUS   =', 0.0781
' '

'DRILL'
'CENTER - X =', 1.5000
'CENTER - Y =', 1.4750
'RADIUS   =', 0.0781
' '

'DRILL'
'CENTER - X =', 1.0750
'CENTER - Y =', 1.4750
'RADIUS   =', 0.0781
```

AUTOMATED METHOD AND APPARATUS FOR FABRICATING SHEET METAL PARTS AND THE LIKE USING MULTIPLE MANUFACTURING STATIONS

This application is a continuation-in-part of application Ser. No. 107,477, filed Oct. 13, 1987, now abandoned, which is a continuation of application Ser. No. 942,261, filed Dec. 16, 1986, now U.S. Pat. No. 4,700,308, which is in turn a continuation of application Ser. No. 726,701, filed Apr. 24, 1985, now abandoned.

BACKGROUND OF THE INVENTION

This invention relates to the automation of fabricating sheet metal parts and more particularly fabricating sheet metal parts using workpiece manipulators such as robots under microprocessor control.

Heretofore, there have been various types of manufacturing control systems, tool installations using numerical control machines and other types of individual work stations having control under computer programs. These types of systems are described in the following U.S. Patents: U.S. Pat. No. 3,845,286 to Aronstein et al, U.S. Pat. No. 4,369,563 to Williamson, U.S. Pat. No. 4,272,812 to Svensson, U.S. Pat. No. 4,342,088 to Sato, U.S. Pat. No. 4,427,431 to Mumford, et al, U.S. Pat. No. 4,237,598 to Williamson. None of the mentioned prior art patents describe an overall method of fabricating a sheet metal part or the like using workpiece manipulators to transfer the workpiece from one work station to another under complete microprocessor control using known points along a selected X axis and a common Y axis.

SUMMARY OF THE INVENTION

The subject invention provides for an automated fabrication system for fabricating metal sheet parts or the like using manipulators under robotic control and managed by microprocessors using known points along selected X and Y axes.

The subject method of fabricating sheet metal parts being completely automated eliminates the need of individual operators for each work station.

The manipulators used in moving the workpiece from one station to another may be robotic controlled, servo-driven controlled and the like.

The method of fabricating a sheet metal part using workpiece manipulators to transfer a workpiece from one work station to another includes positioning the workpiece along selected X and Y axes wherein the intersection of the axes is a point known as a zero position about which programming is performed by the microprocessor. The workpiece is first fed into a shear for a programmed length; a manipulator grasps the part when the workpiece is sheared. The manipulator then rotates the sheared workpiece along the Y axis and moves the workpiece a programmed distance from the zero position of the first work station to the zero position of a second work station. The workpiece is then drilled. When the drilling operation is completed a third manipulator receives the drilled workpiece at the zero axis and moves the workpiece to the zero position of a third work station where the workpiece is profiled. When the profiling operation is completed a fourth manipulator moves the workpiece to the zero position of a fourth work station where a bending operation completes the work on the workpiece. While the four work stations are mentioned above, it can be appreciated that any number of different types of work stations can be used for a particular workpiece with microprocessor control moving the workpiece along a known distance in a X and Y plane.

In another aspect, the invention provides a method for fabricating parts on a unified design and manufacturing system including a computer-aided design terminal having an input, and a plurality of manufacturing stations located with respect to a plurality of axes and programmed with a set of manufacturing commands to execute manufacturing and transport operations in accordance with part definition data records. The method comprises the steps of establishing a reference point at the input of the computer-aided design terminal; entering into the system the configuration of a part desired to be fabricated, the configuration being expressed with respect to the reference point and being entered at the input of the computer-aided design terminal; entering into the system manufacturing process planning data; generating from the configuration and the manufacturing process planning data a set of part definition data records corresponding to a part desired to be fabricated, each of the part definition data records being expressed in relation to the reference point and corresponding to one of the manufacturing stations; and supplying to a first one of the manufacturing stations material to be machined into a part, in response to a command to fabricate the part. The method comprises the further steps of associating the reference point with a specified location on the material; transmitting to the first one of the manufacturing stations a first part definition data record from the set of part definition data records corresponding to a part desired to be fabricated, the first part definition data record corresponding to the first manufacturing station; executing a set of manufacturing instructions at the first manufacturing station in accordance with the manufacturing commands programmed into the first manufacturing station and the first part definition data record to transport the material to the first manufacturing station and to machine the material while maintaining a known orientation between the specified location on the material and the axes; transmitting to a subsequent manufacturing station a subsequent part definition data record from the set of part definition data records corresponding to the part desired to be fabricated, the subsequent part definition data record corresponding to the subsequent manufacturing station; executing a set of manufacturing instructions at the subsequent manufacturing station in accordance with the manufacturing commands programmed into the subsequent manufacturing station and the subsequent part definition record to transport material to the subsequent manufacturing station and to machine the material while maintaining a known orientation between the specified location on the material and the axes; and repeatedly performing the preceding two steps while maintaining a known orientation between the specified location on the material and the axes until manufacturing and transport operations corresponding to all part definition data records in the set have been executed.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates the workpiece positioned along an X and Y axes.

FIG. 2 illustrates the workpiece along X and Y axes and at five different positions where shear, drill, profile and bend operations are performed.

FIG. 3 illustrates the overall fabrication system under microprocessor control.

FIGS. 3A and 3B schematically depict computer control systems for operating the fabrication system of FIG. 3.

FIG. 4 illustrates a workpiece manipulator with manipulator arm in a vertical position.

FIG. 5 illustrates the manipulator moved forward for gripping the workpiece before it is sheared.

FIGS. 6 and 7 illustrate the manipulator arm raising the sheared workpiece and rotating it into a position for performing a drilling operation.

FIGS. 8 and 9 illustrate a second manipulator with arm for gripping the drilled workpiece.

FIGS. 10 and 11 illustrate the second manipulator rotating the drilled workpiece into a vertical position and lowering it for the profile operation.

FIGS. 12 and 13 illustrate a third manipulator with arm for gripping the profiled piece.

FIGS. 14 and 15 illustrate a third manipulator raising the profiled workpiece into a vertical position and lowering it for the bending operation.

FIGS. 16, 17, 18 and 19 illustrate a fourth manipulator for removing the completed workpiece from the fabrication station.

FIG. 37 is an example of data produced by a CAD computer included in the computer system of FIG. 25.

DETAILED DESCRIPTION OF THE DRAWINGS

Figures 20, 21:
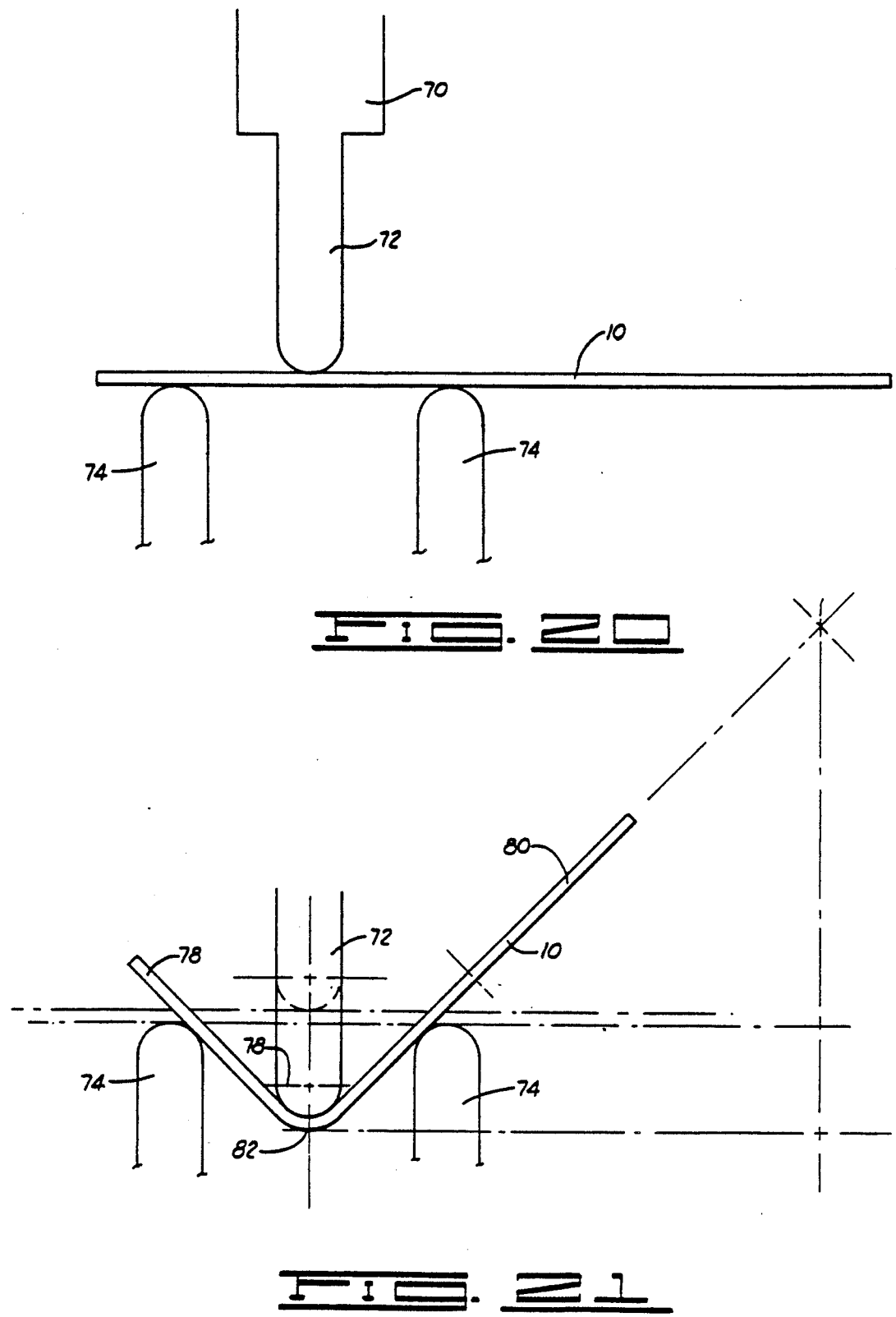
FIGS. 20 and 21 illustrate detailed views of the bending operation of the workpiece.

In FIG. 1 a workpiece is designated by general reference numeral 10 having a selected X axis 12 and a Y axis 14. The Y axis 14 acts as a centerline of the workpiece 10. At the intersection of the X axis 12 and the Y axis 14 is a zero position 16 about which all of the programming is performed.

Referring now to FIG. 2 the centerline or Y axis 14 is shown intersecting a plurality of X axes. A first work station has a X axis 18 with a zero position 20, a second work station with X axis 22 and a zero position 24, a third work station with X axis 26 having a zero position 28 and a fourth work station with X axis 30 and a zero position 32.

The overall fabrication station is shown in FIG. 3 and given general reference numeral 34. The station 34 includes a plurality of workpiece manipulators which are not shown in the drawings but can be a plurality of individual robots having workpiece manipulators with manipulator arms 36, 38, 40 and 42. Each of these manipulators have a home position 37, 39, 41 and 43. In FIG. 2 the manipulator arms are shown in a vertical position and at a known distance to the adjacent work stations. Further, the manipulators are positioned along the centerline or Y axis 14.

Referring now to FIGS. 4 and 5, each time the workpiece 10 is picked up for transfer to the next station, the manipulator arm, in this example 36, is programmed to move from its home position 37 to X axis 44 a selected distance from the zero position 20 of the first work station and then with the workpiece engaged a shearing operation is performed at the first work station. When the operation is completed the manipulator returns to its home position 37 and the arm 36 raises the workpiece 10 into a vertical position as shown in FIG. 6.

In FIG. 7 the arm 36 is programmed to lower the workpiece 10 and move a selected distance to the intersection of X axis 46 and the Y axis 14. Through computer programmed control and knowing the distance between the home position of the manipulator arm 36 and the zero position 24 of the second work station the arm 36 indexes the zero position 16 of the workpiece 10 with the zero position 24. The workpiece is then clamped in place and released by the arm 36 which returns to its original home position 37 upstream along the Y axis 14.

Referring now to the machining operation of the fabrication station 34 shown in FIG. 3, a program length of workpiece stock 48 is fed into a shear 50. The programmed zero position 20 of the shear 50 or first work station is known. Manipulator arm 36 rotates to a horizontal position as shown in FIG. 5 and with gripper jaws grips the workpiece 10. The shear 50 is then programmed to shear the workpiece stock 48 thus starting the fabrication of the workpiece 10. The manipulator arm 36 then moves downstream to its home position 37 and rotates upwardly to a vertical position as shown in FIG. 6.

The manipulator arm 36 now lowers the workpiece 10 and moves toward X axis 22 a programmed distance to position 46. The manipulator arm 36 places the workpiece 10 indexed on zero position 24 of the second work station or in this example, a drilling operation 52. Workpiece clamps are now programmed to close on the workpiece 10. The grippers of the arm 36 in FIG. 7 are now programmed to open. The manipulator arm 36 is now programmed to reverse to its home position 37 when the arm 36 is again programmed to return to its raised vertical position as shown in FIG. 4.

The second manipulator arm 38 at its home position 39 along the Y axis 14 is shown in FIG. 3 and FIG. 8. The drilling operation is programmed from the zero position 24 at the second work station and the zero position 16 of the workpiece 10. Further, the X axis 12 of the workpiece 10 coincides with the X axis 22 of the drill station shown in FIG. 8. In FIG. 9 the manipulator arm 38 has been lowered to a horizontal position and moved upstream along the Y axis 14 to a known position 54. The manipulator arm 38 grips the workpiece 10 in place and a plurality of holes 55 are drilled in the workpiece 10. The manipulator arm 38 with workpiece 10 then returns to its home position 39 where the workpiece 10 is raised to a vertical position as shown in FIG. 10. In FIG. 11, the manipulator 38 has moved forward to a known position 56 for delivering the workpiece 10 to a third work station or profile operation 58. The manipulator arm 38 releases the drilled workpiece 10 at the profile operation 58 and the workpiece is clamped in place. The manipulator arm 38 then returns to its home position 39 upstream along the Y axis 14. The clamping mechanism on the profile operation 58 is programmed to close and hold the workpiece 10 in place. In this operation, a router cutter 60, shown in FIG. 3, is fed into the workpiece 10 a programmed distance and then simultaneously the rotation of the profile operation 58 and the router cutter 60 are programmed to move in and out and rotate to produce a 360° profile of the workpiece 10 shown in FIG. 12.

A third manipulator arm 40 shown in FIG. 12 at a home position 41 along Y axis 14 is moved downstream a known distance to a position 62 shown in FIG. 3 wherein the manipulator arm 40 grips the profiled workpiece 10 with the clamping mechanism of the profile operation 58 opening and releasing the workpiece 10. The manipulator arm 40 with workpiece 10 then returns to its home position 41 where it is raised into a vertical position as shown in FIG. 14. In FIG. 15 the profiled workpiece 10 is now lowered to a horizontal position and moved downstream by the manipulator arm 40 to a known distance at position 64. The profiled workpiece 10 is now released at a fourth work station or a brake operation 66. The third manipulator 40 having released, the workpiece 10 is returned upstream to its home position 41. The zero position 16 of the workpiece 10 is located in a predetermined special relation to zero position 32 of the brake operation.

In a brake operation, brake ram 70 with a punch 72, shown in FIG. 20 is lowered on top of the workpiece 10 received between a pair of dies 74 a programmed distance and retracted to a neutral position 78, as shown in FIG. 21, to produce a known angle in the workpiece 10 a known distance from zero position 16 of workpiece 10.

When the brake operation has been completed a fourth manipulator arm 42 at its home position 43 moves upstream to a known position 86 shown in FIG. 17. The manipulator arm 42 grips the completed workpiece 10 and then returns to its home position 43 where the workpiece 10 is raised into a vertical position. The manipulator arm 42 then moves a known distance downstream to a position 88 where the workpiece is lowered to a horizontal position and the finished workpiece is released. The manipulator arm 42 then returns to its home position 43.

Referring back to FIG. 3A, the fabrication station 34 is operated by a master computer 100 programmed for receiving a day's operation from CAD and CAM data source 102. The computer 100 is supported by an integrated information support system indicated by arrow 104, a cost data system 106, an inventory collection system 108 and a manufacturing control material system 110. The computer 100 also communicates with a command computer 112 which, for example, provides stock width and material specifications to the material station indicated by arrow 114. The computer 112 is further connected to the shear operation 50 providing blank length and robot carriage travel via arrow 116. As to the drilling operation 52, data is provided via arrow 118, such as hole diameter and location, robot carriage length of travel and drill size. Via arrow 120, the profiled station 58 receives the information such as position of robot grippers on the workpiece, profile relation to X and Y axes of the workpiece and profile around intersection of the X and Y axes of the workpiece. Arrow 122 indicates data to the bend operation 66 for providing position of centerline of bend relative to the X and Y axes of the workpiece, position of robot grippers on the workpiece and degree of angle and bend radius.

In FIG. 3B, a hard programmed slave computer is indicated by reference numeral 124 which is connected to the individual work stations for providing to the material operations via arrow 126 data such as cartridge load, material verification and diagnostic electronics. Data to the shear operation indicated by arrow 128 provides material feed information, material thickness, part number, shear information, robot arm rotation and similar data. Arrow 130 indicates information from the hard programmed slave computer 124 to the drill operation with data such as position of blank holder, drill adapter storage transfer and removal information, drill cycle, robot arm rotation and other related information.

Arrow 132 provides data to the profile operation 58 such as profile set-up, robot arm rotation, robot gripper action and diagnostics of electronics. The last arrow 134 provides data from the slave computer 124 to the bend operation such as punch exchange, set-up of dies, position of brake, sequence of robot and brake mechanism, robot gripper action and additional electronic information.

While the fabrication of workpiece 10 is shown having operations such as shearing, drilling, profile and bending before the workpiece is completed, it can be appreciated that this method using computer control of work stations along a plurality of X axes and a common Y axis can be used equally well for a variety of machining applications without departing from the scope and spirit of the invention.

Figure 22:
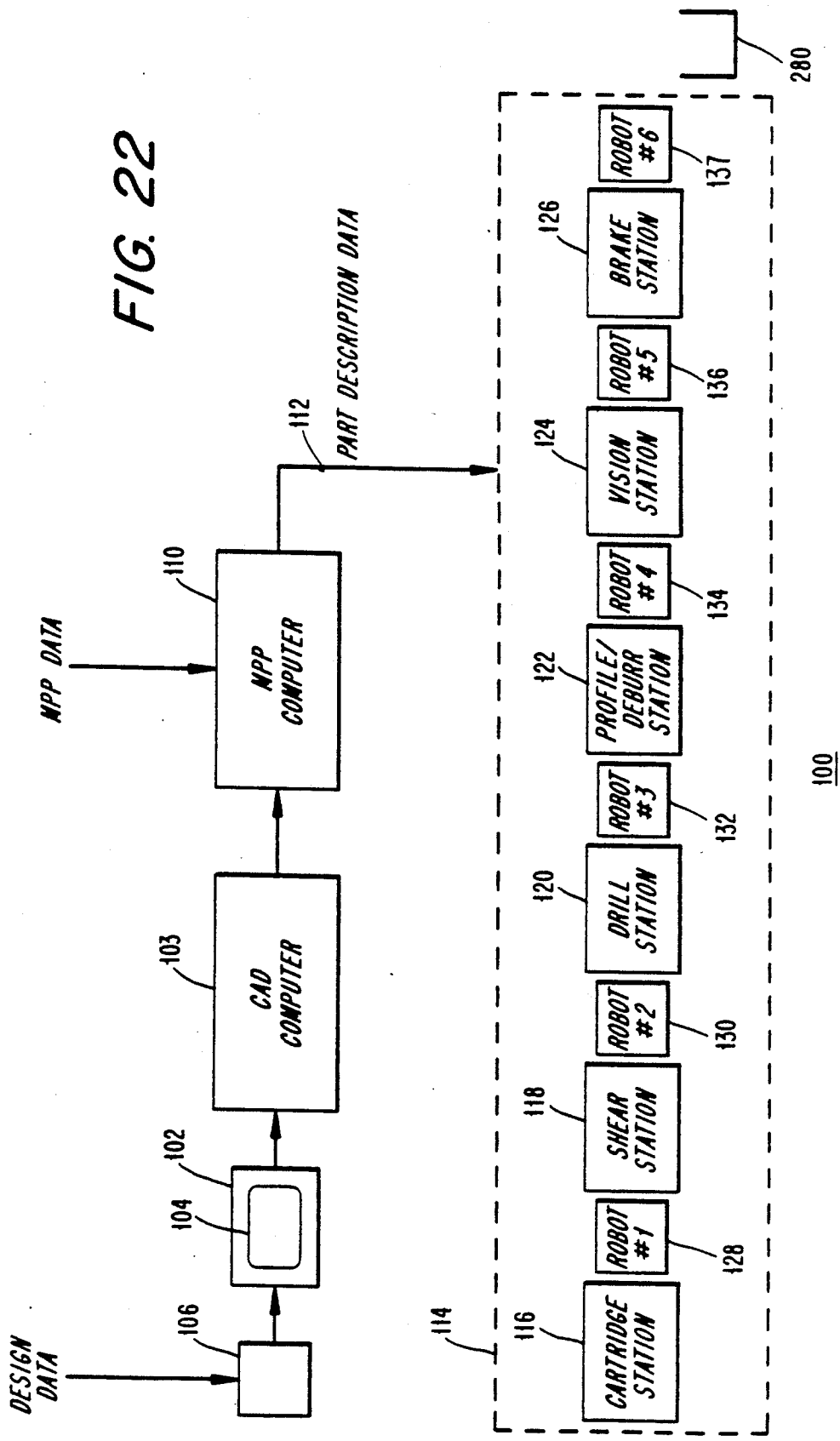
FIG. 22 is a block diagram of a unified design and manufacturing system which constitutes a second embodiment of the invention.

An alternative embodiment of the invention, shown in FIG. 22, provides a unified design and manufacturing system 100 which reduces manufacturing time and expense by eliminating NC programming, tool set up, multiple dispatch activities, shortage or overrun of parts, multiple inspector activities, and part rework. In system 100, design data, including a reference point based on a coordinate system, is entered into a design terminal. The design data is then supplied to a manufacturing process program computer and combined with manufacturing process planning data, also entered into the manufacturing process program computer, to form part definition data records containing all information necessary to manufacture a part. The system associates the reference point entered as design data with a specified location, or zero position, on a workpiece and maintains a known orientation between the specified location and the axes of a coordinate system on a microprocessor controlled fabrication system comprising a plurality of manufacturing stations.

System 100 includes a computer-aided design (CAD) computer 103 having a CAD terminal 102 for receiving operator-entered design information to design a part to be fabricated. CAD computer 103 is well known in the art and is commercially available from a number of vendors. In the preferred embodiment, CAD computer 103 comprises a model DN 3000 terminal available from the Apollo Corporation running the UNISYS computer-aided design software system.

Figure 23:
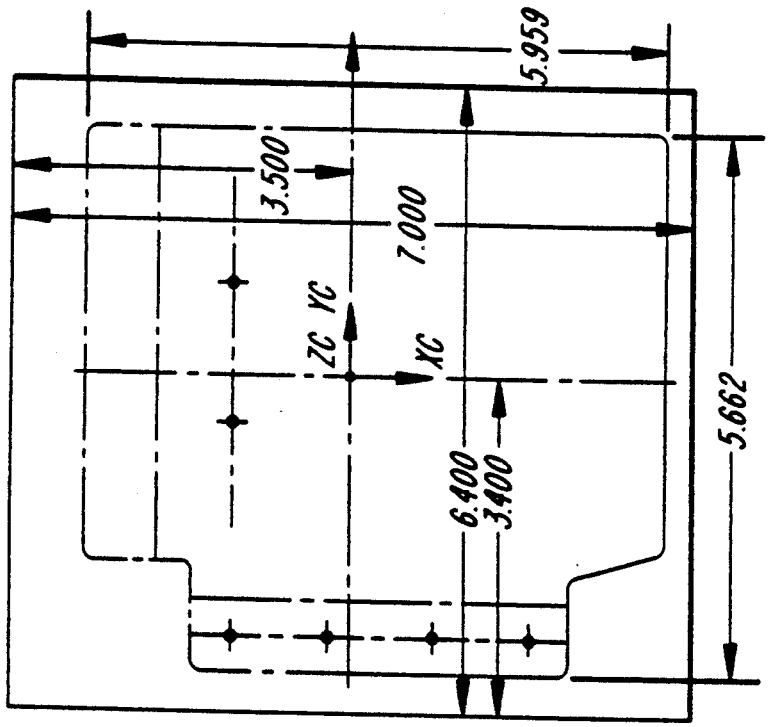
FIG. 23 illustrates an example of a part designed and manufactured by the system shown in FIG. 22.

CAD terminal 102 includes a display screen 104 and an operator input device 106 such as a keyboard and graphics tablet. Typically, a design engineer seated at the terminal will draw, onto display screen 104, the configuration of a part desired to be fabricated, using operator input device 106. Information provided by the design engineer to CAD terminal 102 comprises CAD data, which includes the part number, engineering change identification, material specifications, a reference point consisting of a x-y data base coordinate for the part, a flat pattern description, hole sizes, hole locations, center line of bends, bend radius, angle of bends, and direction of bends (up or down). The configuration data, such as edge and hole location, is expressed with respect to the reference point. A typical part designed on CAD terminal 102 is shown in FIG. 23.

When a design engineer has completed entry of all CAD data, that is, information necessary to define a part to be fabricated, the entered data is stored by CAD terminal 102 as a CAD data file identified by the part number.

CAD terminal 102 is connected to a manufacturing process program (MPP) computer 110. Computer 110 receives as input certain CAD data contained in CAD data files of CAD terminal 102. MPP computer 110 also receives as an input manufacturing process planning data supplied from external sources, either by manual entry or by transfer from other computers, such as a Control Data Corporation Cyber 930 computer.

MPP data consists of additional information, beyond that supplied by the engineer when the part is designed, which is necessary to actually fabricate the part. This additional information includes manufacturing data such as thickness, width, and length of stock to be used in fabricating the part, the distance from the reference point of the part to the sheared edge of the part along the y-axis, the sequence of drilling holes, the identification of robot part manipulators necessary to fabricate the part, identification of robot grippers, angle and direction of part rotation during fabrication, gripper locations for receiving the part, distance from the reference point of the part to the center line of a bend, lateral position of a bending brake to provide end-of-punch clearance for previously bent flanges, identification of robot manipulators transferring or receiving the part, and the destination of the finished part.

MPP computer 110 combines MPP data and CAD data to generate part description data (PDD) files, each identified by a unique part number and consisting of a plurality of part definition data records forming a complete file of all data necessary to actually fabricate the part. MPP computer 110 may be a stand-alone computer connected by a data link to CAD terminal 102. Alternatively, the functions of MPP computer 110 may be performed by an MPP program executing on the same computer which implements the design processes of CAD terminal 102.

Part description data 112 is supplied to a microprocessor controlled fabrication system (MCFS) 114 consisting of a plurality of manufacturing stations 116, 118, 120, 122, 124, and 126 which perform manufacturing operations upon a workpiece. MCFS 114 also includes a plurality of robotic material handling mechanisms, or robots, 128, 130, 132, 134, 136, and 137, also respectively referred to as robots #1, #2, #3, #4, #5 and #6. In a preferred embodiment of MCFS 114 shown in FIG. 24, station 116 comprises a material cartridge station, station 118 comprises a shear station, station 120 comprises a drill station, station 122 comprises a profile/deburr station, station 124 comprises an inspection (or vision) station, and station 126 comprises a brake station.

Figure 25:
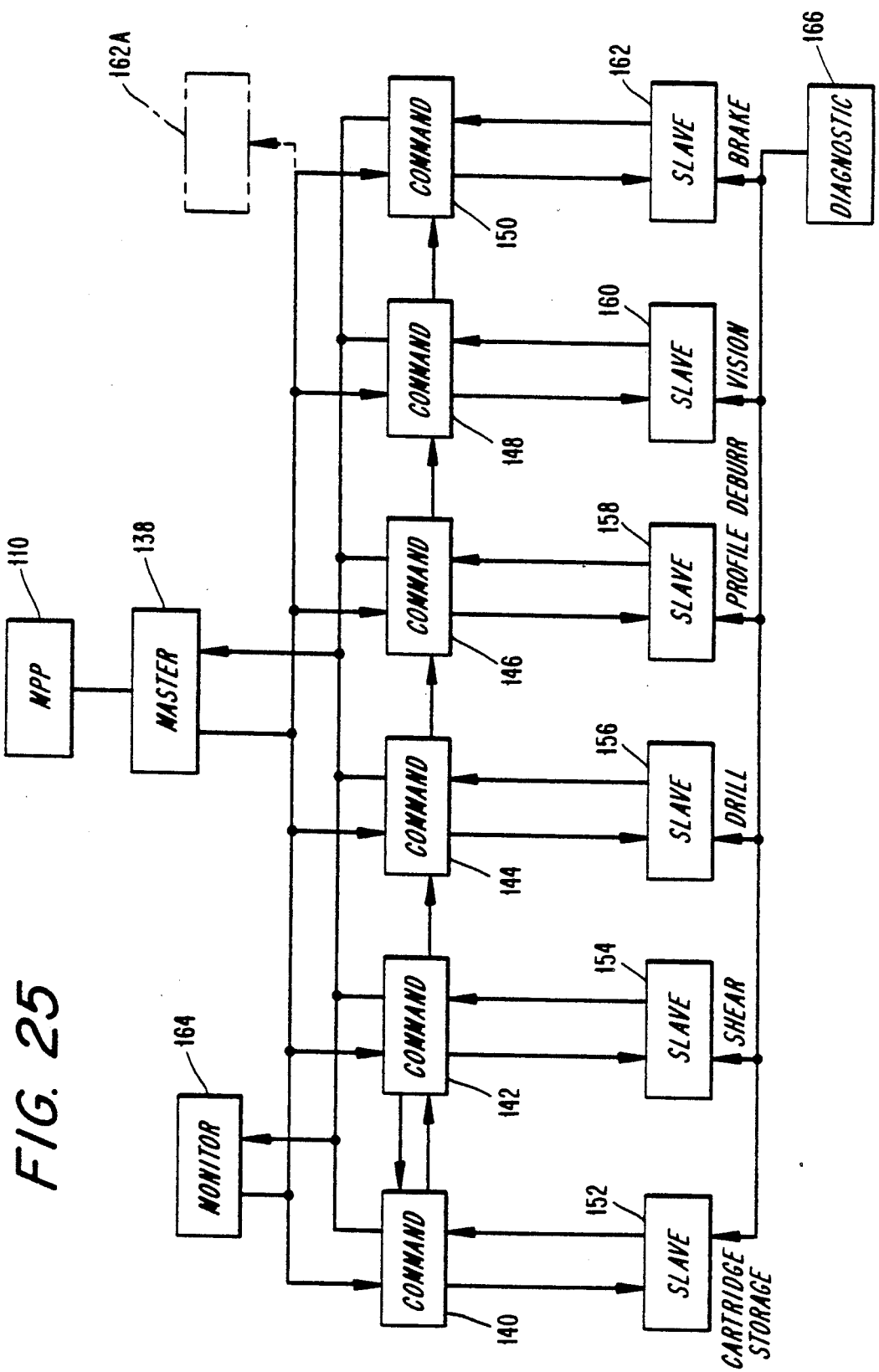
FIG. 25 is a block diagram of a computer system included in the microprocessor-controlled fabrication system shown in FIGS. 22 and 24.

MCFS 114 also includes a computer control system shown in block diagram form in FIG. 25. The computer control system of MCFS 114 includes a master computer 138 connected to a plurality of command computers 140, 142, 144, 146, 148, and 150, respectively contained in cartridge station 116, shear station 118, drill station 120, profile/deburr station 122, vision station 124, and brake station 126. Each command computer 140–150 is connected to a respective slave computer 152, 154, 156, 158, 160, and 162. Each command computer 140–150 is also connected to a monitor computer 164. Each slave computer 152–162 is also connected to a diagnostic computer 166. In a manner to be more completely described hereinafter, part description data from MPP computer 110 is stored in master computer 138, and selectively supplied to command and slave computers 140–150 and 152–162, respectively, to perform operations on a workpiece to produce a fabricated part.

It is an important feature of the present invention that data files produced by CAD terminal 102 each include dimensional data corresponding to the configuration of a part to be fabricated, the dimensional data being expressed with respect to an operator-entered reference point. Moreover, each of the manufacturing stations 116-126 is oriented with respect to a common coordinate system.

Figure 24:
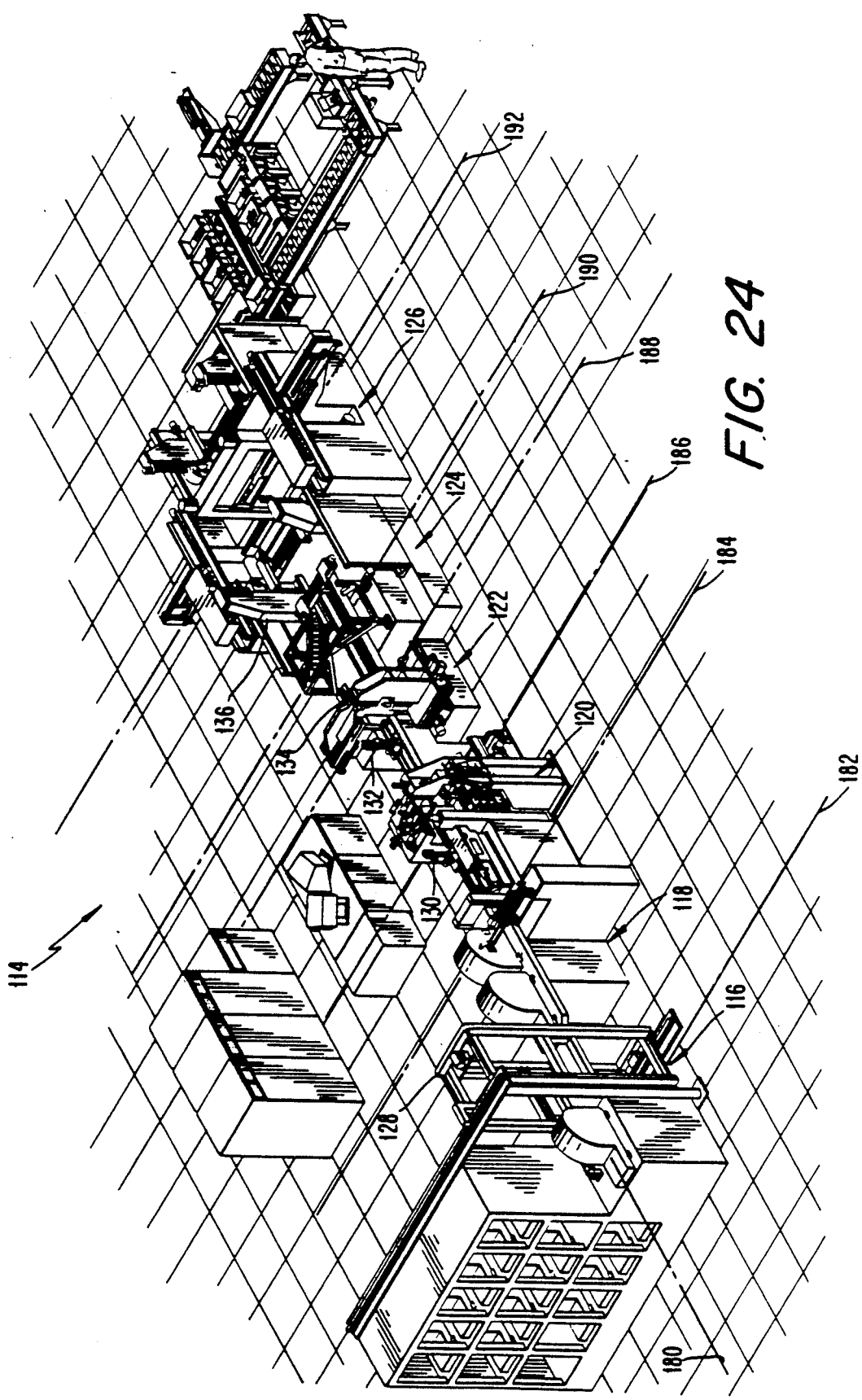
FIG. 24 is a perspective view of a microprocessor-controlled fabrication system included in the system shown in FIG. 22.

FIG. 24 is a perspective view of MCFS 114, including manufacturing stations 116-126. Each manufacturing station 116-126 is oriented with respect to a common y-axis 180 and is respectively oriented with respect to one of a plurality of parallel local x axes 182, 184, 186, 188, 190, and 192.

Briefly, parts are fabricated on design and manufacturing system 100 in the following manner. A design engineer enters a reference point at CAD terminal 102. The engineer then enters on CAD terminal 102 the configuration of a part desired to be fabricated, expressed with respect to the reference point.

Manufacturing process planning data is then entered into MPP computer 110. MPP computer 110 combines the manufacturing process planning data with configuration data from CAD terminal 102 and generates a set of part definition data records corresponding to the part desired to be fabricated, with each of the part definition data records being expressed in relation to the reference point and corresponding to one of manufacturing stations 116-126. That is, for each part identified by a unique part number, there is a part definition data file consisting of a plurality of part definition data records.

In the preferred embodiment, one part definition data record of the part definition data file for a given part corresponds to cartridge station 116 and includes information needed by cartridge station 116 to aid in the fabrication of the part. A second part definition data record corresponds to shear station 118 and includes information, other than the information in the cartridge station part definition data record, which is needed by shear station 118 to aid in the fabrication of the part. The part definition data file similarly includes separate part definition data records corresponding to drill station 120, profile station 122, vision station 124, and brake station 126, which respectively provide information needed for drilling, profiling and delivery, inspecting, and bending operations.

The invention thus includes manufacturing process program means for receiving the CAD data for the part to be fabricated, for receiving manufacturing process planning data for the part to be fabricated, and for generating a set of part definition data records corresponding to the part to be fabricated, each of the part definition data records corresponding to one of the manufacturing stations. As embodied herein, the manufacturing process program means comprises MPP computer 110.

Prior to operation of the invention, it is determined, based on external requirements, the types and quantities of parts to be manufactured. This information is transferred to master computer 138. Scheduling algorithms in master computer 138 then establish the work mix, that is, the order in which parts are to be manufactured. Alternatively, the work mix may be specified manually by operator input through monitor computer 164.

Material to be fabricated into parts is then supplied, either manually or otherwise, to cartridge station 116 to be machined into a part. The amount of and types of material are determined by the total parts requirements and are supplied to master computer 138. In the preferred embodiment, material is provided by making available to cartridge station 116 cartridges each containing a coil of sheet metal which can be machined into a plurality of parts. The cartridges are automatically stored into bins of cartridge station 116.

The reference point entered by the engineer into CAD terminal 102 and carried through part definition data records is then associated with a specified location on the material. In a manner to be described more completely below, this process consists of assigning the reference point to a specific location on material stored in the cartridge.

The generic control and data flow of each of the manufacturing stations is as follows. Upon initiation of a manufacturing operation on MCFS 114 for a work shift, master computer 138 retrieves the part definition data file for each of the parts in the work mix and supplies records from this file as needed, to each of the manufacturing stations. Except at the beginning of a manufacturing process cycle (for example, at the beginning of a work shift), new part definition data will be down loaded to a generic manufacturing station while that station is still processing the last part of the current part number. When the associated command computer for that station receives information that processing for the current part is complete, the associated command computer initiates commands to pass the part to the subsequent station, if the subsequent station is ready.

When the transfer is completed to the point that the part has left the control environment of the current station, or the part has gone beyond the point in the station where it would interfere with entry of a new part entry to the station, the current command computer informs the previous command computer that it can accept a new part.

While machining is taking place, the current command computer requests a part definition data record for the next part to enter that station. That information may be a command to process the next part in an identical manner as the current part, or a new part definition data record for a new part number.

This completes the cycle for a generic manufacturing station. A detailed description for each of the stations of the preferred embodiment is supplied below. Each conforms to the generic description given above but differs from other manufacturing stations to the extent that each station performs different types of machining operations and thus functions differently at the detail level.

When a manufacturing cycle is initiated on MCFS 114 a command to fabricate parts is issued, a first part definition data record is transmitted from the part definition data file to a first one of the manufacturing stations of MCFS 114, the first part definition data record corresponding to the first station. In the preferred embodiment, the first station consists of cartridge station 116. A set of manufacturing instructions at cartridge station 116 are then executed in accordance with manufacturing commands programmed into slave computer 152 of cartridge station 116 and in accordance with the first part definition data record to transport material to the first manufacturing station and machine the material. In the preferred embodiment, this consists of selecting the proper cartridge from a plurality of available cartridges and placing the cartridge in position to feed material into shear station 118. The reference point is associated with a specified location on the material and a known orientation is maintained between the specified location on the material and the axes of the MCFS 114.

A subsequent part definition data record is transmitted to a subsequent manufacturing station from the part definition data file in master computer 138 corresponding to the part desired to be fabricated. The subsequent part definition data record corresponds to the subsequent manufacturing station. In the preferred embodiment, the subsequent manufacturing station consists of shear station 118. Shear station 118 then executes a set of manufacturing instructions in accordance with manufacturing commands programmed into slave computer 154 and in accordance with information contained in the subsequent part definition data record. Execution of the instructions is operative to feed material from the cartridge to shear station 118 and to machine the material by shearing off a quantity of material from the cartridge to form a workpiece, while maintaining a known orientation between the specified location on the material (forming the workpiece) and axes of MCFS 114.

The steps of transmitting part definition data records to a subsequent manufacturing station and executing a set of manufacturing instructions at the subsequent manufacturing station are then repeatedly performed until manufacturing and transport operations corresponding to all part definition data records in the part definition data file have been executed. In the preferred embodiment, this consists of transmitting a part definition data record to drill station 120 and executing a set of drilling instructions at the drill station in accordance with drill commands programmed into slave computer 156 of drill station 120 and dimensional data contained in the drill part definition data record to transmit the material to drill station 120 and drill the workpiece. The part definition data records are then sequentially transmitted to profile/deburr station 122, vision station 124, and brake station 126 to cut the workpiece to the desired profile and smooth the edge, inspect the workpiece for the proper profile and drilled hole configuration, and bend the workpiece to fabricate the desired part, respectively. During all times, manufacturing stations 116-126 and robots 128-137 maintain a known orientation between the specified location on the workpiece and axes 180-192 of MCFS 114.

A more detailed description will now be provided of master computer 138, command computers 140-150, slave computers 152-162, monitor computer 164, and diagnostic computer 166. Master computer 138 receives and stores part description data consisting of part definition data files for each part which is desired to be fabricated on MCFS 114. Master computer 138 may be a standard industrial general purpose computer containing a processor such as a type 68020 commercially available from the Motorola Corporation.

Preferably, the step of executing a set of manufacturing instructions includes the substeps of converting the part definition data into dimensional parameters, combining the dimensional parameters with manufacturing commands stored in the manufacturing station to form electrical signals, and supplying the electrical signals to corresponding activators and cutting tools to machine a part to a configuration designated by the part description data.

Master computer 138 stores part definition data files, identified by part number, in groups of part numbers wherein each member of the group can be fabricated from material contained in the same cartridge. Master computer 138, upon receiving the part numbers and quantities of parts required to be fabricated, extracts from the part definition data files the type of material and stock length for each part desired to be fabricated. The total amount of material necessary to fabricate the scheduled number of parts is then computed and the identification number of cartridges containing such material is determined and stored until required by the work mix.

The sequence in which the cartridges will be used to supply material to be fabricated into parts is established automatically by scheduling algorithms in master computer 138, or manually as entered by the operator through monitor computer 164. Master computer 138 retrieves from storage the part definition data file for each scheduled part. When requested by a command computer 140-150, master computer 138 supplies to the requesting command computer the part definition data record needed to fabricate the designated part on the requesting station.

Monitor computer 164 provides the operator with an interface with master computer 138, command computers 140-150, and slave computers 152-162. A set of predetermined sensor states is stored corresponding to the manufacturing instructions. The states of sensors at the manufacturing stations are periodically monitored and compared with the predetermined states. When a specific one of slave computers 152-162 identifies a fault from sensors of the associated manufacturing station 116-126 (as determined by sensor states supplied by diagnostic computer 166), that slave computer generates an alarm signal and signals to its associated command computer the identification of the faulty sensor and the specific operation which the machining station 116-126 was performing. The slave computer requests corrective action and enters a wait state where appropriate. Alternatively, faults may be identified by diagnostic computer 166 or command computers 140-150. The associated command computer signals monitor computer 164 of the identification and state of the faulty sensor and the operation being performed when the fault occurred. This information is displayed on a display device at monitor computer 164 for use by the operator.

The operator then commands monitor computer 164 to display data relating to the faulty sensor and to display the program mode of the operation in which the fault occurred. From this data, the operator identifies the current area of operation sequence. The operator then commands monitor computer 164 to present a programmed sequence to be followed in searching for the source of the fault. Using the program sequence, the operator commands monitor computer 164 to signal a first diagnostic sequence to the command computer corresponding to the slave computer which requested corrective action. The command computer answers this request by performing the first sequence diagnostic action and continues such action until the source of the fault is identified.

When a fault source is identified, a repair, replacement, or termination-of-processing decision is determined. The operator commands the monitor computer to display maintenance procedures to be used in repairing or replacing an item. Alternatively, in some applications monitor computer 164 may provide fully automatic fault analysis and maintenance command, resulting in a display of appropriate repair and/or replacement commands.

After the sequence is established in which cartridges will be used to supply material for part fabrication (either automatically or manually), the operator orders monitor computer 164 to request from master computer 138 cartridge identifications and total lengths of material to be worked on. This information is then displayed by monitor computer 164.

Master computer 138 releases part description data records in accordance with cartridge sequence. The release of part description data records by master computer 138 is performed in response to request from command computers 140-150, as will be described hereinafter. When all parts to be fabricated from material within a particular cartridge have been completed, master computer 138 orders command computer 140 of cartridge station 116 to select the next succeeding cartridge. This procedure is repeated until all scheduled parts have been fabricated.

Cartridge command computer 140 maintains an inventory of material lengths and storage locations of all cartridges and stock. When a cartridge is placed on an incoming or outgoing rack, this information is signaled to monitor computer 164 and cartridge command computer 140. Upon receipt of such signals, cartridge command computer 140 commands a bar code reader at cartridge station 116 to read the cartridge identification number code on the cartridge and to display the cartridge identification number on monitor computer 164.

The invention thus includes master computer means coupled to the manufacturing process program means for storing the part definition data record sets and for receiving commands to fabricate parts. As embodied herein, the master computer means comprises master computer 138. Command computers 140-150 respond to requests from associated slave computers 152-162 for part description data. When a slave computer has completed work on a workpiece and has moved the workpiece out of the associated station, the slave computer signals the associated command computer that the station is open. The command computer then requests availability of the next workpiece.

Upon receiving notification that a station is open, the associated command computer signals the downstream command computer that a workpiece is available. A command computer waits until it receives a signal from the preceding command computer that a workpiece is available, and answers a slave computer request by signaling the slave computer that a workpiece is available. Since the command computer has already received the part definition data record for the next part, from the master computer, the command computer sends this data to the slave computer.

Each slave computer 152-162 is programmed to perform generic manufacturing functions in a prescribed sequence. For example, drill slave computer 156 is programmed to perform generic drilling operations, such as "load a drill bit," "move the workpiece holder," "set the drill rotation speed", etc. The specific drilling operations to be performed on a workpiece, such as which drill bit to load, where to move the workpiece holder, and what rotation speed to set are specified by a part description data record received from the command computer.

The invention thus includes a plurality of machine computer means, each coupled to the master computer means and to one of the manufacturing stations and programmed with instructions to performing generic manufacturing procedures, for receiving part definition data records, and for combining the generic manufacturing procedures with the part definition data records to generate electrical signals from the part definition data records to drive actuators and machining tools of the associated manufacturing station to perform specific transport and fabrication operations on a workpiece to manufacture the part to be fabricated.

Preferably, the machine computer means comprises means for assigning a fixed relationship between the reference point and a fixed location on the workpiece and for performing specific transport and fabrication operations on the workpiece while maintaining a predetermined relationship between the fixed location and the common axes. As embodied herein, the machine computer means comprises command computers 140-150 and slave computers 152-162. When a slave computer 152-162 receives a signal from its associated command computer 140-150 that a workpiece is available, the slave computer executes preprogrammed instructions to command associated robots to grip the workpiece from the preceding manufacturing station and place it into position to receive a machining operation from the manufacturing station, maintaining at all times the relationship between the reference point on the workpiece and the common axes of MCFS 114. As will be described below in greater detail, the slave computer generates signals to servos and actuators to perform transport and machining operations upon the workpiece. Each function performed by the slave computer requires a predetermined set of sensor status before, during, and after each operation. The sensor status is monitored and reported to the slave computer either directly or via diagnostic computer 166. If any portion of a manufacturing station is not in the right place at the right time, such condition will be indicated by the status of appropriate sensors. Incorrect sensor status is detected and reported by the slave computer to monitor computer 164 as a fault.

Electronic positioning sensors constantly report the position and velocity of moving mechanisms within each manufacturing station. In the preferred embodiment, positioning sensors comprise Inductosyn transducers which report positions of mechanisms within stations 116-126 to a tolerance sufficient to permit positioning control of such mechanisms to within 0.0001 inches.

Figure 26:
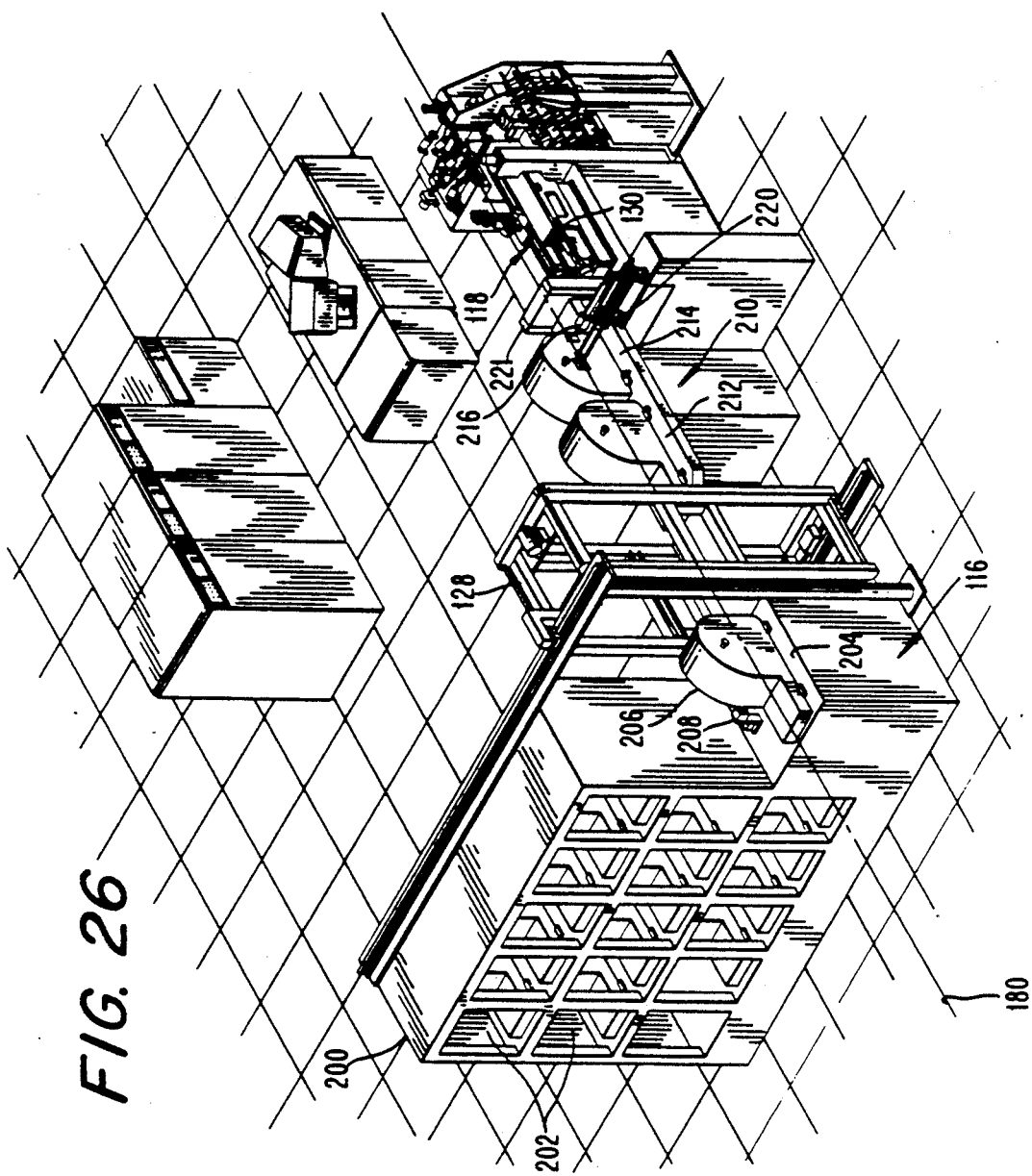
FIG. 26 is a perspective view of a cartridge station included in the microprocessor-controlled fabrication system shown in FIG. 24.

Referring now to FIG. 26, there is shown a perspective view of cartridge station 116, including robot 128 (robot #1) and shear station 118.

Cartridge station 116 includes a storage shelf 200 having a plurality of bins 202 and a receiving rack 204. When a cartridge of material 206 is placed, by operator action, upon receiving rack 204, an identification sticker on cartridge 206 is read by a bar code reader 208. The identification sticker includes data uniquely identifying the material contained in the cartridge, including a cartridge identification number, a cartridge serial number, a quality control inspector number, material specification, material thickness, stock width, and length of stock in the cartridge. The cartridge identification is a standard number which identifies the material in the cartridge as conforming to material specifications, material thickness, and stock width. The cartridge serial number is issued by apparatus not shown in the Figures and is provided as a unique serial number for the lot of material contained in the cartridge. The serial number provides identification to facilitate maintenance of historical records for each part produced from the material in the cartridge. The quality control inspector number identifies the inspector who certified that the material in the cartridge conformed to material requirements. The material specifications include a number designating the alloy and condition of the material. Material thickness is the thickness of the material as measured. Stock width is the stock width as measured. Length of stock is the measured continuous length of the material in the cartridge.

The cartridge identification number is transferred to the cartridge command computer, which determines an available bin 202 for storage of cartridge 206. Command computer 140 of cartridge station 116 then generates commands to slave computer 152 of cartridge station 116 to cause robot 128 to move cartridge 206 from receiving rack 204 to its assigned bin 202.

Shear station 118 includes a cartridge turnstyle 210 having first and second cartridge receiving stations 212 and 214. Position 214 is oriented such that the y-axis of material in a cartridge located at position 214 coincides with y-axis 180 of MCFS 114. Shear station 118 also includes a bar code reader 216 which can read the identification labels present on material cartridges. Shear station 118 also includes an end-of-material sensor consisting of a photo cell mechanism 220 which is inserted into a cartridge to detect the end of material in the cartridge.

When shear command computer 142 receives from shear slave computer 154 an indication that shear station 118 is open and a request for additional data, shear command computer 142 transmits to shear slave computer 154 the part definition data record of the next part to be manufactured (already received from master computer 138). Material specifications from the part definition data record just received from master computer 138 are transmitted to shear slave computer 154. Shear slave computer 154 compares the material specification data with the data associated with material in the cartridge currently present in position 214 of turnstyle 210, as stored in memory of shear slave computer 154. If the material specifications in the cartridge of position 214 and memory of shear slave computer 154 coincide, shear slave computer 154 transmits the serial number of the cartridge and the quality control inspector's number to shear command computer 142. This data is retained by command computer 142 until the manufacturing operation on this part is finished, when it will be sent to master computer 138 as part of a historical record of the part.

Upon determining that the proper material cartridge is present, shear slave computer 154 requests stock length information from shear command computer 142 and generates signals which actuate a drive mechanism to feed the proper amount of material into shear station 118. A thickness measurement is then performed with a linear variable differential transformer (not shown in FIG. 26), and the thickness measurement is compared with the thickness specification contained in the part definition data record, to determine if the material is within thickness tolerance. If so, the thickness measurement is transmitted from shear slave computer 154 to shear command computer 142 for inclusion in the historical record for the part.

Next, shear slave computer 154 requests part identification data and the x,y coordinates of the spot on the workpiece where the part ID will be marked. A laser marking device (not shown in FIG. 26) is then actuated to cause part identification data to be etched onto the material extended from the cartridge in position 214 at the specified location.

Shear slave computer 154 then requests data from command computer 142, as contained in the recently received part definition data record, which specifies the dimension between the position of the edge to be sheared and the x-axis of the reference point of the part to be manufactured. Since the y-axis of the reference point of the part to be manufactured has already been positioned to coincide with axis 180 of MCFS 114, the reference point of the part, as originally specified by the designer at CAD terminal 110, is thus associated with a specified location on the material.

Shear robot 130 (robot #2) consists of a plurality of grippers connected to a material transfer mechanism. Shear slave computer 154 then generates signals to shear robot 130 to move into proper position with respect to the x-axis of the workpiece and seizes the material extending from the cartridge at position 214 with its grippers. Shear slave computer 154 then generates signals to actuate shear mechanism 221 to cut the workpiece from the material of the cartridge stored in position 214. With the workpiece seized in its gripper, robot 130 is then commanded by slave computer 154 to return to a home position. Shear slave computer 154 informs shear command computer 142 that the shear operation for this part is complete, and requests data for the next part. Shear command computer 142 then signals drill command computer 144 that a workpiece is ready, and transmits to master computer 138 data including the serial number and inspector number of the cartridge in position 214 and the measured material thickness of the workpiece just produced. During processing of the workpiece by shear station 118, command computer 142 has requested a part definition data record from master computer 138 relating to the next part to be processed by shear station 118. Shear command computer 142 supplies this data in response to the request from shear slave computer 154.

Figure 27:
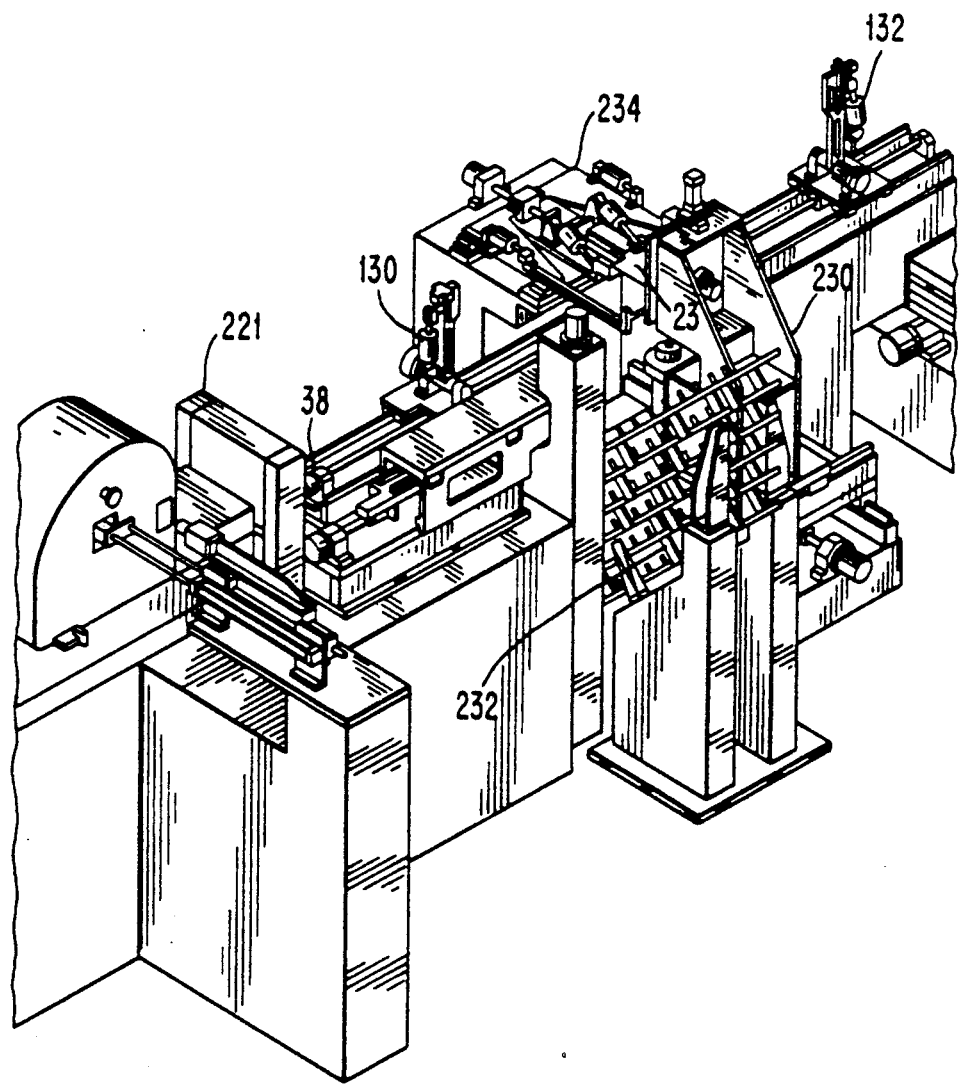
FIG. 27 is a perspective view of a drill station included in the microprocessor-controlled fabrication system shown in FIG. 24.

FIG. 27 is a perspective view of drill station 120. Drill station 120 includes a drill mechanism 230, a tool transfer and storage mechanism 232, and a workpiece holder mechanism 234. When drill station 120 is open, drill slave computer 156 requests the width of the workpiece for the next part. Drill command computer 144 then transmits to slave computer 156 the part definition data record for the next part, already received from master computer 138. The part definition data record transferred to drill slave computer 156 will be from the same part data definition file as the part definition data record previously transmitted to shear station 118 for showing operations on the workpiece, as previously described.

When drill slave computer 156 receives the width of the next workpiece, it generates signals to properly position workpiece holder 234 with respect to y-axis 180 to provide a separation sufficient to accept the incoming workpiece. Drill slave computer 156 then generates signals to robot 130 to move robot 130 toward drill station 120, to cause the x-axis of the workpiece to coincide with the x-axis 186 of the drill station. The y-axis of the workpiece already coincides with y-axis 180 of MCFS 114. Drill slave computer 156 then generates signals to cause workpiece holder 234 to seize the workpiece, to cause grippers of robot 130 to open, and to cause robot 130 to move back to its home position. Drill slave computer 156 signals drill command computer 144 that robot 130 is available. Drill command computer then signals shear command computer 142 that robot 130 is available.

Drill slave computer 156 then requests the size of the drill for the first holes to be drilled in the workpiece. This information is transferred by drill command computer 144 from the part definition data record. If slave computer 156 determines that the size of the drill for the first holes to be drilled in a workpiece is different from the size of the drill currently present in the drill motor, commands are generated to cause the proper drill bit to be selected from the tool transfer and storage mechanism 232 and placed in the drill motor.

Drill slave computer 156 then requests information from the part definition data records stored in command computer 144 specifying the thickness of the material to be drilled. Upon receiving this information, drill slave computer 156 positions the end of the drill bit a predetermined distance from the workpiece surface and stores this information in memory. Drill slave computer 156 then starts the drill motor and positions the drill mechanism on x-axis 186 of drill station 120. Slave computer 156 then signals command computer 144 that it is ready to drill and requests hole locations.

Command computer 144 then transmits from the part definition data record the x,y coordinates of the first hole location, with respect to the reference point of the workpiece. Since the reference point of the workpiece has been positioned to coincide with the intersection of y-axis 180 and x-axis 186, drill slave computer 156 is able to generate signals to command workpiece holder mechanism 234 to position the specified hole location on the workpiece directly opposite the drill. Slave computer 156 then generates signals causing the drill mechanism to approach the surface and drill the first hole. Slave computer 156 then requests the location of the next hole to be drilled from the part definition data record stored in command computer 144. In a similar manner, all holes specified in the parts definition data record stored in command computer 144 are drilled. Drill bit sizes are changed as necessary.

When the last hole has been drilled, drill slave computer 156 determines if robot 132 (robot #3) is available to accept the drilled workpiece. This determination is made by monitoring the state of sensors in robot 132, as supplied by diagnostic computer 166. When slave computer 146 confirms that robot 132 is available, slave computer 156 generates signals causing robot 132 to move toward drill station 120 and position its grippers above and below the workpiece. Slave computer 156 then generates commands causing robot 132 to grip the workpiece and causing workpiece holder mechanism 234 to release the workpiece. Slave computer 156 then causes robot 132 to return to a home position. When robot 132 returns to home position, a fail-safe brake (not shown) is de-energized to lock robot 132 in home position. The drive mechanism of robot 132 is also de-energized. When this operation has been performed, slave computer 156 then directs command computer 144 to inform command computer 146 that a workpiece is available and awaits a signal from shear command computer 142 that a new workpiece is present in robot 130.

Figure 28:
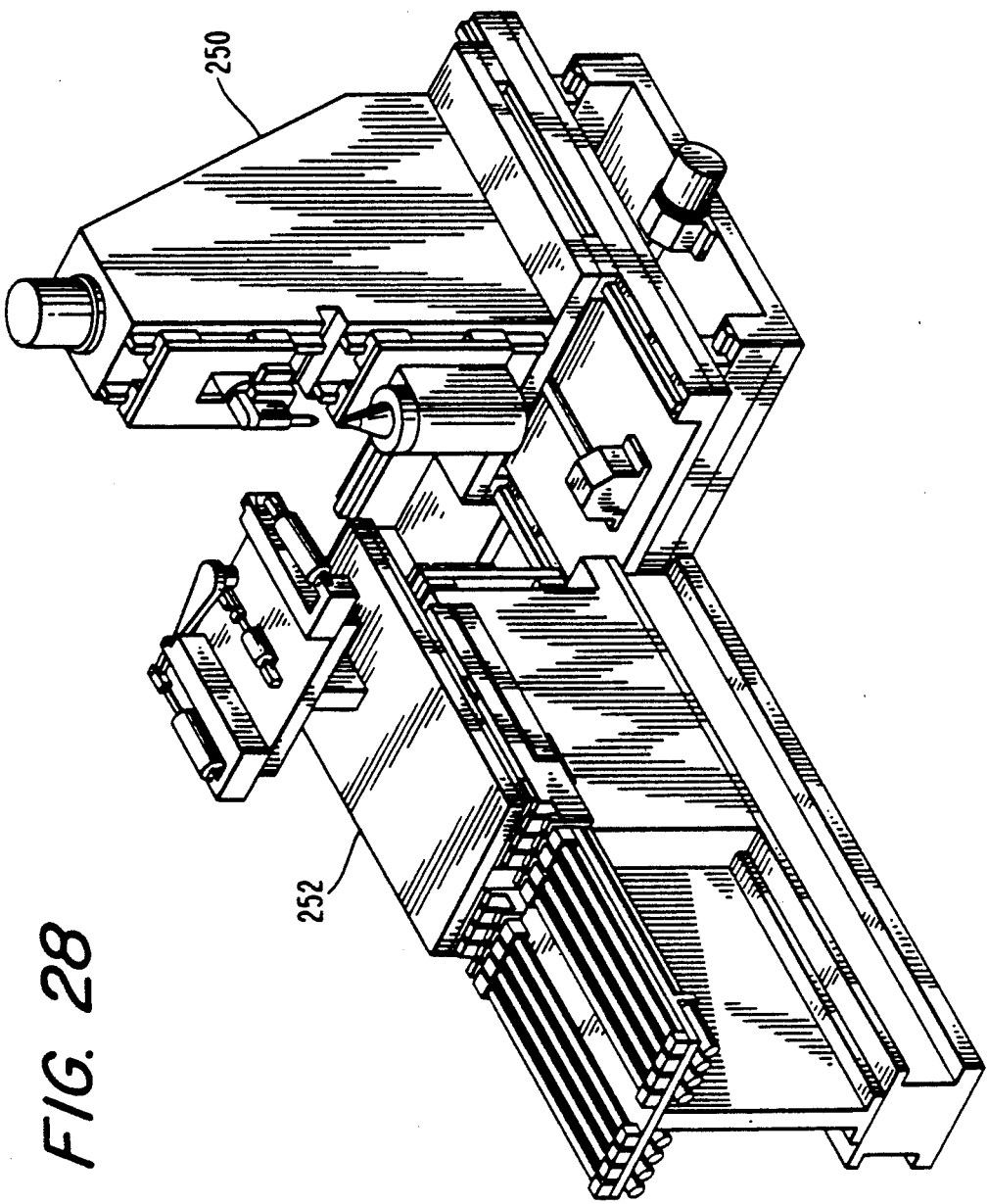
FIG. 28 is a perspective view of a profile/deburr station included in the microprocessor-controlled fabrication system shown in FIG. 24.

Profile station 122 is shown in greater detail in FIG. 28. Profile station 122 includes a profile/deburr mechanism 250 and workpiece holder mechanism 252. Profile/deburr mechanism 250 is moved on a horizontal plane in the x and y directions while the workpiece is held in a stationary position by workpiece holder mechanism 252. In operation, a profile is cut on one half of the workpiece by movement of profile/deburr mechanism 250 which moves a cutting tool in x and y directions with respect to the reference point of the workpiece along a predetermined profile. The configuration of this profile is specified by a part definition data record of the same part definition data file from which the proceeding cartridge, shear, and drill operations were performed.

Profile/deburr mechanism 250 is then translated in the z (vertical) direction to allow a deburr tool to be applied to the recently cut profile of the workpiece. Profile/deburr command computer 146 calculates a revised trajectory for movement of the profile/deburr mechanism 250 to compensate for the offset required in the deburr operation. A deburr operation is then performed on the profiled half of the workpiece to provide a smooth profile surface.

Workpiece holding mechanism 252 then rotates the workpiece 180 degrees to permit profile and deburr operations to be performed on the second half of the workpiece.

When profile/deburr slave computer 158 receives an indication from profile/deburr command computer 146 that all profile and deburr data from the part definition data record has been transmitted, profile/deburr slave computer 158 generates signals to cause profile/deburr mechanism 250 to return to a home position and to cause workpiece holding mechanism 252 to return the workpiece to a position in which the reference point of the workpiece has a predetermined relationship with y-axis 180 and x-axis 188 of profile/deburr station 122. Profile/deburr slave computer 158 then requests confirmation through profile/deburr command computer 146 and vision command computer 148 that the vision station is available to receive a part.

Profile/deburr 158 slave computer then commands robot 134 (robot #4) to move into a position in proximity to profile station 122. Robot 134 is then commanded to grip the workpiece which is also held by workpiece holding mechanism 252 of profile station 122 and move the part to the next station. Profile slave computer 158 then commands workpiece holding mechanism 252 to release the workpiece and commands robot 134 to return to a home position.

Figure 29:
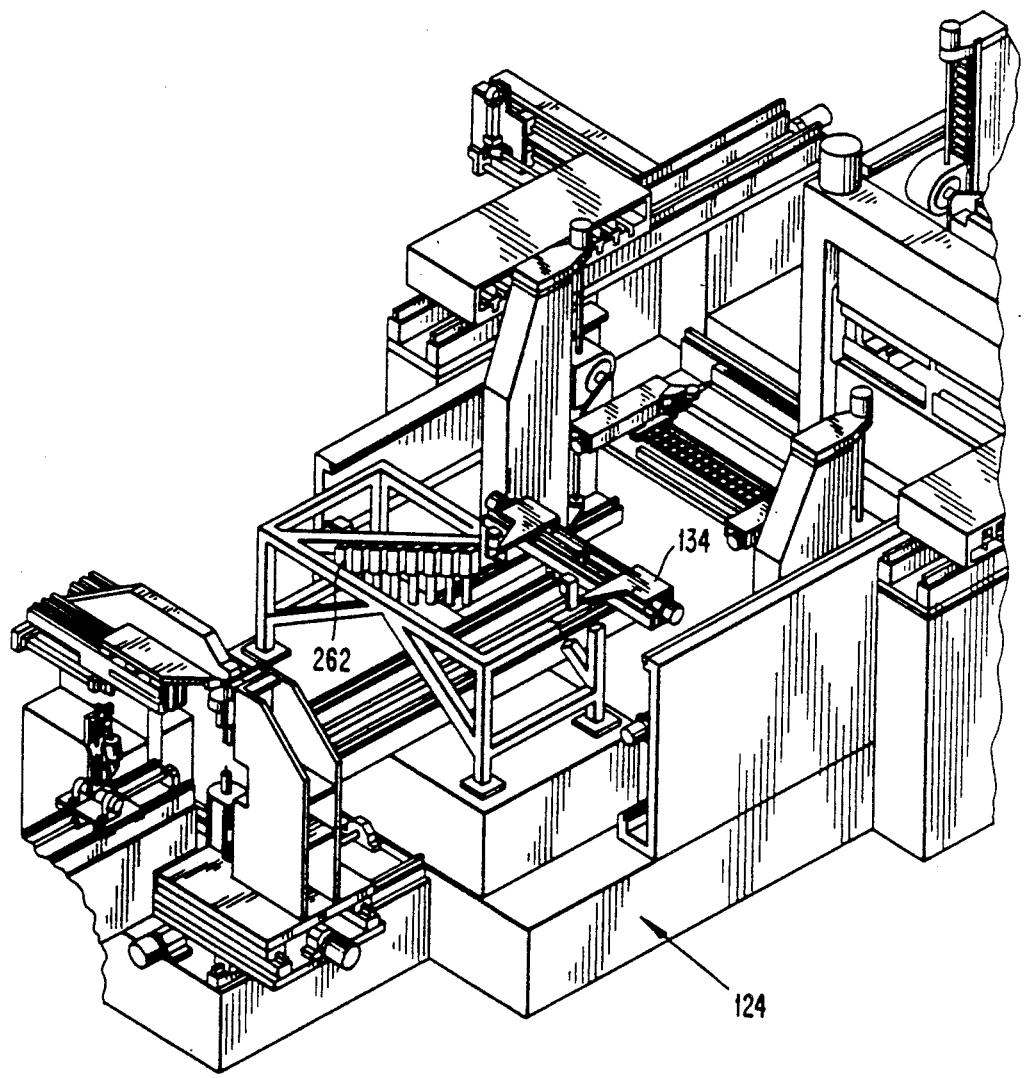
FIG. 29 is a perspective view of a vision station included in the microprocessor-controlled fabrication system shown in FIG. 24.

Vision station 124 is shown in greater detail in FIG. 29. Vision station 124 includes a robot 134 and a camera array 262.

When the workpiece is held by robot 134 in its home position, the x-axis of the workpiece is positioned at a predetermined known distance from a calibrated window in camera array 262. Camera array 262 will measure the x dimension of the workpiece in relation to the coincident y-axis of the workpiece and MCFS y-axis 180.

Camera array 262 includes a plurality of cameras, the fields of view of which are staggered to provide an overlap view permitting one hundred percent scanning of the workpiece. Vision slave computer 160 then requests the next part definition data record from command computer 148. This part definition data record is taken from the same part definition data file as part definition data records for the profile/deburr, drill, shear, and cartridge operations previously described. Vision slave computer 160 actuates robot 134 to move the workpiece through the field of vision of camera array 262 such that the x- and y- coordinate values of selected transition points, that is, structural features such as holes and edges, of the part are determined and compared to part definition data contained in a part definition data record stored in vision command computer 148.

Vision command computer 148, using prescribed tolerance factors, determines acceptance or rejection of the workpiece based upon a comparison of the x,y coordinates of edges and holes with the corresponding predetermined set of coordinates specified by the vision station part definition data record. If drilled holes or profile are consistently in error but are in tolerance in the x or y directions, this condition is reported to vision command computer 148 and the results of the evaluation are reported, as difference information, to command computers upstream machining stations such as command computers 144 and 146. Command computers 144 and 146 then modify data from part definition data records for subsequent parts to cause respective slave computers 156 and 158 to make offsetting corrections on subsequently manufactured parts. This continuous calibration provides a means for compensating for thermal change or deflection in MCFS 114.

When robot 134 has completed its movement of the workpiece through the field of view of camera array 262, vision slave computer 160 generates signals to vision command computer 148 that the workpiece is available for pickup at the output of vision station 124.

Figure 30:
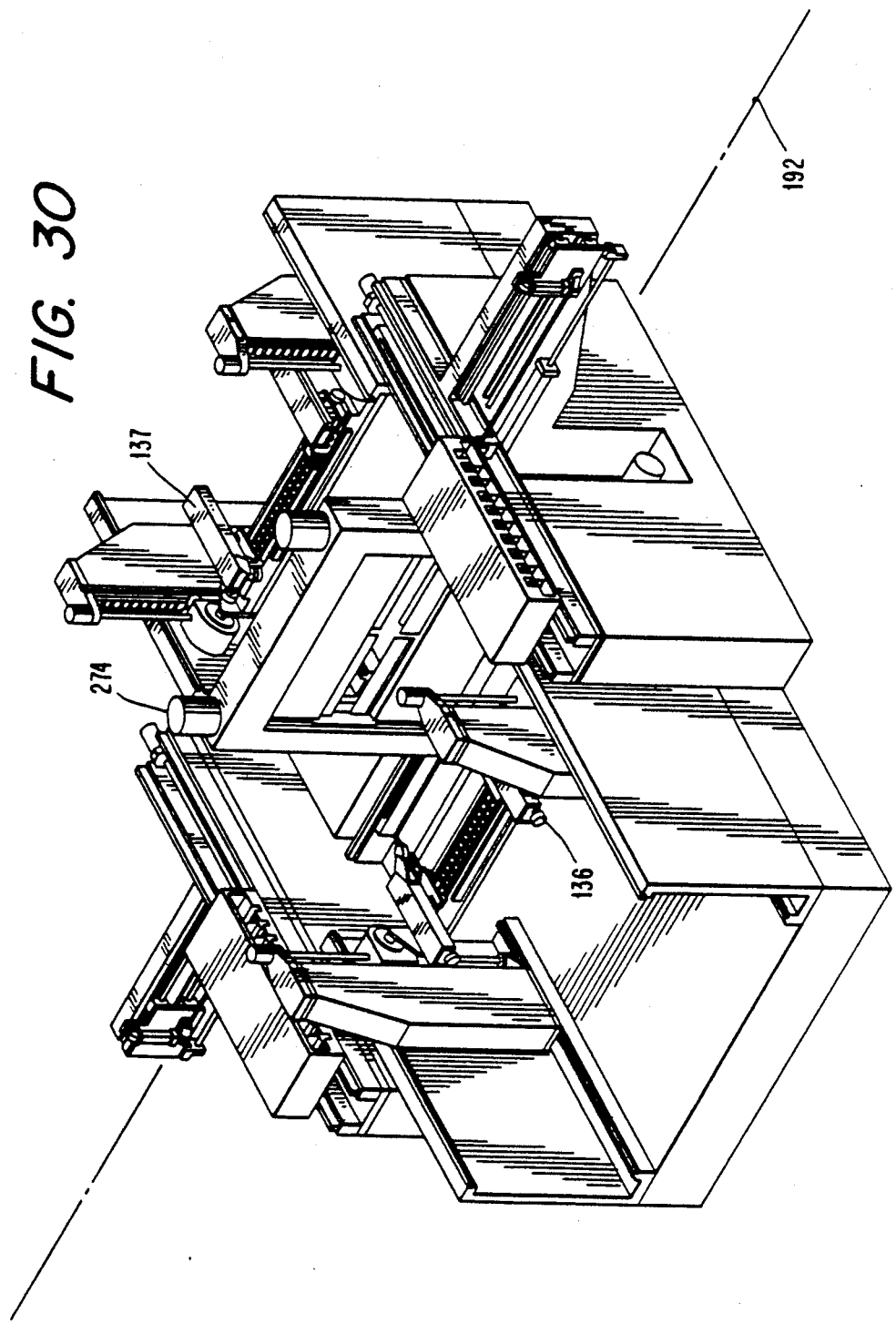
FIG. 30 is a perspective view of a brake station included in the microprocessor-controlled fabrication system shown in FIG. 24.

Brake station 126 is shown in greater detail in FIG. 30. Brake station 126 also includes a pair of robots 136 and 137, also respectively referred to as robots #5 and #6. Robots 136 and 137 are two-arm robots, each mounted on a carriage. Robot 136 traverses between vision station 124 and brake station 126. Robot 137 traverses between brake station 126 and a finished part deposit station 280 (FIG. 22). The home position of robot 136 is a known distance from x-axis 190 of vision station 124 and x-axis 192 of brake station 126. The distance between the home position of robot 136 to the reference point of the workpiece at the output of vision station 124 is a known constant dimension.

Brake station 126 also includes a brake mechanism 274 which performs bending operations upon a workpiece. Brake station slave computer 162 requests from brake station command computer 150 the availability of a workpiece at the output of vision station 124. When brake command computer 150 receives confirmation of a part availability at the output of vision station 124, the next part definition data record, supplied from the same part definition data file as part definition data records processed by vision station 124, profile station 122, drill station 120, shear station 118, and cartridge station 116 is transmitted to slave computer 162.

Brake station slave computer 162 requests gripper data for the part from command computer 150. Since brake station 126 is capable of performing complex bending operations upon a workpiece, the configuration and location of grippers on the workpiece and manipulation of the workpiece is critical in order to avoid interference between the grippers and portions of brake mechanism 274. Thus, the part definition data record for brake station 126 includes detailed identification of interchangeable grippers for robots 136 and 137, the required location on the workpiece with respect to the reference point on the workpiece, of grippers for robots 136 and 137, and rotation direction of the workpiece.

A comparison is made between the grippers currently installed in robots 136 and 137 and the gripper identification specified by the part definition data record. If a discrepancy is noted, brake station slave computer 162 initiates an exchange of grippers.

After confirmation of correct gripper identification, brake station slave computer 162 commands robot 136 to grip and extract the workpiece from the output of vision station 124. When robot 136 has removed the workpiece from the output of vision station 124, brake station slave computer 162 transmits a signal through brake station command computer 150 that vision station 124 is open.

Brake station slave computer 162 then commands robot 136 to move to a position with respect to brake mechanism 274 as specified by the part definition data record. At all times, the orientation of the workpiece is maintained such that there is a known orientation between the reference point of the workpiece and axes 180 and 192.

Brake station slave computer 162 commands bending operations as specified by the part definition data record. If necessary, gripper locations are changed on the workpiece to permit subsequent operations.

After each bending operation is completed, brake station slave computer 162 requests additional data from the part definition data record stored in brake station command computer 150 to specify the next bending operation. Upon completion of the last bending operation, brake station command computer 150 will transmit a signal to brake station slave computer 162 indicating completion of all bending operations specified by the part definition data record.

Brake station slave computer 162 then requests data from the part definition data record stored in brake station command computer 150 specifying the identification and location of grippers for robot 137. If the gripper identification returned is different from the identification of the gripper currently installed in robot 137, a gripper exchange is performed. Brake station slave computer 162 then moves robot 137 to the specified position and activates the grippers to grip the workpiece in robot 137. Brake station slave computer 162 then commands robot 137 to deliver the completed the workpiece to a container at completed part depot 280, to release its grippers, and return to the home position.

As an option, a seventh slave computer 162A may be provided. When all parts are complete, the container at depot 280 is transferred to a station where slave computer 162A prints a ticket for the container which identifies the part number, the material used, the inspector who certified the material, and the dimensions of the part. When fabrication has been completed of all parts to be formed from the material stored in the cartridge currently located at station 214 (FIG. 26) master computer 138 generates signals to command computer 140 to place a new cartridge in station 214. The amount of material remaining in the "old" cartridge at station 214 is calculated by slave computer 152 and transferred through command computer 140 master computer 138, thus permitting master computer 138 to maintain a running inventory of material.

Figure 31:
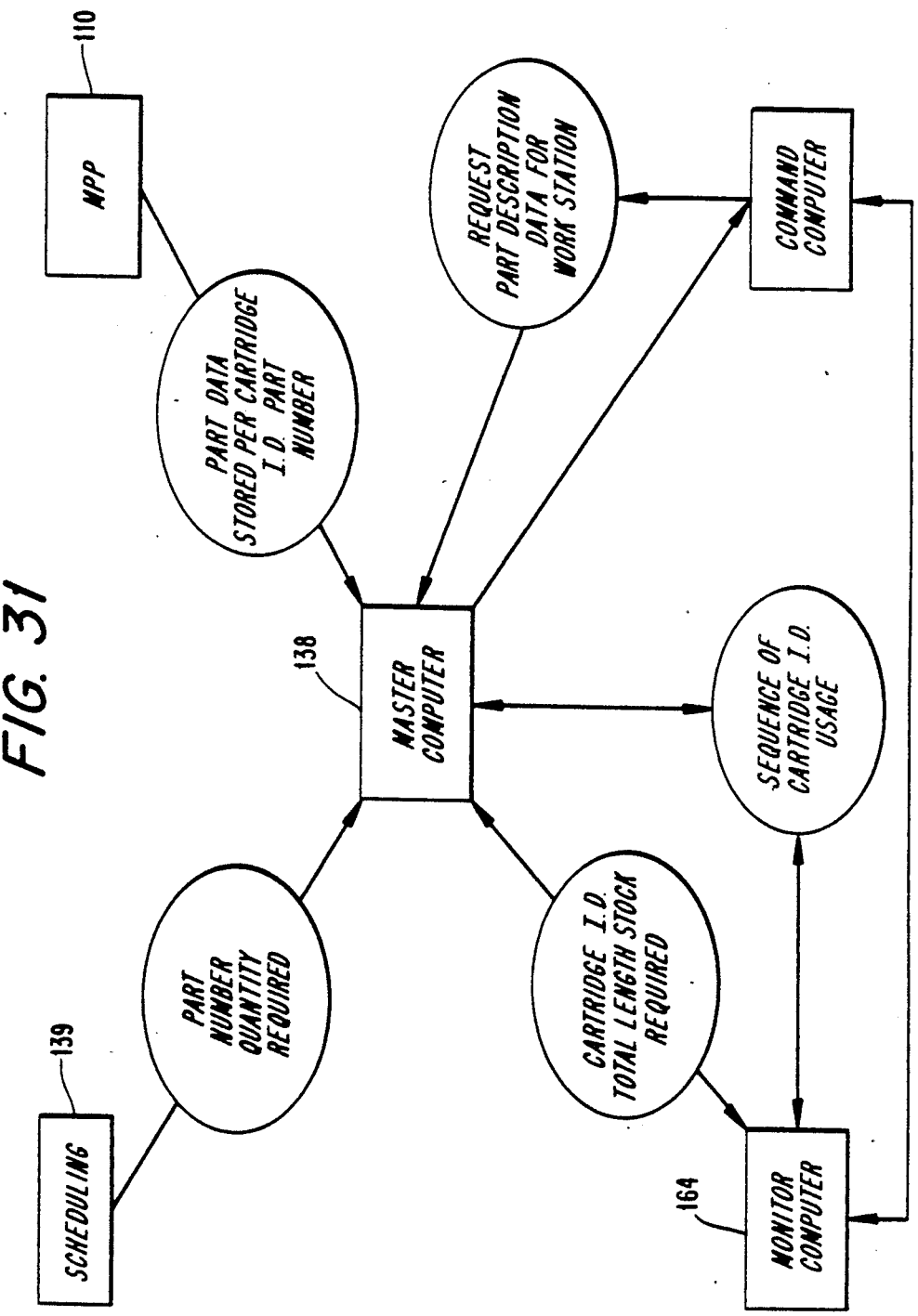
FIG. 31 is a diagram showing data flow through a master computer included in the computer system shown in FIG. 25.

Data flow between computers of MCFS 114 will now be explained, beginning with reference to FIG. 31. As can be seen therein, master computer 138 receives part number quantity information from a scheduling computer 139. Master computer 138 also receives part definition data files stored according to cartridge ID and part number from MPP computer 110. A representative part definition data file is shown in TABLE I.

TABLE I

FILE = 675-22758-3.STOR

| | | |
|---|---|---|
| 675-22758-3 | PART NUMBER | STATION |
| 7 | FILE LENGTH (LINES) | 116 FILE |
| .25 | STOCK THICKNESS (GAGE) | |
| 2.0 | WIDTH OF BLANK (INCH) | |
| 5.0 | LENGTH OF BLANK (INCH) | |
| ALUMINUM | MATERIAL TYPE | |
| 26 | CARTRIDGE I.D. NUMBER | |

FILE = 675-22758-3.SHER

| | | |
|---|---|---|
| 675-22758-3 | PART NUMBER | STATION |
| 7 | FILE LENGTH (LINES) | 118 FILE |
| .25 | STOCK THICKNESS (GAGE) | |
| 2.0 | WIDTH OF BLANK (INCH) | |
| 5.0 | LENGTH OF BLANK (INCH) | |
| ALUMINUM | MATERIAL TYPE | |
| .000 .000 .000 | REFERENCE POINT (X Y Z) | |

FILE = 675-22758-3.DRIL

| | | |
|---|---|---|
| 675-22758-3 | PART NUMBER | STATION |
| 7 | FILE LENGTH (LINES) | 120 FILE |
| .000 .000 .000 | REFERENCE POINT (X Y Z) | |
| .25 | STOCK THICKNESS (GAGE) | |
| 2.0 | WIDTH OF BLANK (INCH) | |
| 5.0 | LENGTH OF BLANK (INCH) | |
| ALUMINUM | MATERIAL TYPE | |

PARTNO/675-22758-3
RAPID
GOTO/ 3.200, 1.475 1.000
RAPID
GOTO/ 3.200, 1.475 .100
COOLANT/ON
FEDRAT/ 10.000
GOTO/ 3.200, 1 475, −.250
FEDRAT/ 60.000
GOTO/ 3.200, 1.475, .100
GOTO/ 3.200, 1.475, .100
COOLANT/OFF
RAPID
GOTO/ 2.775, 1.475, .100
COOLANT/ON
FEDRAT/ 10.000
GOTO/ 2.775, 1.475, −.250
FEDRAT/ 60.000
GOTO/ 2.775, 1.475, .100
GOTO/ 2.775, 1.475, .100
COOLANT/OFF
RAPID
GOTO/ 2.350, 1.475, .100
COOLANT/OPN
FEDRAT/ 10.000
GOTO/ 2.350, 1.475, −.250
FEDRAT/ 60.000
GOTO/ 2.350, 1.475, .100
GOTO/ 2.350, 1.475, .100
COOLANT/OFF
RAPID
GOTO/ 1.925, 1.475, .100
COOLANT/ON
FEDRAT/ 10.000
GOTO/ 1.925, 1.475, −.250
FEDRAT/ 60.000
GOTO/ 1.925, 1.475, .100
GOTO/ 1.925, 1.475, .100

FILE = 675-22758-3.ROUT

| | | |
|---|---|---|
| 675-22758-3 | PART NUMBER | STATION |
| 90 | FILE LENGTH (LINES) | 122 FILE |
| .000 .000 .000 | REFERENCE POINT (X Y Z) | |
| .25 | STOCK THICKNESS (GAGE) | |
| 2.0 | WIDTH OF BLANK (INCH) | |
| 5.0 | LENGTH OF BLANK (INCH) | |
| ALUMINUM | MATERIAL TYPE | |

PARTNO
RAPID
GOTO/−0.1250, 1.1066, 1.0000
RAPID
GOTO/−0.1250, 1.1066, 0.1000
FEDRAT/10.0000
GOTO/−0.1250, 1.1066, 0.0000
GOTO/−0.1250, 1.5750, 0.0000
CIRCLE/0.1000, 1.575, 0.0000, 0.0000, 0.0000, 1.0000, 0.2250

TABLE I-continued

GOTO/−0.1255, 1.6062, 0.0000
−0.1038, 1.6763, 0.0000
−0.0609, 1.7359, 0.0000
−0.0013, 1.7788, 0.0000
0.0688, 1.8005, 0.0000
0.1000, 1.8000, 0.0000
ARCEND
GOTO/3.8000, 1.8000, 0.0000
CIRCLE/3.8000, 1.625, 0.0000, 0.0000, 0.0000, 1.0000, 0.1750
GOTO/3.8347, 1.8019, 0.0000
3.9180, 1.7613, 0.0000
3.9702, 1.6846, 0.0000
3.9732, 1.6500, 0.0000
ARCEND
GOTO/4.3000, 1.6500, 0.0000
CIRCLE/4.3000, 1.4250, 0.0000, 0.0000, 0.0000, 1.0000, 0.2250
GOTO/4.3312, 1.6505, 0.0000
4.4013, 1.6288, 0.0000
4.4609, 1.5859, 0.0000
4.5038, 1.5263, 0.0000
4.5255, 1.4562, 0.0000
4.5250, 1.4250, 0.0000
ARCEND
GOTO/4.5250, 1.0417, 0.0000
GOTO/4.5250, 1.0417, 0.1000
RAPID

FILE = 675−22758-3.VISI

| | | |
|---|---|---|
| 675-22758-3 | PART NUMBER | STATION |
| 33 | FILE LENGTH (LINES) | 124 FILE |
| .000 .000 .000 | REFERENCE POINT (X Y Z) | |
| 1.700 | PART WIDTH (INCH) | |
| 4.410 | PART LENGTH (INCH) | |

LINE
'START − X', 3.9500
'START − Y', 1.52250
'END − X', 4.3000
'END − Y', 1.5250
ARC
START ANGLE   = ', 0.0000
END ANGLE     = ', 1.5708
'CENTER − X   = ', 3.8000
'CENTER − Y   = ', 1.6250
'START − X    = ', 3.8500
'START − Y    = ', 1.6250
'END − X      = ', 3.8000
'END − Y      = ', 1.6750
'RADIUS       = ', 0.0500

FILE = 675-22758-1.BRAK

| | | |
|---|---|---|
| 675-22758-1 | PART NUMBER | STATION |
| 18 | FILE LENGTH (LINES) | 126 FILE |
| .000 .000 .000 | REFERENCE POINT (X Y Z) | |
| .25 | STOCK THICKNESS (GAGE) | |
| ALUMINUM | MATERIAL TYPE | |
| 2.300 | PART WIDTH (INCH) | |
| 4.620 | PART LENGTH (INCH) | |

X1 = ', 0.0000
Y1 = ', 0.4800
X2 = ', 3.4000
Y2 = ', 0.4800
ANGLE TO HORIZONTAL = ', 0.0000
BUP 98 ×0 R .16 CLB '
X1 = ', −0.0000
Y1 = ', 1.9500
X2 = ', 3.9500
Y2 = ', 1.9500
ANGLE TO HORIZONTAL = ', 0.0000
BUP 98 × R .16 CLB'

Master computer 138 supplies the cartridge ID numbers and total stock length required. If the work mix has not been automatically determined by master computer 138, this is specified manually, and monitor computer 164 supplies to master computer 138 a list of cartridge ID numbers specifying the sequence in which cartridges will be loaded into MCFS 114. Master computer 138 also supplies part definition data records for each command computer 140-150 in response to request from such command computers.

Figure 32:
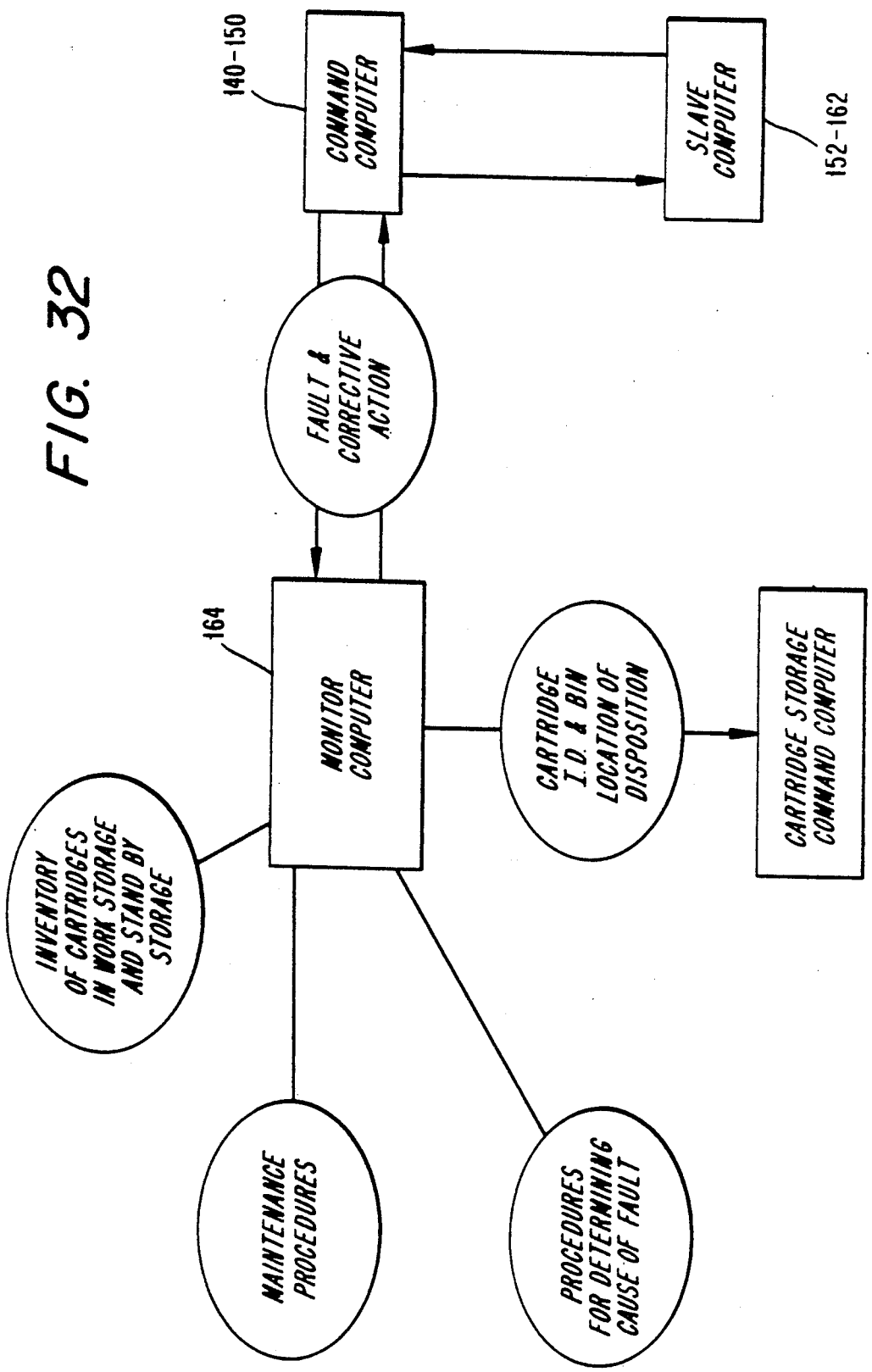
FIG. 32 is a diagram showing data flow through a monitor computer included in the computer system shown in FIG. 25.

Data flow through monitor computer 164 is shown in FIG. 32. Data, including an inventory of cartridges for use in in-work storage and stand-by storage, may be displayed by monitor computer 164. Monitor computer 164 includes a set of maintenance procedures to be performed in the event of faults in system 100, and a set of diagnostic procedures for determining the cause of faults called to the attention of monitor computer 164.

When a slave computer 152-162 detects a fault, it transmits this information to its respective command computer 140-150 which in turn transmits the fault data to monitor computer 164. Through either manual or automatic initiation, monitor computer 164 then supplies instructions for corrective action to command computer 140-150 or through command computers 140-150 to the respective slave computers 152-162 to perform corrective procedures.

Figure 33:
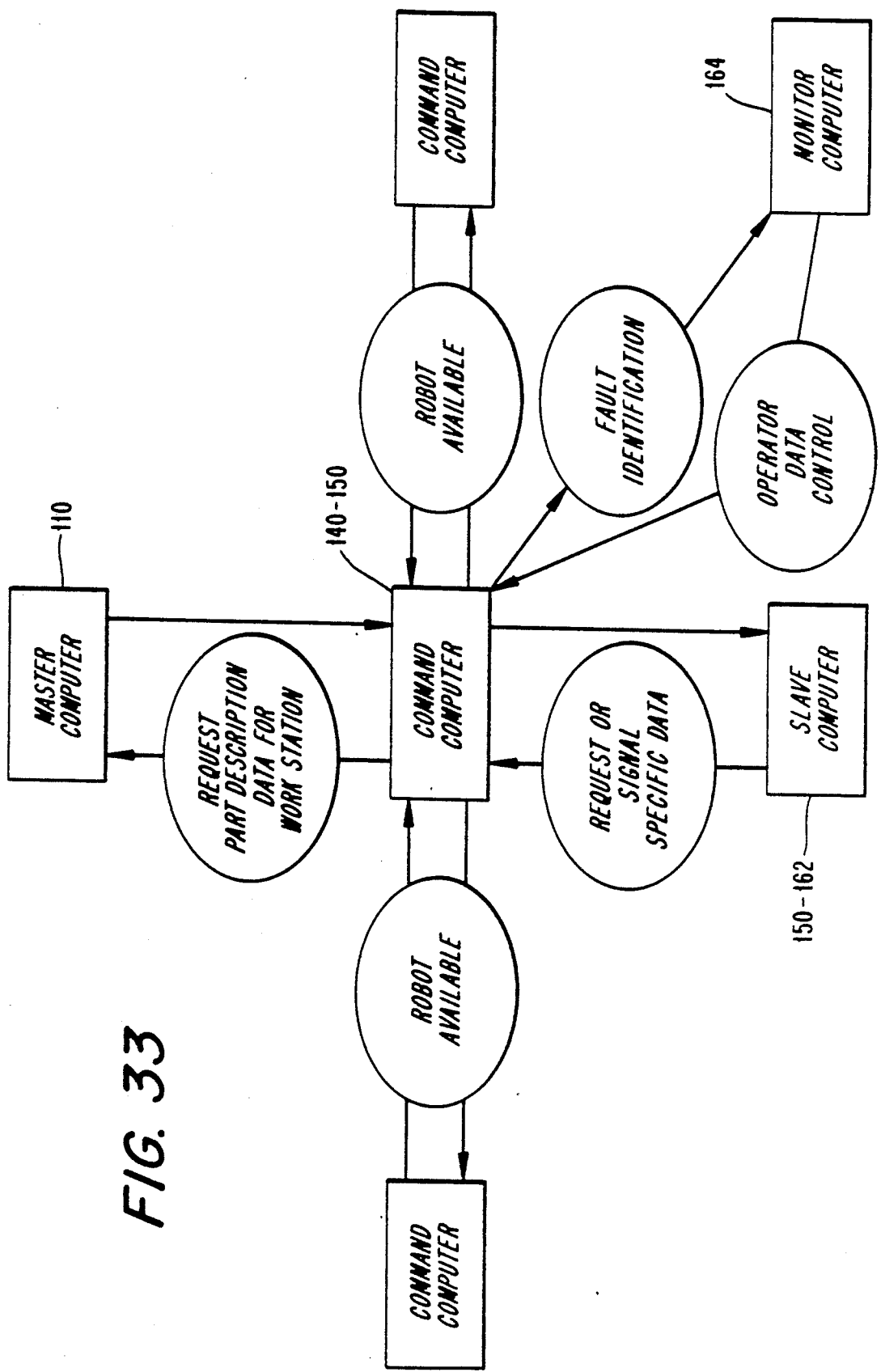
FIG. 33 is a diagram showing data flow through a command computer included in the computer system shown in FIG. 25.
Figure 34:
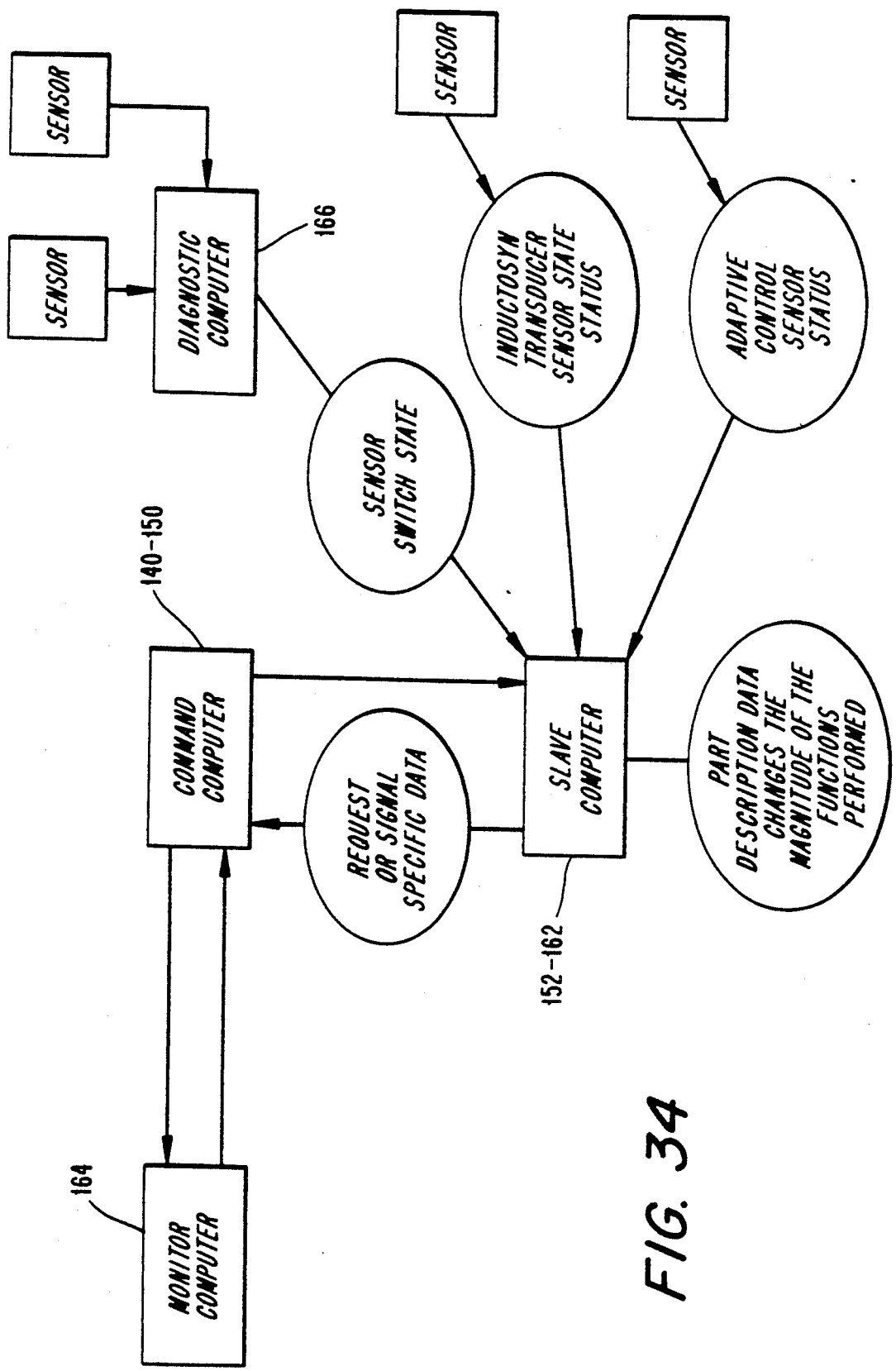
FIG. 34 is a diagram showing data flow through a slave computer of the computer system shown in FIG. 25.

Data flow in command computers 140-150 is shown in FIG. 33. In response to a request, master computer 138 supplies part definition data records to command computer 140-150. Slave computers 152-162 then request specific information from part definition data records stored in command computers 140-150. In addition, command computers 140-150 transmit "robot available" data between preceding and succeeding command computers 140-150.

Command computers 140-150 supply fault identification data to monitor computer 164. Monitor computer 164 supplies operator data control commands to command computers 140-150.

Figure 42:
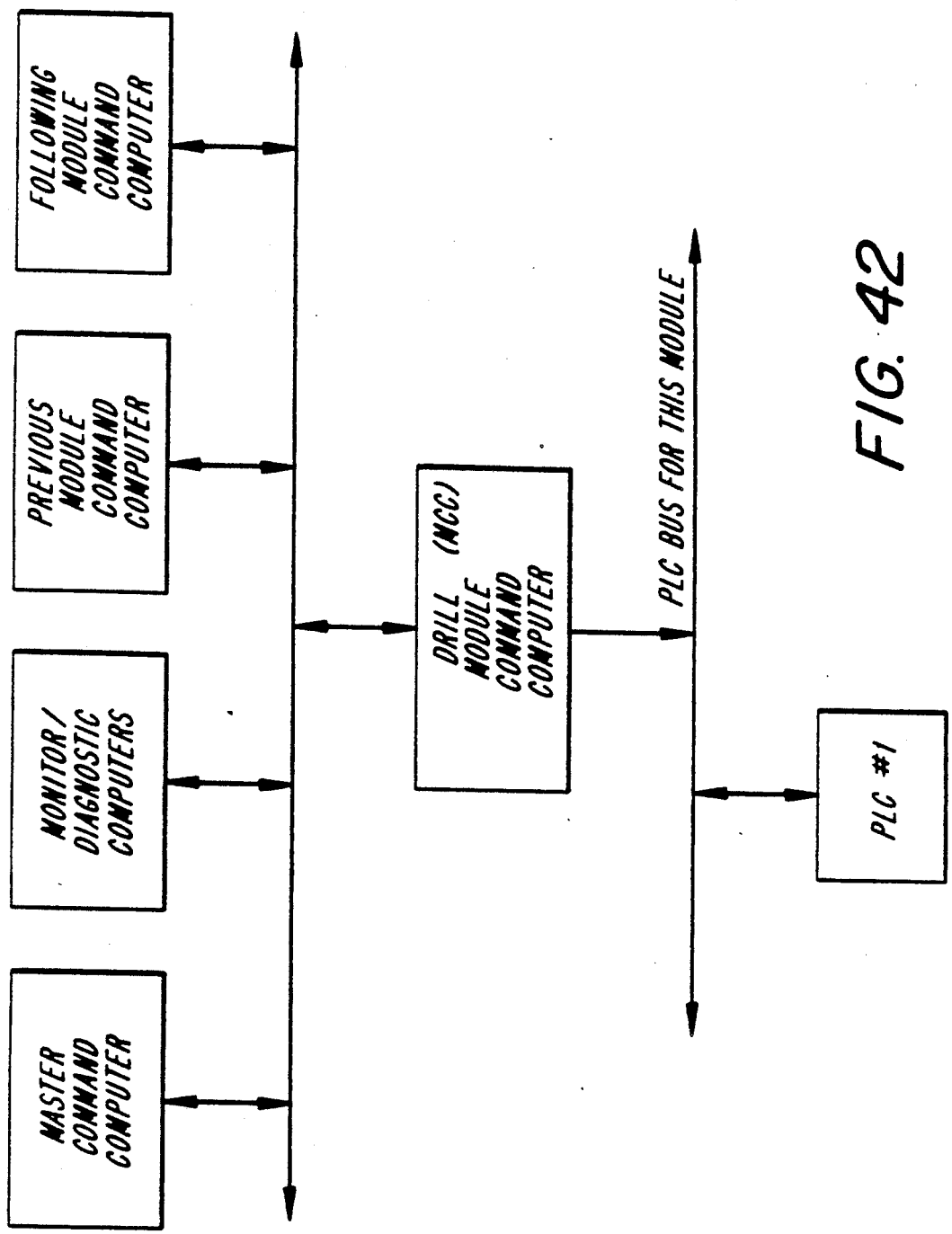
FIG. 42 is a diagram showing the sources and destinations of input and output to and from the command computers of computer system of FIG. 25.

Data flow in slave computers 152-162 is shown in FIG. 42. Slave computers 152-162 request from command computers 140-150 information relating the specific manufacturing operations to be performed on the next workpiece being supplied to the associated manufacturing station 116-126. This information is generated by command computers 140-150 from part definition data records and from generic manufacturing procedures stored in command computers 152-162. The combined data is used by command computers 152-162 to generate signals which specify the type and magnitude of operations to be performed by the associated manufacturing station. A generic manufacturing procedure is a qualitative machining operation such as "position the cutting head." Command computers 140-150 combine such generic procedures with information from the part definition data records to generate signals which direct the associated manufacturing station to perform an operation such as "position the cutting head to the location specified by 1.7200, 12.1515."

During performance of such manufacturing operations, output from sensors such as limit switches are supplied either directly, or to slave computers 152-162 through diagnostic computer 166, along with signals generated by Farrand inductosyn transducer sensors which monitor the position of various movable mechanisms in MCFS 114. In some applications status of specified sensors, including control sensors and electronic positioning sensors, may also be supplied directly to slave computers 152-162. This information is compared to normative data stored in command computers 140-150 or slave computers 152-162. If an out-of-limits condition is detected, the state and identification of the out-of-limits sensor is supplied to diagnostic computer 166.

Figure 35:
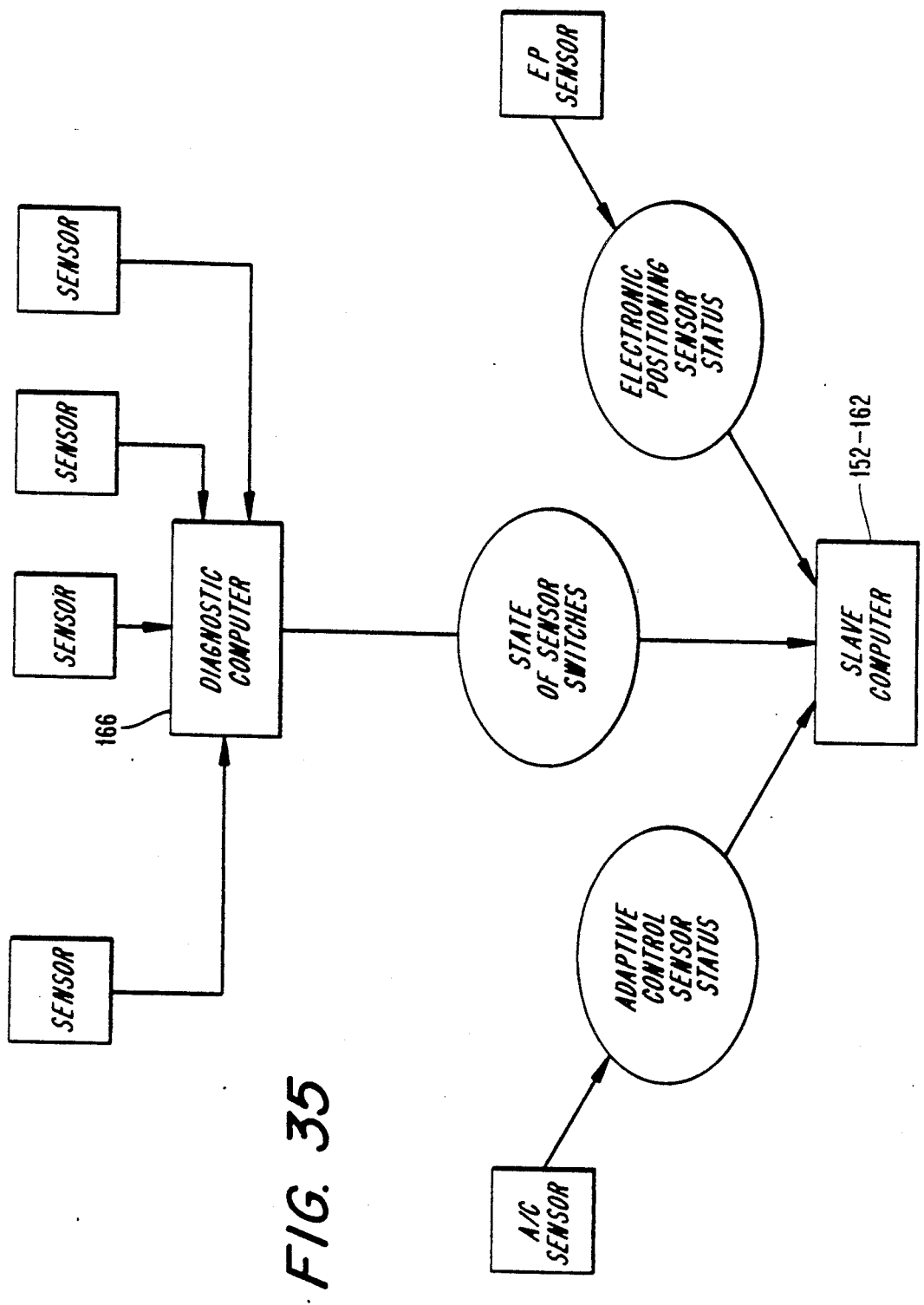
FIG. 35 is a diagram showing data flow through a diagnostic computer included in the computer system shown in FIG. 25.

Data flow for diagnostic computer 166 is shown in FIG. 35. As can be seen therein, information from adaptive control sensors and electronic positioning sensors, such as Farrand Inductosyn devices, is supplied to slave computers 152-162 to detect out-of-limits conditions. In addition, diagnostic computer 166 supplies a state of sensor switches to slave computers 152-162. Under certain conditions slave computers 152-162 may also supply signals to activate the sensors.

The software for system 100 will now be described. There are three groups of software: 1) Software which is external to MCFS 114, including a Manufacturing Process Program and a CAD Data Extractor (CDE); 2) Software internal to the MCFS, including software which runs on the master computer, a diagnostic computer, monitor computer, command computer, and slave computer; and 3) communication software.

Referring now to the first group of software, the CDE obtains CAD geometric and attribute data from CAD data files and supplies them to the Manufacturing Process Program. The Manufacturing Process Program distributes the information into subfiles and adds additional information required to actually manufacture a part. The Manufacturing Process Program then combines all of the subfiles into one overall workpiece part definition data file and downloads the overall file to MCFS 114. This file contains all of the generic and specific information needed by the MCFS station to manufacture the workpiece which the file represents. The Manufacturing Process Program, in the preferred embodiment, resides in the CAD system computer 103, but this is not a requirement. CAD system computer 103, in the preferred embodiment comprises an Apollo type DN3000 computer.

Before describing the software of system 100, some background information will be provided regarding computer-aided design.

CAD computers generally produce three types of files: Type A, Type B, and Type C files. Type A files consist mainly of numeric data. They are created by the CAD system while a new drawing is being developed and are a record of what the design engineer is displaying on CRT screen of the system. For example, if the design engineer creates a line on the input screen 104 by some manipulation of a cursor, the CAD computer will store that information in a Type A file.

For illustration, a line may be stored by saving the x-, y-and z-coordinates of its end points. The line per se is not stored, but rather a set of numbers and an indication that those numbers represent a line. Stored with those numbers is a series of attributes, such as how the line was created, whether it is dotted or solid, whether it is part of a set, and its color.

When the CAD user has completed his electronic drawing, all of the newly created elements (lines, points, curves, text) are stored in a Type A file together with an identifying name. At some later time, the design engineer will specify that name so that he can re-display the original electronic drawing. The CAD system will retrieve the appropriate Type A file and, using the information within it, will recreate the original drawing on the CRT screen or other output display device.

Type A files are thus created and used only by the CAD computer itself. They are designed to be as efficient as possible in that closed environment and are usually not used for any other purpose.

Type B files are files created by the CAD computer system to be read by external users and are in a form easily readable by humans or by other mechanisms. Usually they are only output from the CAD system and are not read again by the CAD system.

Type B files are conventionally used to transmit workpiece geometry to numerically controlled (N/C) machines and are called Cutter Location or Centerline Location (CL) files. In most cases, the information consists of geometric cutter tool locations. In the case of profile CL files, the information does not directly locate the part profile directly, but rather locates a locus of points which are offset from the true part profile by some fixed amount to account for radius of the cutter.

Even at this stage, Type B information may not be directly usable. When the CAD system is created, it is not possible to determine what machine tools are to be driven by the Type B files output from the CAD system. Type B files are thus generated in a generic, standard form. It is the responsibility of the design engineer to pass type B files through an additional processing mechanism, known as a post-processor, to tailor the data to the specific machine tool being used.

Type B post-processed information is then sent to designated machine tools to be used to perform designated manufacturing functions. However, most machine tools require more information to operate than is contained in their respective CL files.

The purpose of the MPP is to provide this additional information by obtaining it directly from Type A CAD files or by determining it implicitly by combining Type A information with procedures within the manufacturing process program, or in exceptional cases, from human input. It is possible to include within the MPP enough software logic to directly access the appropriate CAD data files and obtain the required geometric part information. However, in the preferred embodiment, tools already available in CAD software are used to extract the required data. The MPP then combines this information with other data, to be discussed below, in order to create the final required MCFS part definition data files. The software which extracts the data is called the CAD Data Extractor. The data files which it creates are the type C files discussed above. These files are the interface between the CAD system type A files and the MPP.

The CDE is written in a format provided by the CAD system. In the preferred embodiment using an Apollo CAD system, the CDE is written in the AGILE language.

Figure 36:
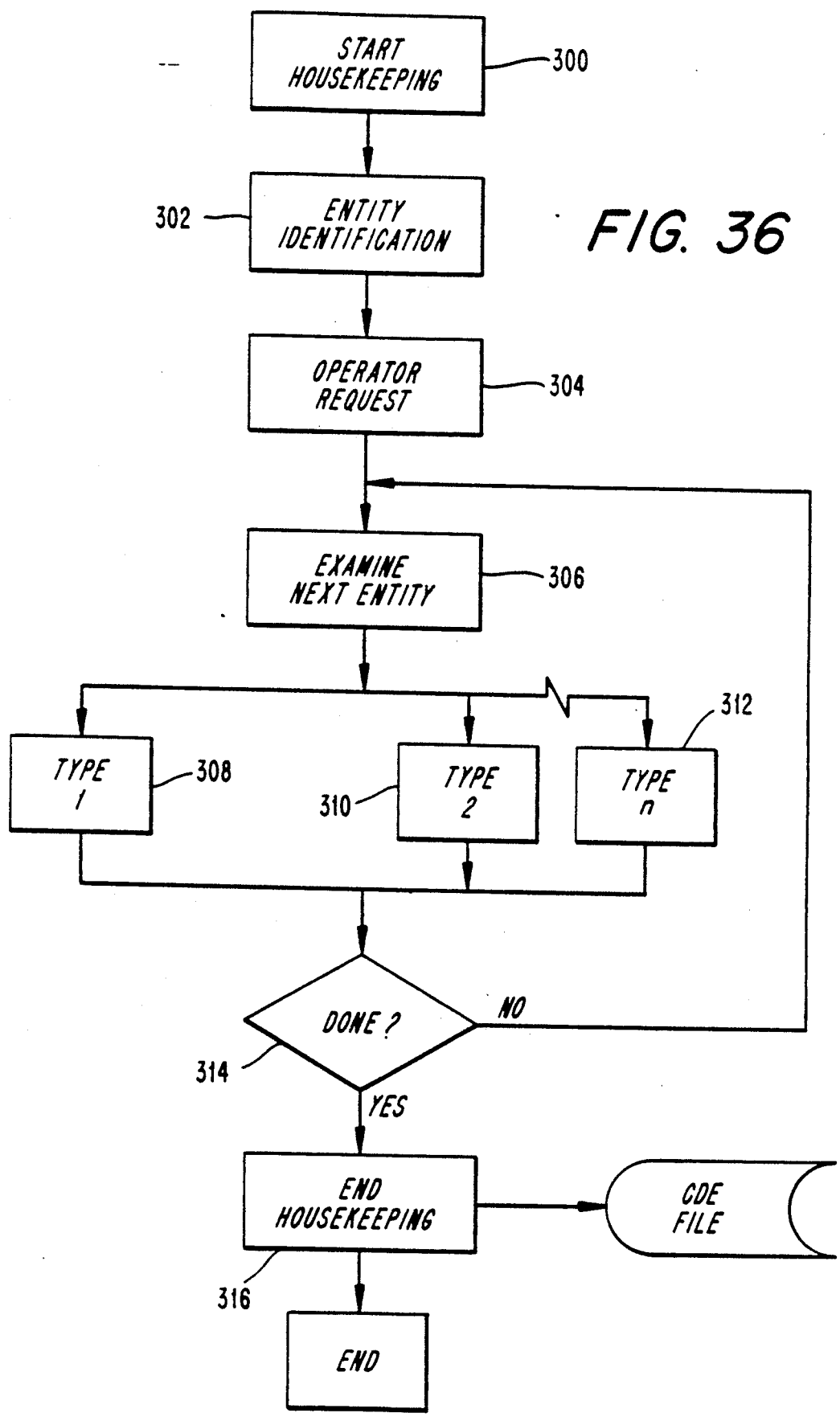
FIG. 36 is a logic flow diagram of a CAD Data Extractor program of the computer system of FIG. 25.

The logic flow of the CDE is shown in FIG. 36. The program is serial and executes in a linear fashion except to continue looping until all entities are evaluated.

The stepwise logic flow is as follows:
Housekeeping (block 300). This section opens relevant files, sets constants, and performs startup and other required bookkeeping functions.
Entity Identification (block 302)—This section requests the operator to input the desired part number and revision code and whatever other BMAC assigned information is necessary to identify the part.
Operator Request (block 304). This section requests the CAD operator to display the desired view of the part to be processed and to indicate on the CRT screen what area of the electronic drawing is to be examined. In the preferred embodiment, this will include the complete drawing.
Examine Next Entity (block 306). This section causes "AGILE" to examine each entity in turn within the indicated area and stores all of the relevant information about that entity as a data record. In this context an entity is a single individual element in the electronic representation of the drawing of the part, such as a line, an arc, a point, or a block of text. Each of the elements is classified by type. For example, points may be classified as type 5 and curves may be classified as type 8. The CAD system automatically assigns the correct type number to each element as it is defined by the CAD operator.
Done (Block 314). This section checks to see if any entities remain to be evaluated. If so, repeat. If not, continue.
End Housekeeping (Block 316). This section housekeeping necessary to close Input/Output files.

The result is a complete file, in ASCII format identified by some ID (preferably the workpiece part number), which is stored within the CAD data file system.

Relating this to the information which would eventually be sent to drill station 120, an example of the relevant data produced by CAD computer 103 can be seen in FIG. 37.

The MPP combines the output type C files from the CDE with additional data which the MPP creates. This data consists of information such as length of the blank to be sheared at the shear station, and robot vision inspection information. Essentially this data is the remainder of the manufacturing information needed to process the parts. Thus the MPP performs the functions of a "Process Planner" between the design of the workpiece and the actual machinery which will machine and manipulate the raw material. In effect, the procedure is the same as in manual process planning.

A large number of widely diversified workpieces can be processed through MCFS 114. However, the individual manufacturing processing is essentially the same for each workpiece.

The MPP outputs a series of data records, one for each of the relevant MCFS modules. Each set of records, or part definition data file, is identified by a 'set' ID, consisting of the workpiece part number and any other identifier required, such as revision level. Any other uniquely recognized name could, of course, be used. Within a file, records are identified by the file ID prefixed by an MCFS station ID. Each record contains all of the specific information about a workpiece which the corresponding MCFS station needs to perform manufacturing functions.

Figure 38:
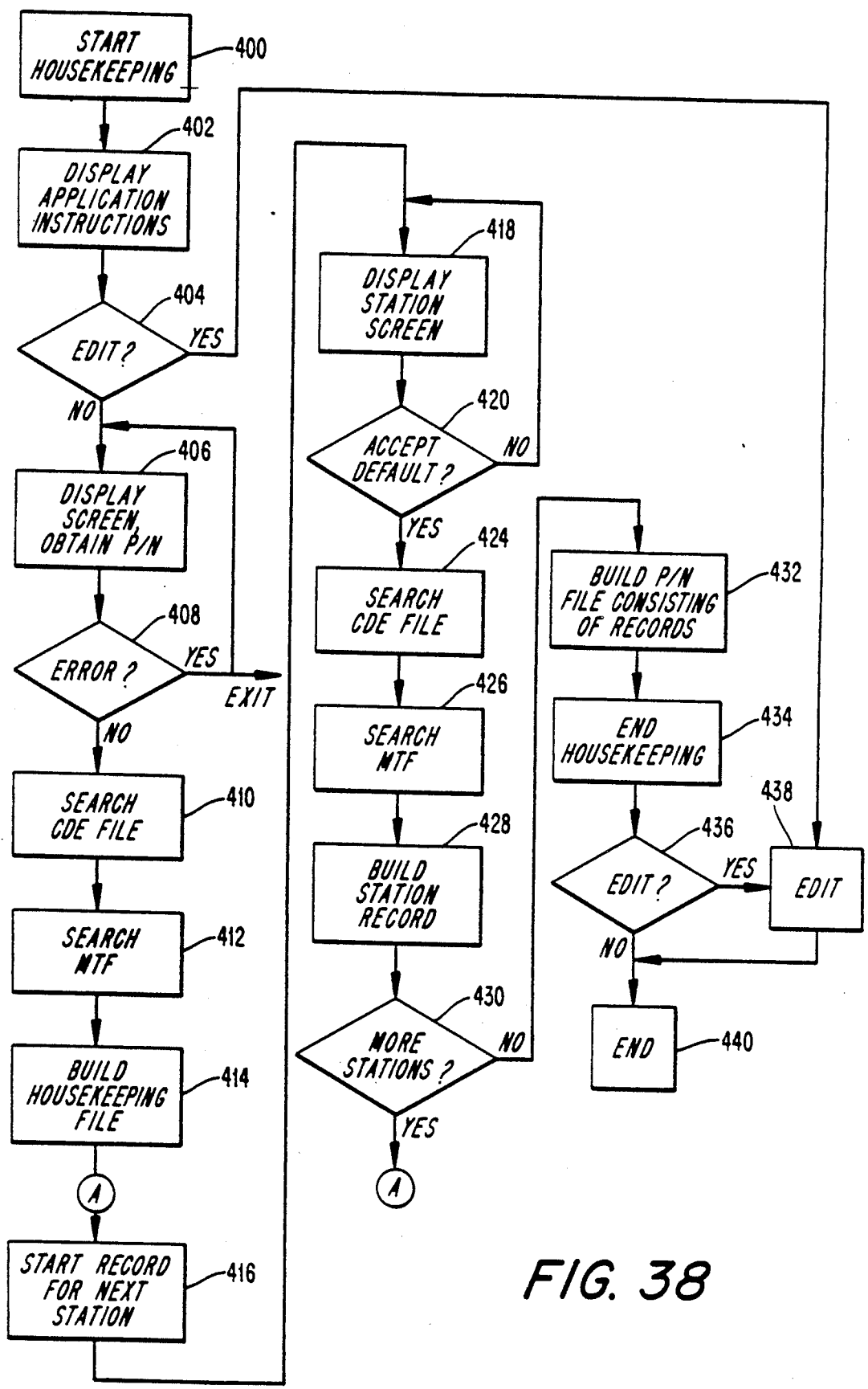
FIG. 38 is a logic flow diagram of a Manufacturing Process Program executing in a manufacturing process program computer of the computer system of FIG. 25.

A logic flow chart of the manufacturing process program is shown in FIG. 38. General housekeeping functions are formed at block 400 and application instructions are displayed at block 402. At block 404, a decision is made whether to generate a new file or to edit an existing file. If a new file is to be generated, a part number is entered and a screen of data for this part number is generated at block 406. If a part number error is detected at block 408, a request is made for a corrected part number.

If no error is detected, a file is retrieved for this part member which was generated by the CAD data extractor. Next, at block 412, a file is retrieved for this part number which was generated by a manufacturing technology file (MTF) program, which contains additional manufacturing data necessary to fabricate the part, but which was not entered by the design engineer through the CAD system. Examples of such data include, for the shear station, cartridge ID, blank length, and dimension from "x" coordinate of part to shear; for the drill station, coolant requirements and hole size (if different size is required for manufacturing); for the profile station, feeds, speeds, and identification of outrigger clamps and position relative to "y" coordinate of part; for the vision station, selected "y" dimensions relative to the "x" coordinate of the part, related "x" dimensions of profile and hole locations, and their diameters and relative camera position; and for the brake station, robot gripper identification for RH, LH grippers, robot identification, direction to prepare to rotate part and direction of rotation, degree of part rotation, and gripper location relative to the intersection of x-y coordinates of the part.

A housekeeping file is then generated containing information such as general routing notes, traceability requirements, and management information requirements.

The manufacturing process program then begins to generate a part definition data record for the first MCFS station at block 416. At block 418, a screen of data for this station is generated. The operator then has the option at block 420, whether to accept predefined default values or to enter overriding values into the display screen. At block 424, relevant data from the CDE file for this part number is extracted. At block 426, similar data from the MTF file is extracted. The station record is then generated at block 428. A check is made at block 430 if additional station records must be constructed. If so, the program loops back to block 416 to generate the next station record.

If all station records have been generated, the manufacturing process program links the records together at block 432 to form a part definition data file for this part number. General file housekeeping is performed at block 434 and the operator is given a chance to edit the material at block 436. If editing is desired, an edit procedure is performed at block 438. The manufacturing process program ends at block 440.

The second group of software consists of MCFS control software which resides in master computer 138, diagnostic computer 166, monitor computer 164, command computer 140-150, and slave computers 152-162. Software of master computer 138 performs the following functions:

- Accepts new part definition data files from the external MPP and stores them in memory.
- Accepts schedule information either manually through monitor computer 164 or automatically from a scheduling computer.
- Accesses appropriate part definition data files from memory and downloads the relevant part definition data records for a given part to the appropriate MCFS stations 116-126.
- Passes management information, such as equipment condition, raw material requirements, workpieces completed, etc. to external shop networks.
- Acts upon alarms or other non-ordinary conditions not taken care of elsewhere.

Figure 39:
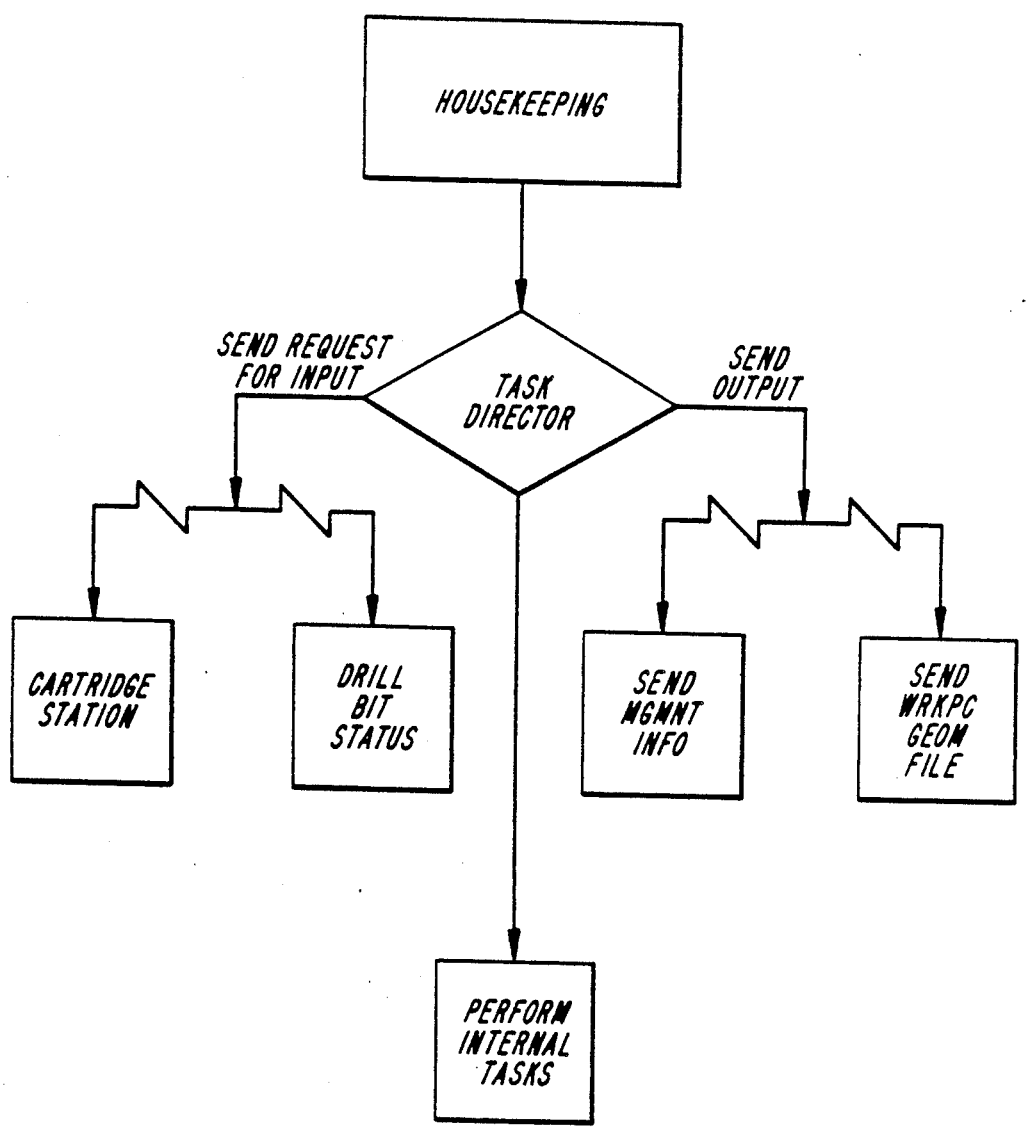
FIG. 39 is a logic flow diagram of software executed in the master computer of the computer system of FIG. 25.

All of these tasks are straightforward data processing tasks and are performed by the logic shown in FIG. 39.

Housekeeping refers to standard housekeeping functions performed during startup (such as initial memory check, general startup diagnostic, etc.). Since master computer 164 is in continuous operation, this function will be executed infrequently.

The Task Director section acts under either of two conditions: (1) Those in which it initiates sequences of activities under its own volition, or (2) those in which some external event calls for action. The actions to be taken are stored in tables resident in the master computer program, with the table entries being a function of the task to be done. As shown in FIG. 39, the task director has three functional outputs.

(1) Send a request to receive input, for example raw material status in cartridge station 116. Although only cartridge station 116 and drill station 120 are indicated in FIG. 39 as receiving requests for input from master computer 164, all stations 116-126 may receive such requests.

(2) Send output to some location, for example, read the number of workpieces of a specific part number to be produced today to stations needing this information.

(3) Internal data processing, such as file updating.

In all cases, the output is either standard (i.e., part definition data records downloaded to the various stations as required by current workpiece fabrication requirements) or non-standard (i.e., alarm information or alarm rectification). If a standard activity is being processed, the Task Director proceeds according to installed table sequences for background activity. It also proceeds according to installed table sequences for foreground or nonstandard events, but these procedures are initiated by responses to interrupts generated by external signals.

Diagnostic computer 166 and monitor computer 164 perform the functions previously described using standard table driven event processing software.

Figure 40:
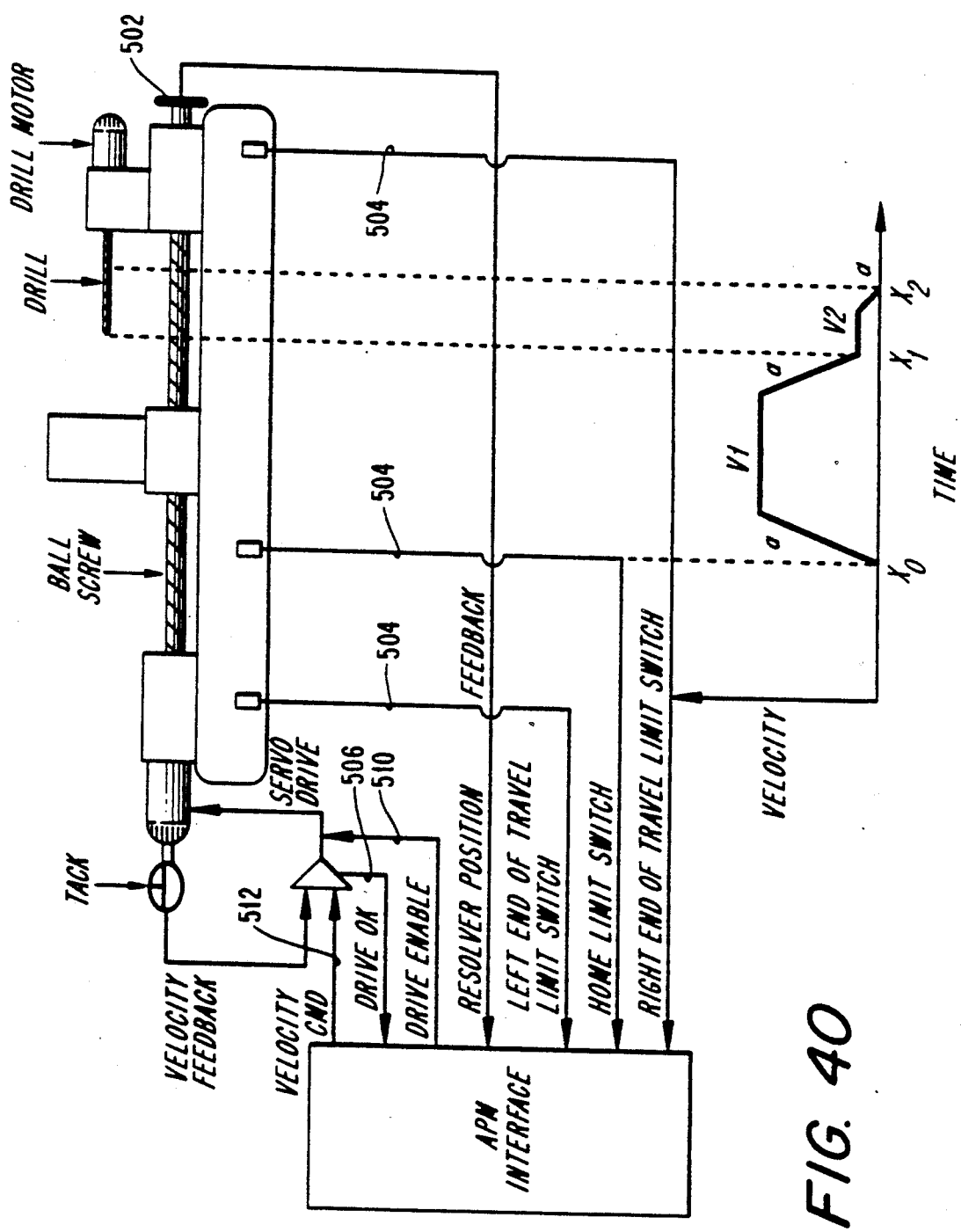
FIG. 40 is a diagram illustrating apparatus of the drill station of the microprocessor-controlled fabrication system of FIG. 24.

The software architecture of command computers 140-150 and slave computers 152-160 consists of a series of levels of function. The first level is the lowest level in the process, that is, the activation of the machine tool itself. FIG. 40 shows an example of apparatus controlled by the lowest function level, consisting of apparatus controlling mechanisms of drill station 120.

In the preferred embodiment, slave computers 152-162 each comprise a programmable logic controller (PLC) driving a plurality of axis positioning modules (APMs). The PLC and the APMs are commercially available from the Allen Bradley Corporation. Each APM consists of a circuit board which receives location information from sensors such as a resolver position sensor 502, limit switches 504 and drive signal feedback 506, and produces output signals including drive enable signal 510 and velocity command 512.

Figure 41B:
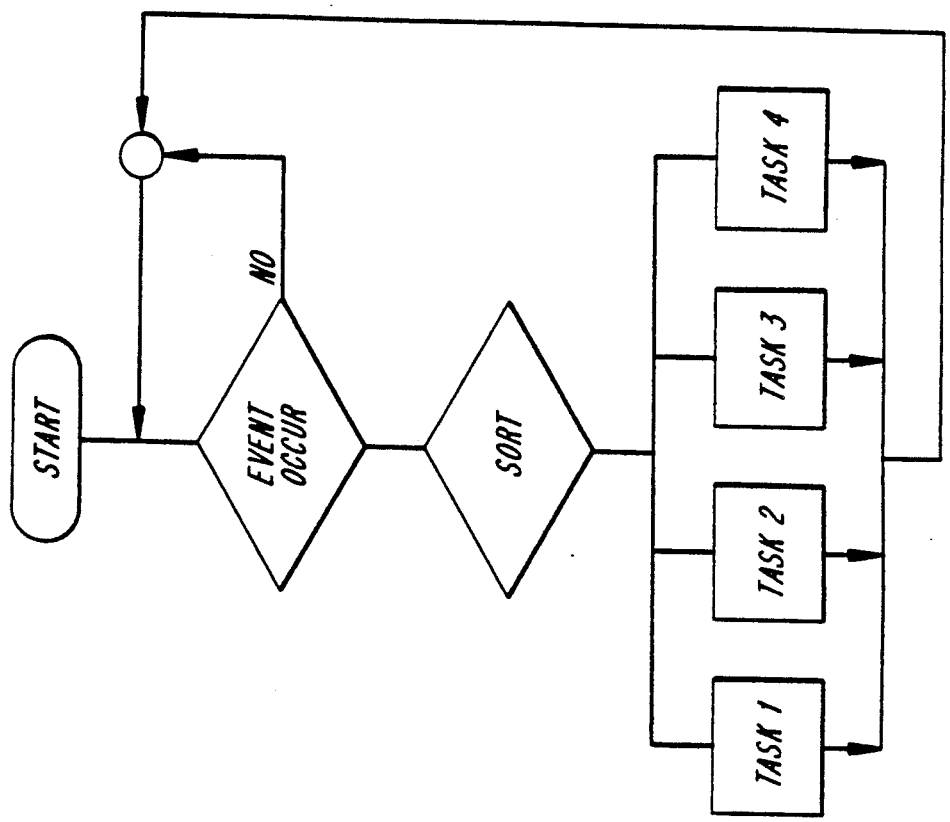
FIGS. 41A and 41B are logic flow diagrams of software executed in the slave computers in the system of FIG. 25.
Figure 41A:
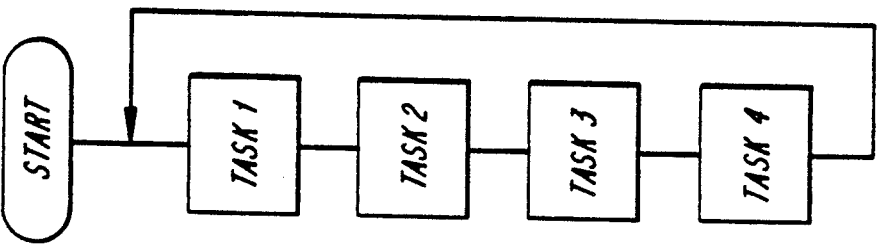

Each PLC of a slave computer 152-162 is programmed in the form shown in FIGS. 41A and 41B, as a step-wise sequential logic flow. Tasks are always executed in the same sequence. Specific programming consists of tasks unique to each mechanism of each station, such as "actuate drive mechanism of robot 134." Programming is performed in standard language specified by the manufacturer of the APM and is well known to those skilled in the art.

FIG. 42 shows the sources and destinations of the input and output to and from command computers 140-150. The information pathways are in both directions, and are asynchronous and stochastic. Command computers 140-150 are programmed as state machines, wherein each computer can assume different states as a result of different conditions or combinations of conditions.

For example, assume there is a collection of stages designated $S_1$, $S_2$, $S_3$ . . . To move from one state, e.g., $S_2$, to another state, e.g. $S_3$ requires a condition, e.g., $C_3$, and a related set of actions to be performed, e.g., $a_2$, $a_3$ and $a_5$. This sequence can be represented as a state table. The entry in a state table which might represent the above mentioned example is as follows:

| STATE | CONDITION | ACTIONS | NEXT STATE |
|-------|-----------|---------|------------|
| , | , | , | , |
| , | , | , | , |
| , | , | , | , |
| $S_2$ | $C_3$ | $a_2, a_3, a_5$ | $S_3$ |
| , | , | , | , |
| , | , | , | , |

For example, assume that a command computer has just received information that the workpiece in its station has been successfully processed and has been transferred to the next module, and that this status represents state $S_2$. Let state $S_2$ have two conditions associated with it, the first condition being designated $C_3$, which is the condition that if the next workpiece has been finished in the previous station, processing should be started to bring the workpiece into this station. Such processing requires action $a_2$, $a_3$, and $a_5$. The other condition, $C_7$, has only one action associated with it, $a_9$, which might be a wait action. Note that in the latter action, the transition between states is a transition back to $S_2$ itself, and this transition is repeated until the next workpiece is ready.

The condition tests and the actions themselves are programmed in the form of subroutines called as needed. Pointers to the required sequences of subroutines are contained in tables which can be represented exactly as the state table structure previously discussed. A program is thus written as a series of subroutines intrinsically independent from each other and interconnected only by software being driven by tables.

The above exposition describes the procedural control of the application software, that is the qualitative aspect. The qualitative elements are table addresses which point to subroutines that perform functions such as "move the table" or "change the Drill Bit." The remaining required data is quantitative, namely the workpiece characteristics. The subroutines need quantitative data, such as how far to move the table or what size drill bit to select. This data is obtained from part definition data (PDD) records previously discussed. In general, PDD records are one of three types:

(1) A predetermined code indicating that no further action is to be taken, for example that there are no more holes to be drilled,
(2) The actual x-, y-, and z-location to which the drill must be moved, or
(3) Coded information to be passed to the PLC to allow it to determine by itself what to do. An example might be to perform circular interpolation on a bolt-circle arc.

Figure 43:
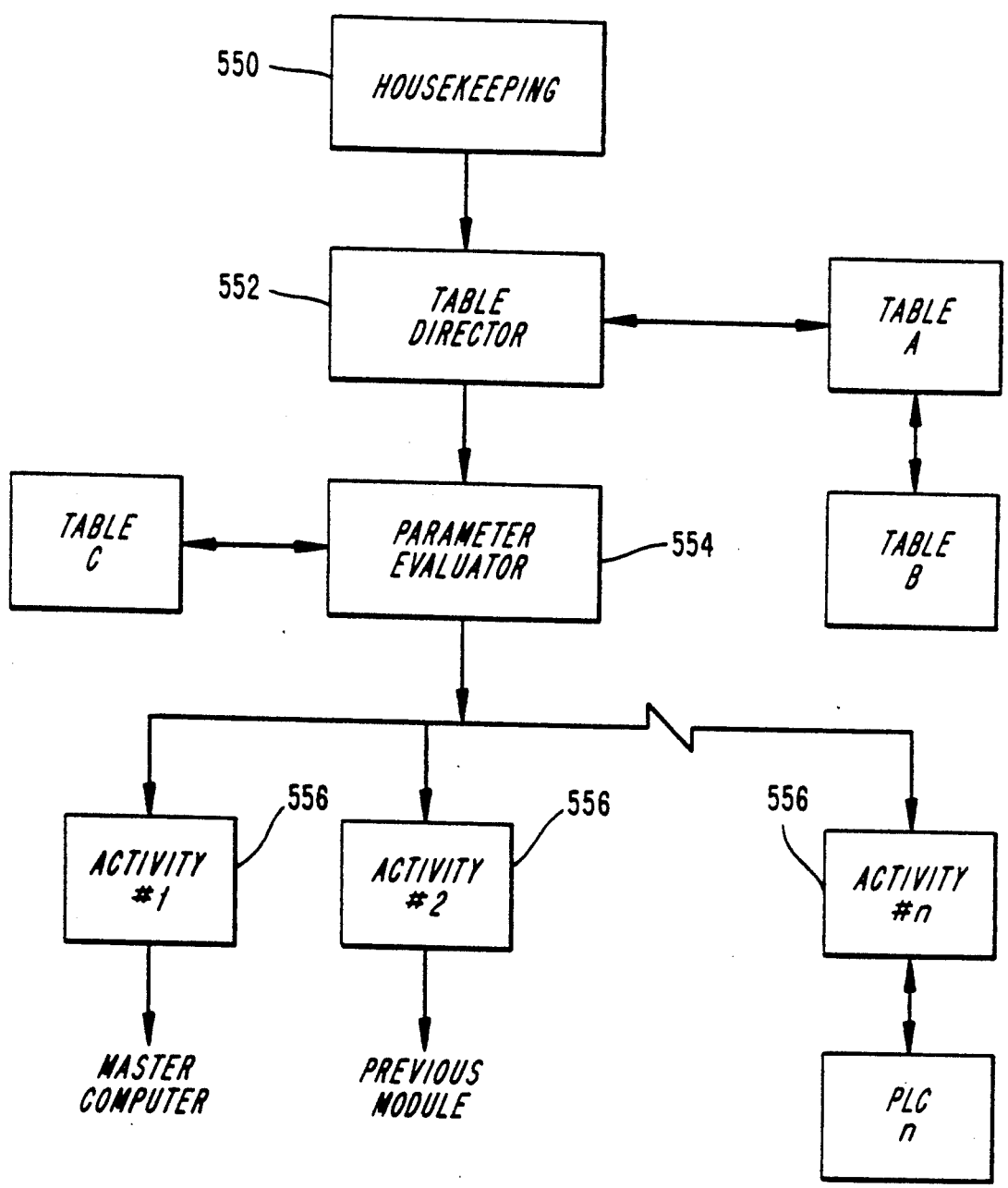
FIG. 43 is a logic flow diagram of software executing in the command computers of the computer system of FIG. 25.

A generic flow chart of a command computer program is shown in FIG. 43 as a table driven structure.

At block 550 standard housekeeping is performed. Control is then passed to a Table Director at block 552, which performs the relevant table lookups to determine the next operation. If required, the Table Director, as determined by a parameter evaluator at block 554, will also search in Table C to obtain Part Definition Data records. Depending upon the table information, control is passed to the appropriate activity subroutine, which then performs its function. The process is continuous such that when a given activity is complete, control is passed back to the Table Director.

As an example of the logic flow of operations generated by the software of command computers 140-150 and slave computers 152-162, a description of the operation of drill slave computer 156 and drill command computer 144 will now be provided. The operation of other slave computers 152, 154, 158, 160, and 162 and other command computers 140, 142, 146, 148, and 150 is similar; thus a detailed description of such other slave and command computers will not provided.

Drill station 120 includes a plurality of sensors such as limit switches and servo position indicators. As a general statement of operation of drill station slave computer 156, when a sensor of drill station 120 changes state, a table look-up is performed by drill station slave computer 156 to find a table entry containing a set of sensor states corresponding to the current state of all sensors connected to drill station slave computer 156.

When a match is found between the current state of sensors at drill station 120 and the set of sensor states stored in a table entry, drill station slave computer 156 performs the action specified in the respective table entry. The actual form of the table entries and the specific programming implementation will, of course, depend on the hardware chosen to perform the function of drill station slave computer 156.

The operation begins with a requirement to place a workpiece at drill station 120, as indicated by the following table entries each representing a state of limit switch sensors, in which sensors are indicated by a state abbreviation followed by a sensor identification. For example, the notation "OP-D003" indicates that sensor switch identified as D003 is in the open state. The notation "*CL-D074" indicates that sensor switch D074 has changed state to a closed state.

PLACE workpiece on drill station

| OP-D003 | CL-D046 | CL-D063 |
|---------|---------|---------|
| CL-D004 | OP-D047 | OP-D074 |
| CL-D005 | OP-D048 | |
| CL-D006 | OP-D049 | |
| CL-D007 | CL-D054 | |
| OP-D008 | OP-D055 | |
| OP-D009 | CL-D057 | |
| OP-D010 | OP-D058 | |
| OP-D011 | CL-D062 | |

Drill station open:
When the drill station is open, the drill slave computer requests the width of blank for the next part.

| OP-D003 | CL-D046 | CL-D063 |
|---------|---------|---------|
| CL-D004 | OP-D047 | OP-D074 |
| CL-D005 | OP-D048 | |
| CL-D006 | OP-D049 | |
| CL-D007 | CL-D054 | |
| OP-D008 | OP-D055 | |
| OP-D009 | CL-D057 | |
| OP-D010 | OP-D058 | |
| OP-D011 | CL-D062 | |

Workpiece width same as last drilled:
Upon receiving the width of workpiece, the drill slave computer searches its memory for the stock width last drilled. If it is the same as the workpiece last drilled, the drill slave computer proceeds to a drilling operation.

| | | |
|---|---|---|
| OP-D003 | CL-D046 | CL-D063 |
| CL-D004 | OP-D047 | OP-D074 |
| CL-D005 | OP-D048 | |
| CL-D006 | OP-D049 | |
| CL-D007 | CL-D054 | |
| OP-D008 | OP-D055 | |
| OP-D009 | CL-D057 | |
| OP-D010 | OP-D058 | |
| OP-D011 | CL-D062 | |

Workpiece width different than last piece drilled:
DRIVE D073D

Upon receiving the width of workpiece to be drilled, the drill command computer compares the width of stock last drilled, and, finding it different, commands the drill slave computer to actuate DRIVE D073D to go to home position, closing home sensor switch D074.

| | | |
|---|---|---|
| OP-D003 | CL-D046 | CL-D063 |
| CL-D004 | OP-D047 | *CL-D074 |
| CL-D005 | OP-D048 | |
| CL-D006 | OP-D049 | |
| CL-D007 | CL-D054 | |
| OP-D008 | OP-D055 | |
| OP-D009 | CL-D057 | |
| OP-D010 | OP-D058 | |
| OP-D011 | CL-D062 | |

Position workpiece holder:
D073FB
DRIVE D073D

Upon receiving a signal from home sensor switch D074 and linear feedback from D073FB, the drill slave computer commands DRIVE D073D to position the workpiece holder, opening home sensor switch D074.

| | | |
|---|---|---|
| OP-D003 | CL-D046 | CL-D063 |
| CL-D004 | OP-D047 | *OP-D074 |
| CL-D005 | OP-D048 | |
| CL-D006 | OP-D049 | |
| CL-D007 | CL-D054 | |
| OP-D008 | OP-D055 | |
| OP-D009 | CL-D057 | |
| OP-D010 | OP-D058 | |
| OP-D011 | CL-D062 | |
| SFSB01 | | |
| SFSB02 | | |

Upon receiving linear feedback from D073FB and signal from open sensor switch D074, the drill slave computer commands failsafe brakes SFSB01 & FSB02 on Robot #2 to open.

| | | |
|---|---|---|
| OP-D003 | CL-D046 | CL-D063 |
| CL-D004 | OP-D047 | OP-D074 |
| CL-D005 | OP-D048 | |
| CL-D006 | OP-D049 | |
| CL-D007 | CL-D054 | |
| OP-D008 | OP-D055 | |
| OP-D009 | CL-D057 | |
| OP-D010 | OP-D058 | |
| OP-D011 | CL-D062 | |
| CL-R201 | OP-R205 | CL-R212 |
| CL-R202 | OP-R207 | OP-R215 |
| OP-R203 | CL-R208 | |

Other table entries represent other states of drill station 120 and specific actions to be performed. Such other table entries are set forth in Appendix I.

Each sensor includes a set of fault attributes used by monitor computer 164 to perform fault analysis, identification, and correction. An example of this data is set forth in Table II for a typical sensor. Table II-type data for all sensors, drives, feedback signals, and values is stored in memory of monitor computer 164.

TABLE II

R201 Sensor Switch

Sensor switch R201 is normally open and is mechanically closed when the Robot #2 arm is in its vertical home position.
Fault lapse time: (5) seconds from time command is given by slave computer to servo R213 to rotate arm from home or to home to open or close sensor switch, R201.
This switch, when closed, signals the diagnostics computer that the arm is in a vertical home position. The home sensing is provided by a sensor on the "Rotary Inductosyn" feed back for servo R213 to the slave computer. The program provided by the slave to rotate from home and back, clockwise and counterclockwise is always the same.

Fault identification:

When the arm position and switch state does not coincide.
Check switch for malfunction.
Switch has not malfunctioned, check circuit to diagnostic computer.
Switch and circuit to diagnostic computer has not malfunctioned check circuit from diagnostic computer to slave and monitor computer.
If the switch diagnostic state is not shown on C.R.T. of the monitor computer, and the switch state is shown as required by the slave computer, the fault is in the circuit from the diagnostic computer.
Servo R213 fails to respond to slave computer command.
Using monitor computer, command Servo R213 to perform the operation described when fault occurred.
If Servo R213 responds to the monitor computer command. Check circuit from slave computer to the Servo R213.
Using the monitor computer, signal slave computer to repeat the last command, and determine if the slave computer is issuing a command.
If Servo R213 does not respond to monitor computer command, check. Servo R213, & check for a malfunctioning circuit.

The third type of software of system 100 is communication software. FIG. 25 generally indicates the communication network within the MCFS 114 and from MCFS 114 to the external world. One series of nodes, not shown in FIG. 25, are the links between PLC's and APM's of slave computers 152-162, since the communication links between those units are built into the PLC mounting slots and APM boards.

The remaining nodes of FIG. 25 are interconnected using the VME bus protocol. This protocol is implemented using VME bus interconnection hardware commercially available from the Motorola Corporation. Details of the VME bus protocol are available in publications from Motorola.

It will therefore be apparent to those skilled in the art that various modifications and variations can be made in the apparatus and methods of the present invention. Thus, it is intended that the specification and drawings be considered as exemplary only, with the true scope and spirit of the invention being indicated by the following claims.

4.4 PLACE workpiece on drill station

| | | | |
|---|---|---|---|
| 4.1.0 | OP-D003 | CL-D046 | CL-D063 |
| | CL-D004 | OP-D047 | OP-D074 |
| | CL-D005 | OP-D048 | |
| | CL-D006 | OP-D049 | |
| | CL-D007 | CL-D054 | |
| | OP-D008 | OP-D055 | |
| | OP-D009 | CL-D057 | |
| | OP-D010 | OP-D058 | |

|     | OP-D011 | CL-D062 |
| --- | --- | --- |

Drill station open:
When the drill station is open, the drill slave computer request the width of blank for the next part.

| 4.1.1 | OP-D003 | CL-D046 | CL-D063 |
| --- | --- | --- | --- |
|  | CL-D004 | OP-D047 | OP-D074 |
|  | CL-D005 | OP-D048 |  |
|  | CL-D006 | OP-D049 |  |
|  | CL-D007 | CL-D054 |  |
|  | OP-D008 | OP-D055 |  |
|  | OP-D009 | CL-D057 |  |
|  | OP-D010 | OP-D058 |  |
|  | OP-D011 | CL-D062 |  |

Workpiece width same as last drilled:
Upon receiving the width of workpiece, the drill slave computer searches its memory for the stock width last drilled.
If it is the same, the drill slave computer signals the command computer that the drill station is ready.

| 4.1.2 | OP-D003 | CL-D046 | CL-D063 |
| --- | --- | --- | --- |
|  | CL-D004 | OP-D047 | OP-D074 |
|  | CL-D005 | OP-D048 |  |
|  | CL-D006 | OP-D049 |  |
|  | CL-D007 | CL-D054 |  |
|  | OP-D008 | OP-D055 |  |
|  | OP-D009 | CL-D057 |  |
|  | OP-D010 | OP-D058 |  |
|  | OP-D011 | CL-D062 |  |

Workpiece width different than last piece drilled:
DRIVE D073D
Upon receiving the width of workpiece to be drilled, the drill slave computer compares the width of stock last drilled, and finding it different, commands DRIVE D073D to go to home position, closing home sensor switch D074.

| 4.1.3 | OP-D003 | CL-D046 | CL-D063 |
| --- | --- | --- | --- |
|  | CL-D004 | OP-D047 | *CL-D074 |
|  | CL-D005 | OP-D048 |  |
|  | CL-D006 | OP-D049 |  |
|  | CL-D007 | CL-D054 |  |
|  | OP-D008 | OP-D055 |  |
|  | OP-D009 | CL-D057 |  |
|  | OP-D010 | OP-D058 |  |
|  | OP-D011 | CL-D062 |  |

Position workpiece holder:
D073FB
DRIVE D073D
Upon receiving a signal from home sensor switch D074 and linear feedback from D073FB, the drill slave computer searches its memory for a program for the requested width of workpiece, and commands DRIVE D073D to position the workpiece holder, opening home sensor switch D074.

| 4.1.4 | OP-D003 | CL-D046 | CL-D063 |
| --- | --- | --- | --- |
|  | CL-D004 | OP-D047 | *OP-D074 |
|  | CL-D005 | OP-D048 |  |
|  | CL-D006 | OP-D049 |  |
|  | CL-D007 | CL-D054 |  |
|  | OP-D008 | OP-D055 |  |
|  | OP-D009 | CL-D057 |  |
|  | OP-D010 | OP-D058 |  |
|  | OP-D011 | CL-D062 |  |
|  | SFSB01 |  |  |
|  | SFSB02 |  |  |

Upon receiving linear feedback from D073FB and signal from open sensor switch D074, the drill slave computer commands failsafe brakes SFSB01 & FSB02 on Robot #2 to open.

| 4.1.5 | OP-D003 | CL-D046 | CL-D063 |
| --- | --- | --- | --- |
|  | CL-D004 | OP-D047 | OP-D074 |
|  | CL-D005 | OP-D048 |  |
|  | CL-D006 | OP-D049 |  |
|  | CL-D007 | CL-D054 |  |
|  | OP-D008 | OP-D055 |  |
|  | OP-D009 | CL-D057 |  |
|  | OP-D010 | OP-D058 |  |
|  | OP-D011 | CL-D062 |  |
|  | CL-R201 | OP-R205 | CL-R212 |
|  | CL-R202 | OP-R207 | OP-R215 |
|  | OP-R203 | CL-R208 |  |

Move Robot #2 carriage toward drill station:
DRIVE R214D
SFSB01 SFSB02
Upon receiving signals that SFSB01 & SFSB02 are disengaged, the slave computer commands DRIVE R214D to move the robot #2 carriage toward the drill station using a known standard program for placing the x-y axis of the part on the x-y axis of the Drill station and opening home sensor switch R202.

| 4.1.6 | OP-D003 | CL-D046 | CL-D063 |
| --- | --- | --- | --- |
|  | CL-D004 | OP-D047 | OP-D074 |
|  | CL-D005 | OP-D048 |  |
|  | CL-D006 | OP-D049 |  |
|  | CL-D007 | CL-D054 |  |
|  | OP-D008 | OP-D055 |  |
|  | OP-D009 | CL-D057 |  |
|  | OP-D010 | OP-D058 |  |
|  | OP-D011 | CL-D062 |  |
|  | CL-R201 | OP-R205 | CL-R212 |
|  | *OP-R202 | OP-R207 | OP-R215 |
|  | OP-R203 | CL-R208 |  |

Rotate Robot #2 arm toward drill station:
R214FB
DRIVE R213D
Upon receiving linear feedback from R214FB and signal from open sensor switch R202, the slave computer commands DRIVE R213D to rotate the robot arm 90o toward the drill station, to a horizontal position, placing the workpiece on the ledges of the material holder opening home sensor switch R201, and closing sensor switch R205, and closing ledge sensor switch D003, indicating the part is on the material holder ledge.

| 4.1.7 | *CL-D003 | CL-D046 | CL-D063 |
| --- | --- | --- | --- |
|  | CL-D004 | OP-D047 | OP-D074 |
|  | CL-D005 | OP-D048 |  |
|  | CL-D006 | OP-D049 |  |
|  | CL-D007 | CL-D054 |  |
|  | OP-D008 | OP-D055 |  |
|  | OP-D009 | CL-D057 |  |
|  | OP-D010 | OP-D058 |  |
|  | OP-D011 | CL-D062 |  |
|  | *OP-R201 | *CL-R205 | CL-R212 |
|  | OP-R202 | OP-R207 | OP-R215 |

-continued

| | OP-R203 | CL-R208 | |
|---|---|---|---|

Clamp workpiece on material holder:
DRIVE R213 FB
D-V1, S1 & S2

Upon receiving rotary feedback from R213FB and signals from closed sensor switches D003 & R205 and open sensor switch R201, the drill slave computer commands solenoid D-V1,S1 to energize and D-V1,S2 to de-energize, causing four clamp-actuating cylinders to extend forward and rotate the clamps against the workpieces, closing sensor switches D008, D009, D010, & D011 and opening sensor switches D004, D005, D006, & D007.

| 4.1.8 | CL-D003 | CL-D046 | CL-D063 |
|---|---|---|---|
| | *OP-D004 | OP-D047 | OP-D074 |
| | *OP-D005 | OP-D048 | |
| | *OP-D006 | OP-D049 | |
| | *OP-D007 | CL-D054 | |
| | *CL-D008 | OP-D055 | |
| | *CL-D009 | CL-D057 | |
| | *CL-D010 | OP-D058 | |
| | *CL-D011 | CL-D062 | |
| | OP-R201 | CL-R205 | CL-R212 |
| | OP-R202 | OP-R207 | OP-R215 |
| | OP-R203 | CL-R208 | |

Open Robot #2 grippers:
R2-V1,S1-S2+

Upon receiving signal from closed sensor switches D008, D009, D010 & D011 and open sensors D004, D005, D006 & D007 the clamps are closed signal, the slave computer commands solenoid R2-V1,S2 to energize and R2-V1,S1 to de-energize, causes the gripper actuator cylinder to retract, opening sensor switch R208 and closing sensor switch R207 opening Robot #2 gripper jaws.

| 4.1.9 | CL-D003 | CL-D046 | CL-D063 |
|---|---|---|---|
| | OP-D004 | OP-D047 | OP-D074 |
| | OP-D005 | OP-D048 | |
| | OP-D006 | OP-D049 | |
| | OP-D007 | CL-D054 | |
| | CL-D008 | OP-D055 | |
| | CL-D009 | CL-D057 | |
| | CL-D010 | OP-D058 | |
| | CL-D011 | CL-D062 | |
| | OP-R201 | CL-R205 | CL-R212 |
| | OP-R202 | *CL-R207 | OP-R215 |
| | OP-R203 | *OP-R208 | |

Return carriage to home position:
DRIVE R214D

Upon receiving signals from closed sensor switch R207 & open sensor switch R208, the slave computer commands the DRIVE R214D to return the carriage to home position, closing home sensor switch R202.

| 4.1.10 | CL-D003 | CL-D046 | CL-D063 |
|---|---|---|---|
| | OP-D004 | OP-D047 | OP-D074 |
| | OP-D005 | OP-D048 | |
| | OP-D006 | OP-D049 | |
| | OP-D007 | CL-D054 | |
| | CL-D008 | OP-D055 | |
| | CL-D009 | CL-D057 | |
| | CL-D010 | OP-D058 | |
| | CL-D011 | CL-D062 | |
| | OP-R201 | CL-R205 | CL-R212 |
| | *CL-R202 | CL-R207 | OP-R215 |
| | OP-R203 | OP-R208 | |

Rotate arm up to home position:
R214FB
DRIVE R213D
SFSB01 & 02

Upon receiving linear feedback from R214FB and signal from closed home sensor switch R202, the slave computer commands DRIVE R213D to rotate the arm up to home position, closing sensor switch R201 & opening sensor switch R205. Then commands failsafe brakes SFSB01 & 02 to engage.

| 4.1.11 | CL-D003 | CL-D046 | CL-D063 |
|---|---|---|---|
| | OP-D004 | OP-D047 | OP-D074 |
| | OP-D005 | OP-D048 | |
| | OP-D006 | OP-D049 | |
| | OP-D007 | CL-D054 | |
| | CL-D008 | OP-D055 | |
| | CL-D009 | CL-D057 | |
| | CL-D010 | OP-D058 | |
| | CL-D011 | CL-D062 | |
| | *CL-R201 | *OP-R205 | CL-R212 |
| | CL-R202 | CL-R207 | OP-R215 |
| | OP-R203 | OP-R208 | |

5.0 Signal command computer work on drill station:
SFSB01 & 02

Upon receiving rotary feedback from R213FB and signal from closed home sensor switch R201 and open sensor switch R205 and that SFSB01 & 02 are engaged, the slave computer signals the command computer, requesting the drill size.

5.0.1 The tapered hole at the base of the drill adaptor is concentric with the centerline of drill.

5.0.2 The recessed area in the stem is to accommodate the grippers on Robot #3 which is used in transferring drill adaptor from storage to the vertical transfer mechanism on the tool changer.

5.0.3 Drill Adapter Storage.

5.0.4 Six different drill sizes are stored on gravity fed racks, a rack for each drill size. Solenoids D025, D026, D027, D028, & D029, on each of the six drill adaptor storage racks actuate a stop, which releases one adapter at a time to slide down on to the racks storage platform. The platform is designed to align the drill adaptor for robotic pick up.

5.0.5 On the face of each of the six storage platforms is a normally open sensor switch D012, D013, D014, D015, D016, & D017. Each, when closed, indicates a drill adaptor is in storage on the platform.

5.0.6 Sensor switches D018, D019, D020, D021, D022, & D023 intercept a drill adaptor on each rack when a new drill is fed on to the storage platform. When a switch remains open for a period of more than ten seconds, it indicates the rack has only one drill adaptor left, and signals the drill slave computer. The drill slave computer signals the monitor computer, identifying the drill size and storage rack.

5.0.7 Each of the six drill adaptor storage racks are assigned different drill size. A signal from the monitor computer to the drill slave computer, assigns or deletes a drill size and its assigned storage.

5.0.8 At the request of the monitor computer to the drill slave computer, the drills sizes and their assigned storage will be displayed on the monitor computer C.R.T.

5.1 Robot #3

5.1.1 Robot #3 is an integral part of the vertical transfer carriage. Its purpose is to move the drill adaptor from the adaptor storage platform to the vertical transfer system or vice versa.

5.1.2 Robot #3 transfers the adaptor to and from the vertical transfer platform. The robot is a pneumatically operated mechanism involving five double acting cylinders. One raises and lowers the robot jaws which are also pneumatically operated. The four remaining cylinders are used to rotate the jaws to three positions: home, storage platform, and vertical transfer platform. When sensor switches D031, D033, & D035 are closed and D041 sensor switch is open, the robot is in home position.

5.1.3 The grippers on Robot #3 are raised and lowered using a vertical cylinder. Fully retracted is home, closing sensor switch D035, fully extended closes sensor switch D036, and retracted to an intermediate stop which places the grippers at the pickup position of the drill adaptor closes sensor switch D037.

5.1.4 The grippers are rotated using four free-single-acting-pistons, pistons, which when activated, push the rack to a stop rotating the gripper to their position.

5.2.0 Vertical Transfer Carriage:

The vertical transfer carriage is driven to programmed positioned adjacent a drill adaptor storage platform for the transfer of the drill adaptor.

5.2.1 The vertical transfer carriage aligns the drill adaptor for transfer to the horizontal transfer mechanism.

5.2.2 A tapered pin coinciding with tapered recess in the drill adaptor centers the adaptor on the platform. A tapered pin actuator air cylinder pushes the pin above the surface and an electro magnetic field pulls the drill adaptor down and restrains the face of the drill adaptor against the face of the vertical transfer platform.

5.2.3 The vertical transfer carriage is moved and positioned by a driven leadscrew. Eight positions are programmed from home position which is adjacent the top, #1 drill adaptor storage platform.

5.2.4 No. 1 postion home adjacent #1 drill adaptor storage platform.

No. 2 position adjacent #2 drill adaptor storage platform.

No. 3 position adjacent #3 drill adaptor storage platform.

No. 4 position adjacent #4 drill adaptor storage platform.

No. 5 position adjacent #5 drill adaptor storage platform.

No. 6 position adjacent #6 drill adaptor storage platform.

No. 7 position adjacent the broken or drill dump platform.

No. 8 adjacent the face of the horizontal transfer receiver mechanism.

5.3.0 Broken or dull drill disposal.

5.3.1 Adaptors with dull or broken drills are placed on the drill dump or broken drill platform. When the vertical transfer carriage returns to home position, it mechanically tips the platform causing the adaptor to slide down a slide then into a trough, when a set number of adaptors have gone in the trough and sensor switch D023 is closed for more than ten seconds it signals the diagnostic computer and CRT that the trough is full.

| 5.7 Drill selection and exchange | | | |
|---|---|---|---|
| CL-D003 | | | CL-D043 |
| OP-D004 | CL-D013 | CL-D035 | CL-D046 |
| OP-D005 | CL-D014 | OP-D036 | OP-D050 |
| | | OP-D034 | |
| | | CL-D035 | |
| | | OP-D036 | |
| OP-D006 | CL-D015 | OP-D037 | |
| OP-D007 | CL-D016 | OP-D038 | |
| CL-D008 | OP-D017 | CL-D039 | |
| CL-D009 | CL-D031 | OP-D040 | |
| CL-D010 | OP-D032 | CL-D041 | |
| CL-D011 | CL-D033 | OP-D042 | |

5.7.1 Requested drill size on drill motor:

Upon receiving drill size, the drill slave computer searches its memory for drill size on drill motor, and finds it is the size requested.

5.7.2 Requested drill size not on drill motor:

Upon receiving the drill size, the drill slave computer searches its memory for drill size on drill motor, and finds the wrong size.

5.7.3 Determine storage location of requested drill size:

Upon determining the drill size on the drill motor is not the programed size, the drill slave computer searches its memory, for the program for DRIVE D075D, that will position the vertical transfer carriage adjacent storage platform containing the programed drill size (Storage platform #3 will be used in this description).

| 5.7.4 | CL-D003 | CL-D013 | OP-D036 |
|---|---|---|---|
| | OP-D004 | CL-D014 | OP-D037 |
| | OP-D005 | CL-D015 | OP-D038 |
| | OP-D006 | CL-D016 | CL-D039 |
| | OP-D007 | OP-D017 | OP-D040 |
| | CL-D008 | CL-D031 | CL-D041 |
| | CL-D009 | OP-D032 | OP-D042 |
| | CL-D010 | CL-D033 | CL-D043 |
| | CL-D011 | OP-D034 | CL-D046 |
| | CL-D012 | CL-D035 | |

Move to storage platform containing drill adaptor: DRIVE D075D

Upon finding program for the requested drill storage platform, the drill slave computer commands DRIVE D075D to go to the selected platform #3, opening home sensor switch D043.

| 5.7.5 | CL-D003 | CL-D013 | OP-D036 |
|---|---|---|---|
| | OP-D004 | CL-D014 | OP-D037 |
| | OP-D005 | CL-D015 | OP-D038 |
| | OP-D006 | CL-D016 | CL-D039 |
| | OP-D007 | OP-D017 | OP-D040 |
| | CL-D008 | CL-D031 | CL-D041 |
| | CL-D009 | OP-D032 | OP-D042 |
| | CL-D010 | CL-D033 | *OP-D043 |
| | CL-D011 | OP-D034 | CL-D046 |
| | CL-D012 | CL-D035 | |

Raise Robot #3
D075FB
D-V2,S1+S2

Upon receiving linear feedback from D075FB, the drill slave computer commands solenoid D-V2,S1 to energize and D-V2,S2 to de-energize, causing cylinder #3 to extend up full height, closing sensor switch D036 and opening sensor switch D035.

| 5.7.6 | CL-D003 | CL-D013 | *CL-D036 |
|---|---|---|---|
|  | OP-D004 | CL-D014 | OP-D037 |
|  | OP-D005 | CL-D015 | OP-D038 |
|  | OP-D006 | CL-D016 | CL-D039 |
|  | OP-D007 | OP-D017 | OP-D040 |
|  | CL-D008 | CL-D031 | CL-D041 |
|  | CL-D009 | OP-D032 | OP-D042 |
|  | CL-D010 | CL-D033 | OP-D043 |
|  | CL-D011 | OP-D034 | CL-D046 |
|  | CL-D012 | *OP-D035 |  |

Move grippers over storage platform:
D.V3,S1+,S2−
D-V4,S1+,S2−

Upon receiving a signal from closed sensor switch D036 and open sensor switch D035, the drill slave computer commands solenoids D.V3,S1 & D.V4,S1 to energize and D-V3,S2 & D-V4,S2 to de-energize, causing cylinders #1 and #2 to activate from home position, opening switches D031 and D033, and closing switches D032 and D034, placing the grippers over the storage platform.

| 5.7.7 | CL-D003 | CL-D013 | CL-D036 |
|---|---|---|---|
|  | OP-D004 | CL-D014 | OP-D037 |
|  | OP-D005 | CL-D015 | OP-D038 |
|  | OP-D006 | CL-D016 | CL-D039 |
|  | OP-D007 | OP-D017 | OP-D040 |
|  | CL-D008 | *OP-D031 | CL-D041 |
|  | CL-D009 | *CL-D032 | OP-D042 |
|  | CL-D010 | *OP-D033 | OP-D043 |
|  | CL-D011 | *CL-D034 | CL-D046 |
|  | CL-D012 | OP-D035 |  |

Lower jaws around drill adaptor:
D-V2,S1−S2+

Upon receiving a signal from closed sensor switches as D032 & D034, and open sensor switches D031 & D033, the drill slave computer commands solenoid D-V2,S2 to to energize and D-V2,S1 to de-energize, causing cylinder #3 to retract, opening sensor switch D036 and closes sensor switch D037 which places the grippers around the stem of the drill adaptor.

| 5.7.9 | CL-D003 | CL-D013 | *OP-D036 |
|---|---|---|---|
|  | OP-D004 | CL-D014 | *CL-D037 |
|  | OP-D005 | CL-D015 | OP-D038 |
|  |  |  | CL-D039 |
|  | OP-D006 | CL-D016 | OP-D040 |
|  | OP-D007 | OP-D017 | CL-D041 |
|  | CL-D008 | OP-D031 | OP-D042 |
|  | CL-D009 | CL-D032 | OP-D043 |
|  | CL-D010 | OP-D033 | CL-D046 |
|  | CL-D011 | CL-D034 |  |
|  | CL-D012 | OP-D035 |  |

Close gripper jaws:
D-V5,S1+S2−

Upon receiving a signal from closed sensor switch D037 and open sensor switch D036, the drill slave computer commands solenoid D-V5,S1 to energize and D-V5,S2 to de-energize, causing cylinder #4 to actuate, closing the grippers around the drill adaptor, closing sensor switch D040 and opening sensor switch D041.

| 5.7.10 | CL-D003 | CL-D013 | OP-D036 |
|---|---|---|---|
|  | OP-D004 | CL-D014 | CL-D037 |
|  | OP-D005 | CL-D015 | OP-D038 |
|  | OP-D006 | CL-D016 | CL-D039 |
|  | OP-D007 | OP-D017 | *CL-D040 |
|  | CL-D008 | OP-D031 | *OP-D041 |
|  | CL-D009 | CL-D032 | OP-D042 |
|  | CL-D010 | OP-D033 | OP-D043 |
|  | CL-D011 | CL-D034 | CL-D046 |
|  | CL-D012 | OP-D035 |  |

Lift drill adaptor off of storage platform:
D-V2,S1+S2−

Upon receiving a signal from the closed sensor switch D040 & open sensor switch D041, the drill slave computer commands solenoid D-V2,S1 to energize and D-V2,S2 to de-energize, causing cylinder #3 to extend, opening sensor switch D037 and D014 and closing sensor switch D036, lifting the drill adaptor from the storage platform.

| 5.7.11 | CL-D003 | CL-D013 | *CL-D036 |
|---|---|---|---|
|  | OP-D004 | *OP-D014 | *OP-D037 |
|  | OP-D005 | CL-D015 | OP-D038 |
|  | OP-D006 | CL-D016 | CL-D039 |
|  | OP-D007 | OP-D017 | CL-D040 |
|  | CL-D008 | OP-D031 | OP-D041 |
|  | CL-D009 | CL-D032 | OP-D042 |
|  | CL-D010 | OP-D033 | OP-D043 |
|  | CL-D011 | CL-D034 | CL-D046 |
|  | CL-D012 | OP-D035 |  |

Move drill adaptor over vertical transfer platform:
D-V4,S1−S2+

Upon receiving a signal from the closed sensor switch D036 & open sensor switches D037 & D014, the drill slave computer commands solenoid D-V4,S2 to energize and D-V4,S1 to de-energize, causing cylinder #2 to retract, opening sensor switch D034 and closing sensor switch D033, placing the drill adaptor over the vertical transfer platform.

| 5.7.12 | CL-D003 | CL-D013 | CL-D036 |
|---|---|---|---|
|  | OP-D004 | OP-D014 | OP-D037 |
|  | OP-D005 | CL-D015 | OP-D038 |
|  | OP-D006 | CL-D016 | CL-D039 |
|  | OP-D007 | OP-D017 | CL-D040 |
|  | CL-D008 | OP-D031 | OP-D041 |
|  | CL-D009 | CL-D032 | OP-D042 |
|  | CL-D010 | *CL-D033 | OP-D043 |
|  | CL-D011 | *OP-D034 | CL-D046 |
|  | CL-D012 | OP-D035 |  |

Place drill adaptor on vertical transfer platform:
R-V2,S1−S2+

Upon receiving a signal from closed sensor switch D033 and open sensor switch D034 the drill slave computer commands D-V2,S2 to energize and D-V2,S1 to de-energize, causing cylinder #3 to retract, opening sensor switch D036 and closing sensor switch D037 placing the drill adaptor over the centering pin and onto the vertical transfer platform.

| 5.7.13 | CL-D003 | CL-D013 | *OP-D036 |
|---|---|---|---|
|  | OP-D004 | OP-D014 | *CL-D037 |
|  | OP-D005 | CL-D015 | OP-D038 |
|  | OP-D006 | CL-D016 | CL-D039 |
|  | OP-D007 | OP-D017 | CL-D040 |
|  | CL-D008 | OP-D031 | OP-D041 |
|  | CL-D009 | CL-D032 | OP-D042 |
|  | CL-D010 | CL-D033 | OP-D043 |
|  | CL-D011 | OP-D034 | CL-D046 |

|   |   |
|---|---|
| CL-D012 | OP-D035 |

Extend tapered pin into drill adaptor:
D-V6,S1+S2—

Upon receiving a signal from closed sensor switch D037 and open sensor switch D036, the drill slave computer commands solenoid D-V6,S1 to energize and D-V6,S2 to de-energize, causing cylinder #5 on the vertical transfer platform to extend, pushing the tapered pin into the mating recess in the bottom of the drill adaptor, opening sensor D039 and closing sensor switch D038.

| 5.7.14 | CL-D003 | CL-D013 | OP-D03 |
|---|---|---|---|
|  | OP-D004 | OP-D014 | CL-D037 |
|  | OP-D005 | CL-D015 | *CL-D038 |
|  | OP-D006 | CL-D016 | *OP-D039 |
|  | OP-D007 | OP-D017 | CL-D040 |
|  | CL-D008 | OP-D031 | OP-D041 |
|  | CL-D009 | CL-D032 | OP-D042 |
|  | CL-D010 | CL-D033 | OP-D043 |
|  | CL-D011 | OP-D034 | CL-D046 |
|  | CL-D012 | OP-D035 |  |

Energize magnetic platform:

Upon receiving a signal from the closed sensor switch D038 and open sensor switch D039, the drill slave computer commands the electro-magnetic field D077 to energize, pulling the drill adaptor to the platform and aligning the tapered pin with mating recess in the drill adaptor, closing sensor switch D042.

| 5.7.15 | CL-D003 | CL-D013 |  |
|---|---|---|---|
|  | OP-D004 | OP-D014 | OP-D036 |
|  | OP-D005 | CL-D015 | CL-D037 |
|  | OP-D006 | CL-D016 | CL-D038 |
|  | OP-D007 | OP-D017 | OP-D03 |
|  | CL-D008 | OP-D031 | CL-D040 |
|  | CL-D009 | CL-D032 | OP-D041 |
|  | CL-D010 | CL-D033 | *CL-D042 |
|  | CL-D011 | OP-D034 | OP-D043 |
|  | CL-D012 | OP-D035 | CL-D046 |

Open grippers:
D-V5,S1—,S2+

Upon receiving a signal from the closed sensor switch D042 the drill slave computer commands solenoid D-V5,S2 to energize and D-V5,S1 to de-energizes, causing cylinder #4 to retract, opening the grippers, which opens sensor switch D040 and closes sensor switch D041.

| 5.7.16 | CL-D003 | CL-D013 | OP-D036 |
|---|---|---|---|
|  | OP-D004 | OP-D014 | CL-D037 |
|  | OP-D005 | CL-D015 | CL-D038 |
|  | OP-D006 | CL-D016 | OP-D039 |
|  | OP-D007 | OP-D017 | *OP-D040 |
|  | CL-D008 | OP-D031 | *CL-D041 |
|  |  |  | CL-D042 |
|  | CL-D009 | CL-D032 | OP-D043 |
|  | CL-D010 | CL-D033 | CL-D046 |
|  | CL-D011 | OP-D034 |  |
|  | CL-D012 | OP-D035 |  |

Raise grippers:
D-V2,S1+S2—

Upon receiving a signal from closed sensor switch D041 and open sensor switch D040, the drill slave computer commands solenoid D-V2,S1 to energize * D-V2,S2 to de-energize, causing cylinder #3 to extend and open sensor switch D037 and close sensor switch D036, raising the open grippers above the drill adaptor.

| 5.7.17 | CL-D003 | CL-D013 | *CL-D036 |
|---|---|---|---|
|  | OP-D004 | OP-D014 | *OP-D037 |
|  | OP-D006 | CL-D016 | OP-D039 |
|  | OP-D007 | OP-D017 | OP-D040 |
|  | CL-D008 | OP-D031 | CL-D041 |
|  | CL-D009 | CL-D032 | CL-D042 |
|  | CL-D010 | CL-D033 | OP-D043 |
|  | CL-D011 | OP-D034 | CL-D046 |
|  | CL-D012 | OP-D035 |  |

Rotate jaws to home position:
D-V3,S1—S2+

Upon receiving a signal from closed sensor switch D036 and open sensor switch D037, the drill slave computer commands solenoid D-V3,S2 to energize and D-V3,S1 to de-energize, causing cylinder #1 to retract, rotating the gripper jaws to home position which opens sensor switch D032 and closes sensor switch D031.

| 5.7.18 | CL-D003 | CL-D013 | CL-D036 |
|---|---|---|---|
|  | OP-D004 | OP-D014 | OP-D037 |
|  | OP-D005 | CL-D015 | CL-D038 |
|  | OP-D006 | CL-D016 | OP-D039 |
|  | OP-D007 | OP-D017 | OP-D040 |
|  | CL-D008 | *CL-D031 | CL-D041 |
|  | CL-D009 | *OP-D032 | CL-D042 |
|  | CL-D010 | CL-D033 | OP-D043 |
|  | CL-D011 | OP-D034 | CL-D046 |
|  | CL-D012 | OP-D035 |  |

Retract jaws to home position
D-V2,S1—S2+

Upon receiving a signal from closed sensor switch D031 and open sensor switch D032, the drill slave computer commands solenoid D-V2,S2 to energize and D-V2,S1 to energize, causing cylinder #3 to retract to home position, which opens sensor switch D036 and closes sensor switch D035.

| 5.7.19 | CL-D003 | CL-D013 | *OP-D036 |
|---|---|---|---|
|  | OP-D004 | OP-D014 | OP-D037 |
|  | OP-D005 | CL-D015 | CL-D038 |
|  | OP-D006 | CL-D016 | OP-D039 |
|  | OP-D007 | OP-D017 | OP-D040 |
|  | CL-D008 | CL-D031 | CL-D041 |
|  | CL-D009 | OP-D032 | CL-D042 |
|  | CL-D010 | CL-D033 | OP-D043 |
|  | CL-D011 | OP-D034 | CL-D046 |
|  | CL-D012 | *CL-D035 |  |

Move vertical transfer carriage to home:
DRIVE D075D

Upon receiving a signal from closed sensor switch D035 and open sensor switch D036, the drill slave computer commands the DRIVE D075D to move the vertical transfer carriage to home position closing sensor switch D043.

| 5.7.20 | CL-D003 | CL-D013 | OP-D036 |
|---|---|---|---|
|  | OP-D004 | OP-D014 | OP-D037 |
|  | OP-D005 | CL-D015 | CL-D038 |
|  | OP-D006 | CL-D016 | OP-D039 |
|  | OP-D007 | OP-D017 | OP-D040 |
|  | CL-D008 | CL-D031 | CL-D041 |
|  | CL-D009 | OP-D032 | CL-D042 |
|  | CL-D010 | CL-D033 | *CL-D043 |

-continued

|       |         |         |
|-------|---------|---------|
| CL-D011 | OP-D034 | CL-D046 |
| CL-D012 | CL-D035 |         |

Detect drill adaptor on vertical transfer carriage:
D075FB

Upon receiving linear feedback from D075FB and signal from closed sensor switch D043, the drill slave computer request confirmation an adaptor is on the vertical carriage, from closed sensor switch D050.

| 5.7.21 | CL-D003 | CL-D013 | OP-D036 |
|--------|---------|---------|---------|
|        | OP-D004 | OP-D014 | OP-D037 |
|        | OP-D005 | CL-D015 | CL-D038 |
|        | OP-D006 | CL-D016 | OP-D039 |
|        | OP-D007 | OP-D017 | OP-D040 |
|        | CL-D008 | CL-D031 | CL-D041 |
|        | CL-D009 | OP-D032 | CL-D042 |
|        | CL-D010 | CL-D033 | CL-D043 |
|        | CL-D011 | OP-D034 | CL-D046 |
|        | CL-D012 | CL-D035 | *CL-D050 |

5.8.0 Horizontal Transfer Mechanism
5.8.1 The horizontal transfer mechanism has two electro magnetic drill adaptor receivers, and are referred to as #1 & #2 receivers. The mechanism is moved by a servo D076 driven led screw to four positions, there are two safety override switches D044 and D045 one of each end of travel.
5.8.2 Four positions of horizontal transfer mechanism.
5.8.2.1 Home position closes a sensor switch D046. Home position places the #1 receiver in a position for unloading the replaced drill adaptor.
5.8.2.2 Number two position closes sensor switch D047 and places the #2 receiver in a position to receive the replacement drill adaptor.
5.8.2.3 Number three position closes sensor switch D048 and places #1 receiver over the drill motor for retrieving existing drill adaptor from the drill motor.
5.8.2.4 Number four position closes sensor switch D049 positions the #2 receiver for transferring the selected drill adaptor to the drill motor.
5.9.0 Drill adaptor exchange:

| 5.9.1 | CL-D003 | CL-D038 | CL-D063 |         |
|-------|---------|---------|---------|---------|
|       | OP-D004 | OP-D039 | CL-D054 | OP-D069 |
|       | OP-D005 | CL-D042 | OP-D055 | OP-D070 |
|       | OP-D006 | CL-D043 | CL-D056 | CL-D071 |
|       | OP-D007 | CL-D046 | CL-D057 | OP-D072 |
|       | CL-D008 | OP-D047 | OP-D058 | CL-D085 |
|       | CL-D009 | OP-D048 | CL-D060 | CL-D090 |
|       | CL-D010 | OP-D049 | CL-D062 | CL-D094 |
|       | CL-D011 | CL-D050 | OP-D095 |         |

Move horizontal transfer mechanism to #2 position:
DRIVE D076D

Upon receiving a signal from the closed vertical transfer home position sensor switch D043, and closed drill adaptor detector sensor switch D050, the drill slave computer commands DRIVE D076D to move the horizontal transfer mechanism forward to a programed position, placing the #2 electro-magnetic receiver chuck over the centerline of the vertical transfer mechanism, this move is verified when sensor switch D047 is closed and home sensor switch D046 is open.

| 5.9.2 | CL-D003 | CL-D038 | CL-D063 |         |
|-------|---------|---------|---------|---------|
|       | OP-D004 | OP-D039 | CL-D054 | OP-D069 |

-continued

|       |         |         |         |
|-------|---------|---------|---------|
| OP-D005 | CL-D042 | OP-D055 | OP-D070 |
| OP-D006 | CL-D043 | CL-D056 | CL-D071 |
| OP-D007 | *OP-D046 | CL-D057 | OP-D072 |
| CL-D008 | *CL-D047 | OP-D058 | CL-D085 |
| CL-D009 | OP-D048 | CL-D060 | CL-D090 |
| CL-D010 | OP-D049 | CL-D062 | CL-D094 |
| CL-D011 | CL-D062 | OP-D095 |         |

Move vertical transfer carriage to #2 receiver:
D076FB
DRIVE D075D

Upon receiving a signal from closed sensor switch D047 & D050, and linear feedback from D076D FB the drill slave computer commands the DRIVE D075 to move the vertical transfer carriage at a programmed speed toward the #2 electro-magnet receiver placing the upper surface of the drill adaptor flange 0.010 inch from the face of the electro-magnetic receiver, opening home sensor switch D043.

The speed of DRIVE D075D as it raises the vertical carriage toward the horizontal transfer mechanism is very critical, and it must stop at a position placing the face of the drill adaptor 0.010 from the receiver.

To assure that DRIVE D075 is moving at the speed, sensor switch D051 is placed a known distance from home, sensor switch D051 is momentarily closed as the carriage passes signalling the slave computer. The slave computer checks the time from home, and if it is too short or too long. The slave computer stops the DRIVE D075 and goes on hold, then signals the fault to the monitor computer.

| 5.9.3 | CL-D003 | CL-D038 | CL-D063 |         |
|-------|---------|---------|---------|---------|
|       | OP-D004 | OP-D039 | CL-D054 | OP-D069 |
|       | OP-D005 | CL-D042 | OP-D055 | OP-D070 |
|       | OP-D006 | *OP-D043 | CL-D056 | OP-D071 |
|       | OP-D007 | OP-D046 | CL-D057 | OP-D072 |
|       | CL-D008 | CL-D047 | OP-D058 | CL-D085 |
|       | CL-D009 | OP-D048 | CL-D060 | CL-D090 |
|       | CL-D010 | OP-D049 | CL-D060 | CL-D094 |
|       | CL-D011 | CL-D062 | OP-D095 |         |

Transfer adaptor to receiver #2:
D075FB

Upon receiving linear feedback from D075 FB signal that vertical transfer platform is positioned, the drill slave computer simultaneously commands the electro magnetic field D080 in the #2 receiver to energize closing sensor switch D070, and the energized electro-magnetic field D077 on the vertical transfer platform to de-energize, transferring the drill adaptor to the #2 receiver, and opening sensor switch D042.

| 5.9.4 | CL-D003 | CL-D038 | CL-D063 |         |
|-------|---------|---------|---------|---------|
|       | OP-D004 | OP-D039 | CL-D054 | OP-D069 |
|       | OP-D005 | *OP-D042 | OP-D055 | *CL-D070 |
|       | OP-D006 | OP-D043 | CL-D056 | CL-D071 |
|       | OP-D007 | OP-D046 | CL-D057 | OP-D072 |
|       | CL-D008 | CL-D047 | OP-D058 | CL-D085 |
|       | CL-D009 | OP-D048 | CL-D060 | CL-D090 |
|       | CL-D010 | OP-D049 | CL-D062 | CL-D094 |
|       | CL-D011 |         |         | CL-D095 |

Move vertical transfer carriage to home:
DRIVE D075D

Upon receiving signals from closed sensor switch D070 and open sensor switch D042, the drill slave computer commands the vertical transfer DRIVE D075D to reverse and move the carriage back to home position, closing sensor switch D043.

| 5.9.5 | CL-D003 | CL-D038 | CL-D063 | |
|---|---|---|---|---|
| | OP-D004 | OP-D039 | CL-D054 | OP-D069 |
| | OP-D005 | OP-D042 | CL-D055 | CL-D070 |
| | OP-D006 | *CL-D043 | CL-D056 | CL-D071 |
| | OP-D007 | OP-D046 | CL-D057 | OP-D072 |
| | CL-D008 | CL-D047 | OP-D058 | CL-D085 |
| | CL-D009 | OP-D048 | CL-D060 | CL-D090 |
| | CL-D010 | OP-D049 | CL-D062 | CL-D094 |
| | CL-D011 | | OP-D095 | |

Detect presence of drill adaptor:
DRIVE D075FB

Upon receiving linear feedback from D075 FB and Signal from closed home sensor switch D043, the drill slave computer commands the sensor switch D050 to detect the presence of the drill adaptor. Sensor switch D050 signal is on demand only.

| 5.9.6 | CL-D003 | OP-D042 | CL-D054 | OP-D069 |
|---|---|---|---|---|
| | OP-D004 | CL-D043 | OP-D055 | CL-D070 |
| | OP-D005 | OP-D046 | CL-D056 | CL-D071 |
| | OP-D006 | CL-D047 | CL-D057 | OP-D072 |
| | OP-D007 | OP-D048 | OP-D058 | CL-D085 |
| | CL-D008 | OP-D049 | CL-D060 | CL-D090 |
| | CL-D009 | *OP-D050 | CL-D062 | CL-D094 |
| | CL-D010 | CL-D063 | CL-D095 | |
| | CL-D011 | | | |

Move #1 receiver over drill motor:
DRIVE D076D

Upon receiving a signal from the open sensor switch D050 that the drill adaptor has been removed, the drill slave computer commands the horizontal transfer mechanism DRIVE D076D to move the mechanism forward a programmed distance placing the #1 electromagnetic receiver D078 over the drill motor, closing sensor switch D048 and opening sensor switch D047.

| 5.9.7 | CL-D003 | OP-D042 | CL-D054 | OP-D069 |
|---|---|---|---|---|
| | OP-D004 | CL-D043 | OP-D055 | CL-D070 |
| | OP-D005 | OP-D046 | CL-D056 | CL-D071 |
| | OP-D006 | *OP-D047 | CL-D057 | OP-D072 |
| | OP-D007 | *CL-D048 | OP-D058 | CL-D085 |
| | CL-D008 | OP-D049 | CL-D060 | CL-D090 |
| | CL-D009 | | CL-D062 | CL-D094 |
| | CL-D010 | | CL-D063 | OP-D095 |
| | CL-D011 | | | |

Raise drill motor:
D076FB
D-V7,S1+,S2−

Upon receiving a signal from the #2 position sensor switch D048 and linear feedback from D076 FB the drill slave computer commands solenoid D-V7,S1 to energize and D-V7,S2 to de-energize, causing the hydraulic cylinder to raise the drill motor to a positive stop, opening sensor switch D054 and closing sensor switch D055.

| 5.9.8 | CL-D003 | OP-D042 | | |
|---|---|---|---|---|
| | OP-D004 | CL-D043 | *OP-D054 | OP-D069 |
| | OP-D005 | OP-D046 | *CL-D055 | CL-D070 |
| | OP-D006 | OP-D047 | CL-D056 | CL-D071 |
| | OP-D007 | OP-D048 | CL-D057 | OP-D072 |
| | CL-D008 | OP-D049 | OP-D058 | CL-D085 |
| | CL-D009 | | CL-D060 | CL-D090 |
| | CL-D010 | | CL-D062 | CL-D094 |
| | CL-D011 | CL-D063 | OP-D095 | |

Transfer drill adaptor from drill motor to #1 receiver:

Upon receiving a signal from the closed sensor switch D055 the and open sensor switch D054, drill slave computer commands simultaneously the electromagnetic fields of the horizontal transfer #1 electromagnet receiver to energize, closing sensor switch D069 and the drill motor drive electromagnetic receiver D082 to de-energize, opening sensor switch D071, transferring the drill adaptor from the drill motor electro-magnetic receiver D082 to the horizontal transfer receiver D078. FIG. #28.

| 5.9.9 | CL-D003 | OP-D042 | | |
|---|---|---|---|---|
| | OP-D004 | CL-D043 | OP-D054 | *CL-D069 |
| | OP-D005 | OP-D046 | CL-D055 | CL-D070 |
| | OP-D006 | OP-D047 | CL-D056 | *OP-D071 |
| | OP-D007 | CL-D048 | CL-D057 | OP-D072 |
| | CL-D008 | OP-D049 | OP-D058 | CL-D085 |
| | CL-D009 | | CL-D060 | CL-D090 |
| | CL-D010 | | CL-D062 | CL-D094 |
| | CL-D011 | | CL-D063 | OP-D095 |

Lower drill motor:
D-V7,S1−S2+

Upon receiving signals from the closed sensor switch D069 and open sensor switch D071, the drill slave computer commands solenoids D.V7,S2 to energize and D-V7,S1 to de-energize, causing the drill motor carriage hydraulic system to retract to home position, opening sensor switch D055 and closing sensor switch D054.

| 5.9.10 | CL-D003 | OP-D042 | | |
|---|---|---|---|---|
| | OP-D004 | CL-D043 | *CL-D054 | CL-D069 |
| | OP-D005 | OP-D046 | *OP-D055 | CL-D070 |
| | OP-D006 | OP-D047 | CL-D056 | OP-D071 |
| | OP-D007 | CL-D048 | CL-D057 | OP-D072 |
| | CL-D008 | OP-D049 | OP-D058 | CL-D085 |
| | CL-D009 | | CL-D060 | CL-D090 |
| | CL-D010 | | CL-D062 | CL-D094 |
| | CL-D011 | | CL-D063 | OP-D095 |

Detect presence of drill adaptor on drill motor:

Upon receiving a signal from the closed sensor switch D054 and open sensor switch D055, the drill slave computer commands sensor switch D068 to detect the presence of the drill adaptor.

| 5.9.11 | CL-D003 | OP-D042 | *OP-D068 | |
|---|---|---|---|---|
| | OP-D004 | CL-D043 | CL-D054 | CL-D069 |
| | OP-D005 | OP-D046 | OP-D055 | CL-D070 |
| | OP-D006 | OP-D047 | CL-D056 | OP-D071 |
| | OP-D007 | CL-D048 | CL-D057 | OP-D072 |
| | CL-D008 | OP-D049 | OP-D058 | CL-D085 |
| | CL-D009 | | CL-D060 | CL-D090 |
| | CL-D010 | | CL-D062 | CL-D094 |
| | CL-D011 | | CL-D063 | OP-D095 |

Move horizontal transfer receiver #2 over drill motor:
DRIVE D076D

Upon receiving a signal from the open drill adaptor detector sensor switch D068, that the drill adaptor was not on the drill motor, the drill slave computer commands the horizontal transfer mechanism servo D076D to move one step forward placing the #2 horizontal transfer receiver over the drill motor, closing a position sensor switch D049 and opening sensor switch D048.

| 5.9.12 | CL-D003 | OP-D042 | | |
|---|---|---|---|---|
| | OP-D004 | CL-D043 | CL-D054 | CL-D069 |
| | OP-D005 | OP-D046 | OP-D055 | CL-D070 |
| | OP-D006 | OP-D047 | CL-D056 | OP-D071 |
| | OP-D007 | *OP-D048 | CL-D057 | OP-D072 |
| | CL-D008 | *CL-D049 | OP-D058 | CL-D085 |
| | CL-D009 | CL-D060 | CL-D090 | |
| | CL-D010 | CL-D062 | CL-D094 | |
| | CL-D011 | CL-D063 | OP-D095 | |

Raise drill motor:
D076FB
D-V7-S1+S2—

Upon receiving signal from sensor switch D049 and linear feedback from D076 FB that the #2 horizontal transfer receiver is over the drill motor, the drill slave computer commands solenoid D-V7,S1 to energize and D-V7,S2 to de-energize, causing the drill motor hydraulic cylinder to raise the drill motor to its positive stop, opening sensor switch D054 and closing sensor switch D055.

| 5.9.13 | CL-D003 | OP-D042 | | |
|---|---|---|---|---|
| | OP-D004 | CL-D043 | *OP-D054 | CL-D069 |
| | OP-D005 | OP-D046 | *CL-D055 | CL-D070 |
| | OP-D006 | OP-D047 | CL-D056 | OP-D071 |
| | OP-D007 | OP-D048 | CL-D057 | OP-D072 |
| | CL-D008 | CL-D049 | OP-D058 | CL-D085 |
| | CL-D009 | CL-D060 | CL-D090 | |
| | CL-D010 | CL-D062 | CL-D094 | |
| | CL-D011 | CL-D063 | OP-D095 | |

Transfer drill adaptor to drill motor:

Upon receiving a signal from closed switch D055 and open sensor switch D054 indicating the drill motor is in the up position, the drill slave computer commands simultaneously the drill motor electro magnetic field D082 to energize, closing sensor switch D071, and the horizontal transfer electro magnetic field D082 to de-energize, opening sensor switch D070, transferring the new drill adaptor to the drill motor.

| 5.9.14 | CL-D003 | OP-D042 | | |
|---|---|---|---|---|
| | OP-D004 | CL-D043 | OP-D054 | CL-D069 |
| | OP-D005 | OP-D046 | CL-D055 | *OP-D070 |
| | OP-D006 | OP-D047 | CL-D056 | *CL-D071 |
| | OP-D007 | OP-D048 | CL-D057 | OP-D072 |
| | CL-D008 | CL-D049 | OP-D058 | CL-D085 |
| | CL-D009 | | CL-D060 | CL-D090 |
| | CL-D010 | | CL-D062 | CL-D094 |
| | CL-D011 | | CL-D063 | OP-D095 |

Lower drill motor:
D-V7,S1—S2+

Upon receiving a signal from closed sensor switch D071 and open sensor switch D070 signaling the horizontal transfer receiver #2 is de-energized and drill motor receive is energized, the drill slave computer commands solenoid D-V7,S2 to energize and D-V7,S1 to de-energize causing the hydraulic cylinder to lower the drill carriage to home position, opening sensor switch D055 and closing sensor switch D054.

| 5.9.15 | CL-D003 | OP-D042 | | |
|---|---|---|---|---|

-continued

| | OP-D004 | CL-D043 | *CL-D054 | CL-D069 |
|---|---|---|---|---|
| | OP-D005 | OP-D046 | *OP-D055 | OP-D070 |
| | OP-D006 | OP-D047 | CL-D056 | CL-D071 |
| | OP-D007 | OP-D048 | CL-D057 | OP-D072 |
| | CL-D008 | CL-D049 | OP-D058 | CL-D085 |
| | CL-D009 | CL-D060 | CL-D090 | |
| | CL-D010 | CL-D062 | CL-D094 | |
| | CL-D011 | CL-D063 | OP-D095 | |

Detect drill on adaptor:

Upon receiving a signal from closed sensor switch D054 that the drill motor is down in home position, the drill slave computer commands the sensor switch D068 to detect the drill adaptor on the drill motor.

| 5.9.16 | CL-D003 | OP-D042 | *CL-D068 | |
|---|---|---|---|---|
| | OP-D004 | CL-D043 | CL-D054 | CL-D069 |
| | OP-D005 | OP-D046 | OP-D055 | OP-D070 |
| | OP-D006 | OP-D047 | CL-D056 | CL-D071 |
| | OP-D007 | OP-D048 | CL-D057 | OP-D072 |
| | CL-D008 | CL-D049 | OP-D058 | CL-D085 |
| | CL-D009 | CL-D060 | CL-D090 | |
| | CL-D010 | CL-D062 | CL-D094 | |
| | CL-D011 | CL-D063 | OP-D095 | |

Return horizontal transfer to home:
DRIVE D076D

Return horizontal transfer to home upon receiving the sensor switch D068 that drill adaptor is on the drill. The drill slave computer commands the horizontal transfer mechanism DRIVE D076D to return to home position, closing the home sensor switch D046 and opening sensor switch D049.

| 5.9.17 | CL-D003 | | | |
|---|---|---|---|---|
| | OP-D004 | CL-D054 | CL-D069 | |
| | OP-D005 | OP-D042 | OP-D055 | OP-D070 |
| | OP-D006 | CL-D043 | CL-D056 | CL-D071 |
| | OP-D007 | *CL-D046 | CL-D057 | OP-D072 |
| | CL-D008 | OP-D047 | OP-D058 | CL-D085 |
| | CL-D009 | OP-D048 | CL-D060 | CL-D090 |
| | CL-D010 | *OP-D049 | CL-D062 | CL-D094 |
| | CL-D011 | CL-D063 | OP-D095 | |

NOTE: At this point the drilling operation can begin and the disposal of the old drill adaptor can take place at same time.

5.10.0 Return drill adaptor to storage:

| 5.10.1 | CL-D031 | OP-D038 | CL-D069 |
|---|---|---|---|
| | OP-D032 | CL-D039 | |
| | CL-D033 | OP-D040 | |
| | OP-D034 | CL-D041 | |
| | CL-D035 | OP-D042 | |
| | OP-D036 | CL-D043 | |
| | OP-D037 | CL-D046 | |

Move vertical carriage to #1 receiver:
D076FB
DRIVE D075D

Upon receiving a signal from home position sensor switch D046 & linear feedback from D076 FB, the drill slave computer commands DRIVE D075D to move the vertical transfer carriage from home position to within 0.010 inches from the face of the drill adaptor face, which is restrained by the energized electro magnetic field D078, opening home sensor switch D043.

| 5.10.2 | CL-D031 | OP-D038 | CL-D069 |
|---|---|---|---|

|       |          |          |
|-------|----------|----------|
|       | OP-D032  | CL-D039  |
|       | CL-D033  | OP-D040  |
|       | OP-D034  | CL-D041  |
|       | CL-D035  | OP-D042  |
|       | OP-D036  | *OP-D043 |
|       | OP-D037  | CL-D046  |

Extend tapered pin into drill adaptor recess:
D075FB
D-V6,S1+S2−

Upon receiving the linear feedback from D075 FB and signal from open sensor switch D043, the drill slave computer commands solenoid D-V6,S1 to energize and D-V6,S2 to de-energize, causing the air cylinder taper pin actuator to extend, pushing the pin into the mating hole in the drill adaptor, closing sensor switch D038 and opening sensor switch D039.

| 5.10.3 | CL-D031 | *CL-D038 | CL-D069 |
|--------|---------|----------|---------|
|        | OP-D032 | *OP-D039 |         |
|        | CL-D033 | OP-D040  |         |
|        | OP-D034 | CL-D041  |         |
|        | CL-D035 | OP-D042  |         |
|        | OP-D036 | OP-D043  |         |
|        | OP-D037 | CL-D046  |         |

Transfer drill adaptor from #1 receiver to vertical carriage:

Upon receiving a signal from the closed sensor switch D038 and open sensor switch D039 indicating the pin has engaged the drill adaptor, the drill slave computer commands simultaneously the electro-magnetic field D077 on the vertical transfer platform to energize, closing sensor switch D042 and the electromagnetic field D078 on receiver #1 to de-energize, opening sensor switch D069, transfering the drill adaptor from the #1 receiver of the horizontal transfer mechanism to the vertical transfer platform.

| 5.10.4 | CL-D031 | CL-D038  |         |
|--------|---------|----------|---------|
|        | OP-D032 | OP-D039  | *OP-D069 |
|        | CL-D033 | OP-D040  |         |
|        | OP-D034 | CL-D041  |         |
|        | CL-D035 | *CL-D042 |         |
|        | OP-D036 | OP-D043  |         |
|        | OP-D037 | CL-D046  |         |

Move vertical transfer carriage to home:
DRIVE D075D

Upon receiving signals from the closed sensor switch D042 and open sensor switch D069, the Drill slave computer commands DRIVE D075D to move the vertical transfer carriage to home position, closing home sensor switch D043.

| 5.10.5 | CL-D031 | CL-D038  |         |
|--------|---------|----------|---------|
|        | OP-D032 | OP-D039  | OP-D069 |
|        | CL-D033 | OP-D040  |         |
|        | OP-D034 | CL-D041  |         |
|        | CL-D035 | CL-D042  |         |
|        | OP-D036 | *CL-D043 |         |
|        | OP-D037 | CL-D046  |         |

Detect drill adaptor:
D075FB

Upon receiving linear feedback from D075FB and a signal from the home sensor switch D043 that the vertical transfer mechanism is in home position, the drill slave computer commands the sensor switch D050 to detect the presence of the drill adaptor on the platform. Sensor switch D050 provides signal only on demand.

| 5.10.6 | CL-D012 | CL-D031 | CL-D038 | *CL-D050 |
|--------|---------|---------|---------|----------|
|        | CL-D013 | OP-D032 | OP-D039 |          |
|        | OP-D014 | CL-D033 | OP-D040 |          |
|        | CL-D015 | OP-D034 | CL-D041 |          |
|        | CL-D016 | CL-D035 | CL-D042 |          |
|        | OP-D017 | OP-D036 | CL-D043 |          |
|        |         | OP-D037 | CL-D046 |          |

Upon receiving a signal from the drill adaptor detector sensor switch, D050 that the adaptor is on the platform, the drill slave computer scans its memory for where drill adaptor is to be stored.

5.10.6.1 Is drill broken?
The drill slave computer would select position #7.

5.10.6.2 Has drill produced the prescribed maximum number of holes, and is to be replaced?
The drill slave computer who counts each hole drilled by each drill bit compares count to maximum allowed, and finds it should be replaced, the drill slave computer would select position #7.

5.10.6.3 The drill is still usable.
The drill slave computer checks its memory for the drill size of the removed drill, and its program for storage.

| 5.10.7 | CL-D012 | CL-D031 | CL-D038 |
|--------|---------|---------|---------|
|        | CL-D013 | OP-D032 | OP-D039 |
|        | OP-D014 | CL-D033 | OP-D040 |
|        | CL-D015 | OP-D034 | CL-D041 |
|        | CL-D016 | CL-D035 | CL-D042 |
|        | OP-D017 | OP-D036 | CL-D043 |
|        |         | OP-D037 | CL-D046 |

Move to storage platform:
DRIVE D075D

For example the drill slave computer determines the drill adaptor is to be stored on storage platform #6. The drill slave computer slects the program to move the vertical transfer carriage to storage platform #6, and checks to see if sensor switch D017 on #6 storage platform is open, then commands DRIVE D075D to move the carriage as programed, opening home sensor switch D043.

| 5.10.8 | CL-D012 | CL-D031 | CL-D038  |
|--------|---------|---------|----------|
|        | CL-D013 | OP-D032 | OP-D039  |
|        | OP-D014 | CL-D033 | OP-D040  |
|        | CL-D015 | OP-D034 | CL-D041  |
|        | CL-D016 | CL-D035 | CL-D042  |
|        | OP-D017 | OP-D036 | *OP-D043 |
|        |         | OP-D037 | CL-D046  |

Raise Robot #3 grippers:
D-V2,S1+S2−

Upon receiving linear feedback from D075 FB and signal from open sensor switch D043, the drill slave computer commands solenoid D-V2-S1 to energize and D-V2-S2 to de-energize, causing the Robot #3, cylinder #3, to rise to full height opening switch D035 and closing switch D036.

| 5.10.9 | CL-D012 | CL-D031 | CL-D038 |
|--------|---------|---------|---------|
|        | CL-D013 | OP-D032 | OP-D039 |

-continued

|       |          |          |          |
|-------|----------|----------|----------|
|       | OP-D014  | CL-D033  | OP-D040  |
|       | CL-D015  | OP-D034  | CL-D041  |
|       | CL-D016  | *OP-D035 | CL-D042  |
|       | OP-D017  | *CL-D036 | OP-D043  |
|       |          | OP-D037  | CL-D046  |

Rotate gripper jaws over vertical carriage:
D-V3,S1+S2−

Upon receiving a signal from closed sensor switch D036 and open sensor switch D035, the drill slave computer commands solenoid D-V3,S1 to energize and D-V3,S2 to de-energize, causing cyclinder #1 to actuate opening sensor switch D031 and closing sensor switch D032, rotating grippers over the drill adaptor on the vertical transfer platform.

| 5.10.10 | CL-D012 | *OP-D031 | CL-D038 |
|---------|---------|----------|---------|
|         | CL-D013 | *CL-D032 | OP-D039 |
|         | OP-D014 | CL-D0333 | OP-D040 |
|         | CL-D015 | OP-D034  | CL-D041 |
|         | CL-D016 | OP-D035  | CL-D042 |
|         | OP-D017 | CL-D036  | OP-D043 |
|         |         | OP-D037  | CL-D046 |

Lower grippers around drill adaptor:
D-V2,S1−S2+

Upon receiving a signal from closed sensor switch D032 and open sensor switch D031, the drill slave computer commands solenoid D-V2,S2 to energize and D-V2,S1 to de-energize, causing the #3 cylinder to retract to positive stop, closing switch D037 and opening sensor switch D036, placing the grippers around the drill adaptor stem.

| 5.10.11 | CL-D012 | OP-D031  | CL-D038 |
|---------|---------|----------|---------|
|         | CL-D013 | CL-D032  | OP-D039 |
|         | OP-D014 | CL-D033  | OP-D040 |
|         | CL-D015 | OP-D034  | CL-D041 |
|         | CL-D016 | OP-D035  | CL-D042 |
|         | OP-D017 | *OP-D036 | OP-D043 |
|         |         | *CL-D037 | CL-D046 |

Close grippers around adaptor:
D-V5,-S1+,S2−

Upon receiving a signal from closed sensor switch D032 the drill slave computer commands solenoid D-V5,S1 to energize & D-V5,S2 to de-energize, causing cylinder #4 to actuate, closing grippers around adaptor, opening sensor switch D041 and closing sensor switch D040, gripping the stem of the drill adaptor.

| 5.10.12 | CL-D012 | OP-D031 | CL-D038  |
|---------|---------|---------|----------|
|         | CL-D013 | CL-D032 | OP-D039  |
|         | OP-D014 | CL-D033 | *CL-D040 |
|         | CL-D015 | OP-D034 | *OP-D041 |
|         | CL-D016 | OP-D035 | CL-D042  |
|         | OP-D017 | OP-D036 | OP-D043  |
|         |         | CL-D037 | CL-D046  |

De-energize magnetic coil:

Upon receiving a signal from closed sensor switch D040 and open sensor switch D041, the drill slave computer commands the electro magnetic coil D077 to de-energize, opening sensor switch D042.

| 5.10.13 | CL-D012 | OP-D031 | CL-D038 |
|---------|---------|---------|---------|

| | CL-D013 | CL-D032 | OP-D039 |
|---|---------|---------|---------|
| | OP-D014 | CL-D033 | CL-D040 |
| | CL-D015 | OP-D034 | OP-D041 |
| | CL-D016 | OP-D035 | *OP-D042 |
| | OP-D017 | OP-D036 | OP-D043 |
| |         | CL-D037 | CL-D046 |

Lift drill adaptor:
D-V2,S1+S2−

Upon receiving a signal from sensor switch D042, the drill slave computer commands solenoid D-V2,S1 to energize and D-V2,S2 to de-energize, causing the cylinder #3 to rise to full height, closing sensor switch D036 and opening sensor switch D037.

| 5.10.14 | CL-D012 | OP-D031  | CL-D038 |
|---------|---------|----------|---------|
|         | CL-D013 | CL-D032  | OP-D039 |
|         | OP-D014 | CL-D033  | CL-D040 |
|         | CL-D015 | OP-D034  | OP-D041 |
|         | CL-D016 | OP-D035  | OP-D042 |
|         | OP-D017 | *CL-D036 | OP-D043 |
|         |         | *OP-D037 | CL-D046 |

Retract centering on vertical transfer platform:
D−V6,S1−S2+

Upon receiving a signal from closed sensor switch D036 and open sensor switch D037, the drill slave computer commands solenoid D−V6,S2 to energize and D−V6,S1 to de-energize, causing Cylinder #5 to retract, opening sensor switch D038 and closing sensor switch D039 (FIG. #16), therefore retracting the tapered pin on the Vertical transfer platform.

| 5.10.15 | CL-D012 | OP-D031 | *OP-D038 |
|---------|---------|---------|----------|
|         | CL-D013 | CL-D032 | *CL-D039 |
|         | OP-D014 | CL-D033 | CL-D040  |
|         | CL-D015 | OP-D034 | OP-D041  |
|         | CL-D016 | OP-D035 | OP-D042  |
|         | OP-D017 | CL-D036 | OP-D043  |
|         |         | OP-D037 | CL-D046  |

Move adaptor over storage platform:
D−V4,S1+S2−

Upon receiving a signal from closed sensor switch D039 and open sensor switch D038, the drill slave computer commands solenoid D−V4,S1 to energize and D−V4,S2 to de-energize, causing Cylinder #2 to actuate, opening sensor switch D033 and closing sensor switch D034, rotating the gripper and drill adaptor over the storage platform.

| 5.10.16 | CL-D012 | OP-D031  | OP-D038 |
|---------|---------|----------|---------|
|         | CL-D013 | CL-D032  | CL-D039 |
|         | OP-D014 | *OP-D033 | CL-D040 |
|         | CL-D015 | *CL-D034 | OP-D041 |
|         | CL-D016 | OP-D035  | CL-D042 |
|         | OP-D017 | CL-D036  | OP-D043 |
|         |         | OP-D037  | CL-D046 |

Place drill adaptor on storage platform:
D−V2,S1−S2+

Upon receiving a signal from closed sensor switch D034 and open sensor switch D033, the drill slave computer commands solenoid D−V2,S2 to energize and D−V2,S1 to de-energize, causing the cylinder #3 to retract to a positive stop, closing switch D037 and opening switch D036, placing the drill adaptor on the storage platform, closing sensor switch D017.

| 5.10.17 | CL-D012  | OP-D031  | OP-D038 |
|---------|----------|----------|---------|
|         | CL-D013  | CL-D032  | CL-D039 |
|         | OP-D014  | OP-D033  | CL-D040 |
|         | CL-D015  | CL-D034  | OP-D041 |
|         | CL-D016  | OP-D035  | OP-D042 |
|         | *CL-D017 | *OP-D036 | OP-D043 |
|         |          | *CL-D037 | CL-D046 |

Open gripper jaws:
D−V5,S1−S2+
Upon receiving a signal from closed Sensor switches D037 & D017 and open sensor switch D036, the drill slave computer commands solenoid D−V5,S2 to energize and D−V5,S1 to de-energize, causing the cylinder #4 to retract, opening the jaws, opening sensor switch D040 and closing sensor switch D041.

| 5.10.18 | CL-D012 | OP-D031 | OP-D038  |
|---------|---------|---------|----------|
|         | CL-D013 | CL-D032 | CL-D039  |
|         | OP-D014 | OP-D033 | *OP-D040 |
|         | CL-D015 | CL-D034 | *CL-D041 |
|         | CL-D016 | OP-D035 | OP-D042  |
|         | CL-D017 | OP-D036 | OP-D043  |
|         |         | CL-D037 | CL-D046  |

Raise grippers:
D−V2,S1+S2−
Upon receiving a signal from closed sensor switch D041 and open sensor switch D040, the drill slave computer commands solenoid D.V2,S1 to energize and D.V2,S2 to de-energize, causing cylinder #3 to extend, opening sensor switch D037 and closing sensor switch D036, raising open grippers above the drill adaptor.

| 5.10.19 | CL-D012 | OP-D031  | OP-D038 |
|---------|---------|----------|---------|
|         | CL-D013 | CL-D032  | CL-D039 |
|         | OP-D014 | OP-D033  | OP-D040 |
|         | CL-D015 | CL-D034  | CL-D041 |
|         | CL-D016 | OP-D035  | OP-D042 |
|         | CL-D017 | *CL-D036 | OP-D043 |
|         |         | *OP-D037 | CL-D046 |

Rotate grippers to home position:
D−V3,S1−S2+
D−V4,S1−S2+
Upon receiving a signal from closed sensor switch D036 and open sensor switch D037, the drill slave computer commands solenoids D−V3,S2 & D−V4,S2 to energize and D−V3,S1 & D−V4,S1 to de-energize, causing cylinders #1 and #2 to retract to home position, opening sensor switches D034 and D032 and closing sensor switches D033 and D031.

| 5.10.20 | CL-D012 | *CL-D031 | OP-D038 |
|---------|---------|----------|---------|
|         | CL-D013 | *OP-D032 | CL-D039 |
|         | OP-D014 | *CL-D033 | OP-D040 |
|         | CL-D015 | *OP-D034 | CL-D041 |
|         | CL-D016 | OP-D035  | OP-D042 |
|         | CL-D017 | CL-D036  | OP-D043 |
|         |         | OP-D037  | CL-D046 |

Retract grippers to home position:
D−V2,S1−S2+
Upon receiving a signal from closed sensor switches D031 & D033 and open sensor switches D034 & D033, the drill slave computer commands solenoid D−V2,S2 to energize and D−V2,S1 to de-energize, causing the cylinder #3 to retract, opening sensor switch D036 and closing sensor switch D035.

| 5.10.21 | CL-D012  | CL-D031  | OP-D038 |
|---------|----------|----------|---------|
|         | CL-D013  | OP-D032  | CL-D039 |
|         | OP-D014  | CL-D033  | OP-D040 |
|         | CL-D015  | OP-D034  | CL-D041 |
|         | CL-D016  | *CL-D035 | OP-D042 |
|         | CL-D017  | *OP-D036 | OP-D043 |
|         |          | OP-D037  | CL-D046 |

Return vertical carriage to home:
DRIVE D075D
Upon receiving a signal from closed sensor switch D035 and open sensor switch D036, the drill slave computer commands DRIVE D075D to move the vertical transfer carriage to home position, closing home sensor switch D043.

| 5.10.22 | CL-D012 | CL-D031 | OP-D038  |
|---------|---------|---------|----------|
|         | CL-D013 | OP-D032 | CL-D039  |
|         | OP-D014 | CL-D033 | OP-D040  |
|         | CL-D015 | OP-D034 | CL-D041  |
|         | CL-D016 | CL-D035 | OP-D042  |
|         | CL-D017 | OP-D036 | *CL-D043 |
|         |         | OP-D037 | CL-D046  |

Detect presence of drill adaptor:
D075FB
Upon receiving linear feedback from D075FB and signal from closed sensor switch D045, the drill slave computer signals sensor switch D050 to detect if drill is on vertical transfer platform.

| 5.10.23 | CL-D012 | CL-D031 | OP-D038 |
|---------|---------|---------|---------|
|         | CL-D013 | OP-D032 | CL-D039 |
|         | OP-D014 | CL-D033 | OP-D040 |
|         | CL-D015 | OP-D034 | CL-D041 |
|         | CL-D016 | CL-D035 | OP-D042 |
|         | CL-D017 | OP-D036 | CL-D043 |
|         |         | OP-D037 | CL-D046 |

*OP-D050

Slave computer goes on hold:
Upon receiving a signal from open sensor switch D050, the drill slave computer proceeds to sequence described in 6.1.

6.0 DRILL BUSHING SELECTION 6.0.1 The drill bushing is positioned by a DRIVE D106D which always returns to home position prior to to going to a position. Sensor switch D079 is closed when in home position.

6.0.2 Cylinder #1 raises and lowers a tapered pin which accurately aligns the drill bushing. Sensor switch D081 is closed when pin is up, and sensor switch D083 is closed when pen is down and engaged.

6.0.3 Cylinder #2 raises and lowers the bushing mechanism, sensor switch D058 when closed indicates carriage is down, sensor switch D057 when closed indicates carriage is up in "home" position.

6.0.4 Bushing riser is operated with a DRIVE D084D rotating a cam and when up in home position the sensor switch D059 is closed.

6.1 Drill bushing selection:
6.1.1 When it is necessary to exchange the drill adaptors because of a difference in drill size, the drill slave computer also commands an exchange of bushings.

| 6.1.2 | CL-D046 | CL-D063 |
| --- | --- | --- |
| | CL-D054 | CL-D079 |
| | OP-D055 | OP-D081 |
| | CL-D056 | CL-D083 |
| | CL-D057 | CL-D085 |
| | OP-D058 | CL-D094 |
| | CL-D059 | OP-D095 |
| | CL-D062 | |

Receive drill size from command computer:
D−V8,S1−S2+

Upon receiving the program drill size from the command computer the drill slave computer searches its memory for the drill size on the drill motor, (for drill selection and exchange see Par. 5.7) and upon determining that the drill size on the drill motor is not the size requested, the drill slave computer commands solenoid D−V8,S2 to energize and D−V8,S1 to de-energize, causing cylinder #1, to retract, opening sensor switch D083 and closing sensor switch D081.

| 6.1.3 | CL-D046 | CL-D063 |
| --- | --- | --- |
| | CL-D054 | CL-D079 |
| | OP-D055 | *CL-D081 |
| | CL-D056 | *OP-D083 |
| | CL-D057 | CL-D085 |
| | OP-D058 | CL-D094 |
| | CL-D059 | OP-D095 |
| | CL-D062 | |

Rotate bushing magazine to home:
DRIVE D106D

Upon receiving signals from open sensor switch D083 and closed sensor switch D081, the drill slave computer commands DRIVE D106D to return the magazine to home position, closing sensor switch D079.

| 6.1.4 | CL-D046 | CL-D063 |
| --- | --- | --- |
| | CL-D054 | *CL-D079 |
| | OP-D055 | CL-D081 |
| | CL-D056 | OP-D083 |
| | CL-D057 | CL-D085 |
| | OP-D058 | CL-D094 |
| | CL-D059 | OP-D095 |
| | CL-D062 | |

Rotate bushing magazine to programed position:
D106FB
DRIVE D106D

Upon receiving Rotary feedback from D106 feedback and signal from closed home sensor switch D079, the drill slave computer searches its memory for the bushing selection program, which matches the requested drill, and commands DRIVE D106 to rotate the magazine to the programed position.

| 6.1.5 | CL-D046 | CL-D063 |
| --- | --- | --- |
| | CL-D054 | CL-D079 |
| | OP-D055 | CL-D081 |
| | CL-D056 | OP-D083 |
| | CL-D057 | CL-D085 |
| | OP-D058 | CL-D094 |
| | CL-D059 | OP-D095 |
| | CL-D062 | |

Engage alignment pin:
D106FB
D−V8,S1+S2−

Upon receiving rotary feedback from D106FB, the drill slave computer commands solenoid D−V8,S1 to energize and D−V8,S2 to de-energize, causing cylinder #1 to extend, engaging the alignment pin and bushing, opening sensor switch D081 and closing sensor switch D083.

| 6.1.6 | CL-D046 | CL-D063 |
| --- | --- | --- |
| | CL-D054 | CL-D079 |
| | OP-D055 | *OP-D081 |
| | CL-D056 | *CL-D083 |
| | CL-D057 | CL-D085 |
| | OP-D058 | CL-D094 |
| | CL-D059 | OP-D095 |
| | CL-D062 | |

Upon receiving signal from closed sensor switch D083 and open sensor switch D081, the drill slave computer proceeds to sequence described in 7.1.

7.1 Prepare for drill operation:
7.1.1 Material thickness to be drilled:

The drill slave computer signals the drill command computer, requesting the material thickness to be drilled.

7.1.2 Establish drill feed program:

Upon receiving the material thickness from the command computer, the drill slave computer calculates cam rotation program needed to drive the drill bits lips 0.010 inches above the material surface and places it in memory.

| 7.1.3 | CL-D003 | CL-D057 | CL-D083 | OP-D099 |
| --- | --- | --- | --- | --- |
| | OP-D004 | OP-D058 | CL-D085 | OP-D102 |
| | OP-D005 | CL-D059 | CL-D086 | OP-D103 |
| | OP-D006 | CL-D060 | OP-D087 | OP-D105 |
| | OP-D007 | OP-D061 | CL-D088 | CL-D017 |
| | CL-D008 | CL-D062 | CL-D090 | |
| | CL-D009 | CL-D063 | OP-D092 | |
| | CL-D010 | CL-D068 | CL-D094 | |
| | CL-D011 | CL-D071 | OP-D095 | |
| | CL-D054 | OP-D072 | OP-D097 | |
| | OP-D055 | OP-D081 | CL-D098tz,1/32 | |

Start drill motor:

Upon receiving the material thickness from the command computer, the drill slave computer commands drill the motor to start, closing sensor switch D072.

| 7.1.4 | CL-D003 | CL-D057 | CL-D083 | OP-D099 |
| --- | --- | --- | --- | --- |
| | OP-D004 | OP-D058 | CL-D085 | OP-D102 |
| | OP-D005 | CL-D059 | CL-D086 | OP-D105 |
| | OP-D006 | CL-D060 | OP-D087 | CL-D107 |
| | OP-D007 | OP-D061 | CL-D088 | |
| | CL-D008 | CL-D062 | CL-D090 | |
| | CL-D009 | CL-D063 | OP-D092 | |
| | CL-D010 | CL-D071 | CL-D094 | |
| | CL-D011 | *CL-D072 | OP-D095 | |
| | CL-D054 | OP-D081 | OP-D097 | |
| | OP-D055 | CL-D098 | | |

Move drill mechanism to "X" centerline of drill station:
DRIVE D091D

Upon receiving signal from closed sensor switch D072, the drill slave computer commands the "Y" axis, DRIVE D091D, to move the drill assembly mechanism a preset programed distance to the "X" center line of drill station, closing sensor switch D092 and opening sensor switch D063.

| 7.1.5 | CL-D003 | CL-D057 | CL-D083 | OP-D099 |
|---|---|---|---|---|
| | OP-D004 | OP-D058 | CL-D085 | OP-D102 |
| | OP-D005 | CL-D059 | CL-D086 | OP-D105 |
| | OP-D006 | CL-D060 | OP-D087 | CL-D107 |
| | OP-D007 | OP-D061 | CL-D088 | |
| | CL-D008 | CL-D062 | CL-D090 | |
| | CL-D009 | *OP-D063 | *CL-D092 | |
| | CL-D010 | CL-D071 | CL-D094 | |
| | CL-D011 | CL-D072 | OP-D095 | |
| | CL-D054 | OP-D081 | OP-D097 | |
| | OP-D055 | CL-D098 | | |

Go to storage for drill guard:
D091FB
DRIVE D093D

Upon receiving linear feedback from D091FB, and signals from closed sensor switch D092 and open sensor switch D063, the drill slave computer commands DRIVE D093 to drive the drill mechanism forward a programmed distance engaging the drill guard, and over riding dog #2 and compressing springs #1 & #2, opening sensor switches D062, D060 and closing D095, D097.

| 7.1.6 | CL-D003 | CL-D057 | CL-D083 | OP-D099 |
|---|---|---|---|---|
| | OP-D004 | OP-D058 | CL-D085 | OP-D102 |
| | OP-D005 | CL-D059 | CL-D086 | OP-D105 |
| | OP-D006 | *OP-D060 | OP-D087 | CL-D107 |
| | OP-D007 | OP-D061 | CL-D088 | |
| | CL-D008 | *CL-D062 | CL-D090 | |
| | CL-D009 | OP-D063 | CL-D092 | |
| | CL-D010 | CL-D071 | CL-D094 | |
| | CL-D011 | CL-D072 | *CL-D095 | |
| | CL-D054 | OP-D081 | *CL-D097 | |
| | OP-D055 | CL-D098 | | |

Disengage storage lock:

Upon receiving linear feedback from D093FB, and signals from closed sensor switch D095, and open sensor switches D060 & D062, the drill slave commands Solenoid D096 to energize disengaging Dog #1 and closing sensor switch D099.

| 7.1.7 | CL-D003 | CL-D057 | CL-D083 | *CL-D099 |
|---|---|---|---|---|
| | OP-D004 | OP-D058 | CL-D085 | OP-D102 |
| | OP-D005 | CL-D059 | CL-D086 | OP-D105 |
| | OP-D006 | OP-D060 | OP-D087 | CL-D107 |
| | OP-D007 | OP-D061 | CL-D088 | |
| | CL-D008 | OP-D062 | CL-D090 | |
| | CL-D009 | OP-D063 | CL-D092 | |
| | CL-D010 | CL-D071 | CL-D094 | |
| | CL-D011 | CL-D072 | CL-D095 | |
| | CL-D054 | OP-D081 | CL-D097 | |
| | OP-D055 | CL-D098 | | |

Move drill mechanism to zero position:
DRIVE D093D

Upon receiving a signal from closed sensor switch D099, the drill slave computer commands DRIVE D093D to reverse a programmed distance to zero position, closing sensor switches D101, D061 and opening sensor switch D098 and D094.

| 7.1.8 | CL-D003 | CL-D057 | CL-D083 | *CL-D099 |
|---|---|---|---|---|
| | OP-D004 | OP-D058 | CL-D085 | *CL-D101 |
| | OP-D005 | CL-D059 | CL-D086 | OP-D102 |
| | OP-D006 | OP-D060 | OP-D087 | OP-D105 |
| | OP-D007 | *CL-D061 | CL-D088 | CL-D107 |
| | CL-D008 | OP-D062 | CL-D090 | |
| | CL-D009 | OP-D063 | CL-D092 | |
| | CL-D010 | CL-D071 | *OP-D094 | |
| | CL-D011 | CL-D072 | CL-D095 | |
| | CL-D054 | OP-D081 | CL-D097 | |
| | OP-D055 | *OP-D098 | | |

De-Energize Solenoid:
D093FB

Upon receiving linear feedback from D093FB, and signals from closed sensor switches D101, D061 & open sensor switches D094 & D098, the drill slave computer commands the solenoid D096 to de-energize, opening sensor switch D099.

| 7.1.9 | CL-D003 | CL-D057 | CL-D083 | *OP-D099 |
|---|---|---|---|---|
| | OP-D004 | OP-D058 | CL-D085 | CL-D101 |
| | OP-D005 | CL-D059 | CL-D086 | OP-D102 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | CL-D092 | |
| | CL-D010 | CL-D071 | OP-D094 | |
| | CL-D011 | CL-D072 | CL-D095 | |
| | CL-D054 | OP-D081 | CL-D097 | |
| | OP-D055 | OP-D098 | | |

Raise drill motor to stop:
D−V7,S1+S2−

Upon receiving linear feedback from D093FB, and signals from closed sensor switches D101, D061 & open sensor switches D094 & D098, the drill slave computer commands solenoid D−V7,S1 to energize and D−V7,S2 to de-energize, causing the hydraulic cylinder, to raise the drill mechanism to a positive stop, closing sensor switch D055 & open sensor switch D054.

| 7.1.10 | CL-D003 | CL-D057 | CL-D083 | OP-D099 |
|---|---|---|---|---|
| | OP-D004 | OP-D058 | CL-D085 | CL-D101 |
| | OP-D005 | CL-D059 | CL-D086 | OP-D102 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | CL-D092 | |
| | CL-D010 | CL-D071 | OP-D094 | |
| | CL-D011 | CL-D072 | CL-D095 | |
| | *OP-D054 | OP-D081 | CL-D097 | |
| | *CL-D055 | OP-D098 | | |

Lower bushing carriage:
D−V9,S1−S2+

Upon receiving linear feedback from D093FB and signals from closed sensor switches D101, D061 and open sensor switches D094 & D098 the drill slave computer commands solenoid D−V9,S2 to energize and D.V9,S1 to de-energize, causing the hydraulic cylinder, to lower the drill bushing carriage, engaging the cam follower and cam, opening sensor switch D057 & closing sensor switch D058.

| 7.1.11 | CL-D003 | *OP-D057 | CL-D083 | OP-D099 |
|---|---|---|---|---|
| | OP-D004 | *CL-D058 | CL-D085 | CL-D101 |
| | OP-D005 | CL-D059 | CL-D086 | OP-D102 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | CL-D092 | |
| | CL-D010 | CL-D071 | OP-D094 | |
| | CL-D011 | CL-D072 | CL-D095 | |
| | OP-D054 | OP-D081 | CL-D097 | |

-continued

| | | |
|---|---|---|
| CL-D055 | OP-D098 | |

Signal command computer ready to drill:
Upon receiving signals from closed sensor switches D058 and open sensor switch D057, the drill slave computer signals the command computer ready to drill and requests Hole location.
8.1 Drill holes

| 8.1.1 | CL-D003 | OP-D057 | CL-D083 | OP-D099 |
|---|---|---|---|---|
| | OP-D004 | CL-D058 | CL-D085 | CL-D101 |
| | OP-D005 | CL-D059 | CL-D086 | OP-D102 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | CL-D092 | |
| | CL-D010 | CL-D071 | OP-D094 | |
| | CL-D011 | CL-D072 | CL-D095 | |
| | OP-D054 | OP-D081 | CL-D097 | |
| | CL-D055 | OP-D098 | | |

Command computer signals x-y dimensions for first hole:
Upon receiving a signal from the slave computer, for hole location, the command computer signals the drill slave computer the x-y dimensions for the 1st hole location.

| 8.1.2 | CL-D003 | OP-D057 | CL-D083 | OP-D099 |
|---|---|---|---|---|
| | OP-D004 | CL-D058 | CL-D085 | CL-D101 |
| | OP-D005 | CL-D059 | CL-D086 | OP-D102 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | CL-D092 | |
| | CL-D010 | CL-D071 | OP-D094 | |
| | CL-D011 | CL-D072 | CL-D095 | |
| | OP-D054 | OP-D081 | CL-D097 | |
| | CL-D055 | OP-D098 | | |

Move drill to first hole location:
D091D
D093D
Upon receiving the x-y dimensions the drill slave computer programs the movement and commands the "Y" axis DRIVE D091D & "X" axis DRIVE D093D drives to move the drill assembly to the programmed position, opening sensor switches D092 & D101, (Note D092 & D101 sensor switch are used as the starting and finishing location of the drill mechanism, any signals from these switches in between are ignored).

| 8.1.3 | CL-D003 | OP-D057 | CL-D083 | OP-D099 |
|---|---|---|---|---|
| | OP-D004 | CL-D058 | CL-D085 | *OP-D101 |
| | OP-D005 | CL-D059 | CL-D086 | OP-D102 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | *OP-D092 | |
| | CL-D010 | CL-D071 | OP-D094 | |
| | CL-D011 | CL-D072 | CL-D095 | |
| | OP-D054 | OP-D081 | CL-D097 | |
| | CL-D055 | OP-D098 | | |

B-O-Lube application:
D091FB
D093FB
S1+

Upon receiving linear feedback from both D091FB & D093FB, the drill slave computer commands solenoid D−V10,S1 to momentarily energize, causing a pulse of BO-Lube to be applied to the drill point, momentarily closing sensor switch D087.

| 8.1.4 | CL-D003 | OP-D057 | CL-D083 | OP-D099 |
|---|---|---|---|---|
| | OP-D004 | CL-D058 | CL-D085 | OP-D102 |
| | OP-D005 | CL-D059 | CL-D086 | OP-D105 |
| | OP-D006 | OP-D060 | *CL-D087 | CL-D107 |
| | OP-D007 | CL-D061 | CL-D088 | |
| | CL-D008 | OP-D062 | CL-D090 | |
| | CL-D009 | OP-D063 | OP-D094 | |
| | CL-D010 | CL-D071 | CL-D095 | |
| | CL-D011 | CL-D072 | CL-D097 | |
| | OP-D054 | OP-D081 | OP-D098 | |
| | CL-D055 | | | |

Lower bushing:
D091FB & D093FB
DRIVE D084D
Upon receiving the linear feedback from D091FB & D093FB feedback, the drill slave computer commands the DRIVE D084D, driving the bushing cam, to rotate 180°, closing sensor switch D102 and opening home sensor switch D059.

| 8.1.5 | CL-D003 | OP-D057 | CL-D083 | OP-D099 |
|---|---|---|---|---|
| | OP-D004 | CL-D058 | CL-D085 | *CL-D102 |
| | OP-D005 | *OP-D059 | CL-D086 | OP-D105 |
| | OP-D006 | OP-D060 | OP-D087 | CL-D107 |
| | OP-D007 | CL-D061 | CL-D088 | |
| | CL-D008 | OP-D062 | CL-D090 | |
| | CL-D009 | OP-D063 | OP-D094 | |
| | CL-D010 | CL-D071 | CL-D095 | |
| | CL-D011 | CL-D072 | CL-D097 | |
| | OP-D054 | OP-D081 | OP-D098 | |
| | CL-D055 | | | |

Drill hole:
D084FB
DRIVE D089D
Upon receiving rotary feedback from D084FB and signal from closed sensor switch D102, the drill slave computer commands the DRIVE D089D drill feed mechanism to feed the drill into the part a programmed distance Ref 7.1.2, opening sensor switch D090.

| 8.1.6 | CL-D003 | OP-D057 | CL-D083 | OP-D099 |
|---|---|---|---|---|
| | OP-D004 | CL-D058 | CL-D085 | CL-D102 |
| | OP-D005 | CL-D059 | CL-D086 | OP-D105 |
| | OP-D006 | OP-D060 | OP-D087 | CL-D107 |
| | OP-D007 | CL-D061 | CL-D088 | |
| | CL-D008 | OP-D062 | *OP-D090 | |
| | CL-D009 | OP-D063 | OP-D094 | |
| | CL-D010 | CL-D071 | CL-D095 | |
| | CL-D011 | CL-D072 | CL-D097 | |
| | OP-D054 | OP-D081 | OP-D098 | |
| | CL-D055 | | | |

Retract dill:
D089FB
D089D
Upon receiving rotary feedback from D089FBand signal from open sensor switch D090, the drill slave computer commands DRIVE D089D to reverse to home position, closing sensor switch D090.

| 8.1.7 | CL-D003 | OP-D057 | CL-D083 | OP-D099 |
|---|---|---|---|---|
| | OP-D004 | CL-D058 | CL-D085 | CL-D102 |

|  |  |  |
|---|---|---|
| OP-D005 | OP-D059 | CL-D086 | OP-D105 |
| OP-D006 | OP-D060 | OP-D087 | CL-D107 |
| OP-D007 | CL-D061 | CL-D088 | |
| CL-D008 | OP-D062 | *CL-D090 | |
| CL-D009 | OP-D063 | OP-D094 | |
| CL-D010 | CL-D071 | CL-D095 | |
| CL-D011 | CL-D072 | CL-D097 | |
| OP-D054 | OP-D081 | OP-D098 | |
| CL-D055 | | | |

Check to see if hole was drilled:
D089FB

Upon receiving signal from closed sensor switch D090 and rotary feedback from D089FB, the drill slave computer signals sensor switch D103 to determine if hole has been drilled.

Note: (Sensor switch D103 responds to the drill slave computer on demand only).

| 8.1.8 | CL-D003 | OP-D057 | CL-D083 | OP-D099 |
|---|---|---|---|---|
| | OP-D004 | CL-D058 | CL-D085 | CL-D102 |
| | OP-D005 | OP-D059 | CL-D086 | *OP-D103 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | OP-D094 | |
| | CL-D010 | CL-D071 | CL-D095 | |
| | CL-D011 | CL-D072 | CL-D097 | |
| | OP-D054 | OP-D081 | OP-D098 | |
| | CL-D055 | | | |

Raise bushing:
DRIVE D084D

Upon receiving signal from sensor switch D103 that hole is good, the drill slave computer commands DRIVE D084D to rotate to home position, closing sensor switch D059 and opening sensor switch D102.

| 8.1.9 | CL-D003 | OP-D057 | CL-D083 | OP-D099 |
|---|---|---|---|---|
| | OP-D004 | CL-D058 | CL-D085 | *OP-D102 |
| | OP-D005 | *CL-D059 | CL-D086 | OP-D105 |
| | OP-D006 | OP-D060 | OP-D087 | CL-D107 |
| | OP-D007 | CL-D061 | CL-D088 | |
| | CL-D008 | OP-D062 | CL-D090 | |
| | CL-D009 | OP-D063 | OP-D094 | |
| | CL-D010 | CL-D071 | CL-D095 | |
| | CL-D011 | CL-D072 | CL-D097 | |
| | OP-D054 | OP-D081 | OP-D098 | |
| | CL-D055 | | | |

Request next program:
D084FB

Upon receiving rotary feedback from D089FB and signal from closed home sensor switch D059 and open sensor switch D102, the drill slave computer signals the command computer, "for next x-y dimensions", and described operations are repeated until all the holes are drilled.

| 8.1.10 | CL-D003 | OP-D057 | CL-D083 | OP-D099 |
|---|---|---|---|---|
| | OP-D004 | CL-D058 | CL-D085 | OP-D102 |
| | OP-D005 | CL-D059 | CL-D086 | OP-D105 |
| | OP-D006 | OP-D060 | OP-D087 | CL-D107 |
| | OP-D007 | CL-D061 | CL-D088 | |
| | CL-D008 | OP-D062 | CL-D090 | |
| | CL-D009 | OP-D063 | OP-D094 | |
| | CL-D010 | CL-D071 | CL-D095 | |
| | CL-D011 | CL-D072 | CL-D097 | |
| | OP-D054 | OP-D081 | OP-D098 | |
| | CL-D055 | | | |

Request program for next hole location:

When the last hole is drilled and the "request for x-y dimensions" signal is sent to the command computer, the command computer signals the drill slave computer all holes drilled.

| 8.1.11 | CL-D003 | OP-D057 | CL-D083 | OP-D099 |
|---|---|---|---|---|
| | OP-D004 | CL-D058 | CL-D085 | OP-D102 |
| | OP-D005 | CL-D059 | CL-D086 | OP-D105 |
| | OP-D006 | OP-D060 | OP-D087 | CL-D107 |
| | OP-D007 | CL-D061 | CL-D088 | |
| | CL-D008 | OP-D062 | CL-D090 | |
| | CL-D009 | OP-D063 | OP-D094 | |
| | CL-D010 | CL-D071 | CL-D095 | |
| | CL-D011 | CL-D072 | CL-D097 | |
| | OP-D054 | OP-D081 | OP-D098 | |
| | CL-D055 | | | |

Move drill motor to zero position:
D091D
D093D

Upon receiving the signal all holes drilled from the command computer, the drill slave computer commands DRIVES D091D & D093D to move to a programmed position, placing the drill mechanism on the zero position of the drill station, closing sensor switches D092 & D101.

| 8.1.12 | CL-D003 | OP-D057 | CL-D083 | OP-D099 |
|---|---|---|---|---|
| | OP-D004 | CL-D058 | CL-D085 | *CL-D101 |
| | OP-D005 | CL-D059 | CL-D086 | OP-D102 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | *CL-D092 | |
| | CL-D010 | CL-D071 | OP-D094 | |
| | CL-D011 | CL-D072 | CL-D095 | |
| | OP-D054 | OP-D081 | CL-D097 | |
| | CL-D055 | OP-D098 | | |

Lower drill mechanism:
D091FB & D093FB
D-V7,S1−S2+

Upon receiving linear feedback from D091FB & D093FB and signals from closed sensors D092, D101. The drill slave computer commands solenoid D-V7,S2 to energize and D-V7,S1 to de-energize, causing a hydraulic cylinder to lower, opening sensor switch D055 and closing sensor switch D054.

| 8.1.13 | CL-D003 | OP-D057 | CL-D083 | OP-D099 |
|---|---|---|---|---|
| | OP-D004 | CL-D058 | CL-D085 | CL-D101 |
| | OP-D005 | CL-D059 | CL-D086 | OP-D102 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | CL-D092 | |
| | CL-D010 | CL-D071 | OP-D094 | |
| | CL-D011 | CL-D072 | CL-D095 | |
| | *CL-D054 | OP-D081 | CL-D097 | |
| | *OP-D055 | OP-D098 | | |

Raise bushing carriage:
D091FB & D093FB
D-V9,S1+S2−

Upon receiving linear feedback from D091FB & D093FB and signals from closed sensors D092 & D101.

The drill slave computer commands solenoid D-V9,S1 to energize and D-V9,S2 to de-energize, causing the hydraulic cylinder to raise the bushing carriage to home position, opening sensor switch D058 and closing sensor switch D057.

| 8.1.14 | CL-D003 | *CL-D057 | CL-D083 | OP-D099 |
|---|---|---|---|---|
| | OP-D004 | *OP-D058 | CL-D085 | CL-D101 |
| | OP-D005 | CL-D059 | CL-D086 | OP-D102 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | CL-D092 | |
| | CL-D010 | CL-D071 | OP-D094 | |
| | CL-D011 | CL-D072 | CL-D095 | |
| | CL-D054 | OP-D081 | CL-D097 | |
| | OP-D055 | | OP-D098 | |

Turn off drill motor:
Upon receiving signal all holes drilled. The drill slave computer turns the drill motor off, closing sensor switch D072 by the time the drill carriage is in home position.

| 8.1.15 | CL-D003 | CL-D057 | CL-D083 | OP-D099 |
|---|---|---|---|---|
| | OP-D004 | OP-D058 | CL-D085 | CL-D101 |
| | OP-D005 | CL-D059 | CL-D086 | OP-D102 |
| | OP-D006 | OP-D060 | OP-D087 | OP-D105 |
| | OP-D007 | CL-D061 | CL-D088 | CL-D107 |
| | CL-D008 | OP-D062 | CL-D090 | |
| | CL-D009 | OP-D063 | CL-D092 | |
| | CL-D010 | CL-D071 | OP-D094 | |
| | CL-D011 | *OP-D072 | CL-D095 | |
| | CL-D054 | OP-D081 | CL-D097 | |
| | OP-D055 | | OP-D098 | |

*Motor will ramp down to stop in (4) seconds

Store drill guard:
DRIVE D093D
Upon receiving signals from closed sensor switches D054 & D057 and open sensor switches D055 and D058, the drill slave computer commands DRIVE D093D to move the drill motor forward a programmed distance, to store the drill guard, engaging dog #1, closing sensor switches D094, D095, D097, & D098 and opening sensor switches D061 and D101.

| 8.1.16 | CL-D003 | CL-D057 | CL-D083 | OP-D099 |
|---|---|---|---|---|
| | OP-D004 | OP-D058 | CL-D085 | *OP-D101 |
| | OP-D005 | CL-D059 | CL-D086 | OP-D102 |
| | OP-D006 | OP-D060 | OP-D087 | OP-D105 |
| | OP-D007 | *OP-D061 | CL-D088 | CL-D107 |
| | CL-D008 | OP-D062 | CL-D090 | |
| | CL-D009 | OP-D063 | CL-D092 | |
| | CL-D010 | CL-D071 | *CL-D094 | |
| | CL-D011 | OP-D072 | *CL-D095 | |
| | CL-D054 | OP-D081 | *CL-D097 | |
| | OP-D055 | | *CL-D098 | |

Lock drill guard in storage:
D093FB
Upon receiving linear feedback from D093FB and a signal from closed sensor switches D094, D095 D097 & D098, and open sensor switches D060 & D061 and D101 the drill slave computer commands solenoid D104 to energize, disengaging dog #2 closing sensor switch D105.

| 8.1.17 | CL-D003 | CL-D057 | CL-D083 | OP-D099 |
|---|---|---|---|---|
| | OP-D004 | OP-D058 | CL-D085 | OP-D102 |
| | OP-D005 | CL-D059 | CL-D086 | *CL-D105 |
| | OP-D006 | OP-D060 | OP-D087 | CL-D107 |
| | OP-D007 | OP-D061 | CL-D088 | |
| | CL-D008 | OP-D062 | CL-D090 | |
| | CL-D009 | OP-D063 | CL-D092 | |
| | CL-D010 | CL-D071 | CL-D094 | |
| | CL-D011 | OP-D072 | CL-D095 | |
| | CL-D054 | OP-D081 | CL-D097 | |
| | OP-D055 | | CL-D098 | |

"X" axis return to home:
D093D
Upon receiving a signal from closed sensor switch D105, the drill slave computer commands DRIVE D093D to reverse to home position, closing the home position sensor switch D062. The springs behind the drill guard push the drill guard out engaging DOG #1 & closes sensor switch D060 and opens D097, & D095.

| 8.1.18 | CL-D003 | CL-D057 | CL-D083 | OP-D099 |
|---|---|---|---|---|
| | OP-D004 | OP-D058 | CL-D085 | OP-D102 |
| | OP-D005 | CL-D059 | CL-D086 | CL-D105 |
| | OP-D006 | *CL-D060 | OP-D087 | CL-D107 |
| | OP-D007 | OP-D061 | CL-D088 | |
| | CL-D008 | *CL-D062 | CL-D090 | |
| | CL-D009 | OP-D063 | CL-D092 | |
| | CL-D010 | CL-D071 | CL-D094 | |
| | CL-D011 | OP-D072 | *OP-D095 | |
| | CL-D054 | OP-D081 | *OP-D097 | |
| | OP-D055 | | CL-D098 | |

De-Energize Solenoid:
D093FB
Upon receiving linear feedback from D093FB servo feedback, and closed sensor switches D062 and D060, the drill slave computer commands the Solenoid D104 to de-energize, lowering #2 Dog, and opening sensor switch D105.

| 8.1.19 | CL-D003 | CL-D057 | CL-D083 | OP-D099 |
|---|---|---|---|---|
| | OP-D004 | OP-D058 | CL-D085 | OP-D102 |
| | OP-D005 | CL-D059 | CL-D086 | *OP-D105 |
| | OP-D006 | CL-D060 | OP-D087 | CL-D107 |
| | OP-D007 | OP-D061 | CL-D088 | |
| | CL-D008 | CL-D062 | CL-D090 | |
| | CL-D009 | OP-D063 | CL-D092 | |
| | CL-D010 | CL-D071 | CL-D094 | |
| | CL-D011 | OP-D072 | OP-D095 | |
| | CL-D054 | OP-D081 | OP-D097 | |
| | OP-D055 | | CL-D098 | |

"Y" axis return to home:
DRIVE D091D
Upon receiving a signal from closed sensor switches D062 & D060, the drill slave computer commands the "Y" axis DRIVE D091D to move the drill mechanism carriage to the "Y" axis home position, closing the "Y" axis home sensor switch D063 and opening sensor switch D092.

| 8.1.20 | CL-D003 | CL-D057 | CL-D083 | OP-D099 |
|---|---|---|---|---|
| | OP-D004 | OP-D058 | CL-D085 | OP-D102 |
| | OP-D005 | CL-D059 | CL-D086 | OP-D105 |
| | OP-D006 | CL-D060 | OP-D087 | CL-D107 |
| | OP-D007 | OP-D061 | CL-D088 | |
| | CL-D008 | *CL-D062 | CL-D090 | |
| | CL-D009 | *CL-D063 | *OP-D092 | |
| | CL-D010 | CL-D071 | CL-D094 | |
| | CL-D011 | OP-D072 | OP-D095 | |
| | CL-D054 | OP-D081 | OP-D097 | |

-continued

| | |
|---|---|
| OP-D055 | CL-D098 |

Signal command computer:
D093FB
Upon receiving a signal from the "X" & Y axis home sensor switches D062 & D063 and linear feedback from D093FB & D091FB, the drill slave computer signals the command computer for confirmation that Robot #4 is available to pick up part.
12.0 Robot #4 Remove workpiece from drill station:

| 12.1.1 | CL-R401 | OP-R404 | |
|---|---|---|---|
| | CL-R402 | OP-R405 | |
| | CL-R403 | OP-R409 | |
| | CL-D003 | CL-D054 | CL-D085 |
| | OP-D004 | OP-D055 | CL-D086 |
| | OP-D005 | CL-D057 | CL-D088 |
| | OP-D006 | OP-D058 | CL-D107 |
| | OP-D007 | *CL-D062 | |
| | CL-D008 | *CL-D063 | |
| | CL-D009 | CL-D071 | |
| | CL-D010 | OP-D072 | |
| | CL-D011 | OP-D074 | |
| | DFSD-01 & 02 | | |

Confirm Robot #4 is ready to pick up part:
The drill slave computer signals the command computer requesting conformation that Robot #4 is available to pick up part. When the succeeding command computer has signalled that the Robot #4 is available, the command computer will signal the requesting slave computer that Robot #4 is available.

We claim:

1. A method for fabricating parts on a unified design and manufacturing system including a computer-aided design terminal having an input, and a plurality of manufacturing stations located with respect to a plurality of axes and programmed with a set of manufacturing commands to execute manufacturing and transport operations in accordance with part definition data records, the method comprising the steps of:
   establishing a reference point at the input of the computer-aided design terminal;
   entering into the system the configuration of a part desired to be fabricated, the configuration being expressed with respect to the reference point and being entered at the input of the computer-aided design terminal;
   entering into the system manufacturing process planning data;
   generating from the configuration and the manufacturing process planning data a set of part definition data records corresponding to a part desired to be fabricated, each of the part definition data records being expressed in relation to the reference point and corresponding to one of the manufacturing stations;
   supplying to a first one of the manufacturing stations material to be machined into a part, in response to a command to fabricate the part;
   associating the reference point with a specified location on the material;
   transmitting to the first one of the manufacturing stations a first part definition data record from the set of part definition data records corresponding to a part desired to be fabricated, the first part definition data record corresponding to the first manufacturing station;
   executing a set of manufacturing instructions at the first manufacturing station in accordance with the manufacturing commands programmed into the first manufacturing station and the first part definition data record to transport the material to the first manufacturing station and to machine the material while maintaining a known orientation between the specified location on the material and the axes;
   transmitting to a subsequent manufacturing station a subsequent part definition data record from the set of part definition data records corresponding to the part desired to be fabricated, the subsequent part definition data record corresponding to the subsequent manufacturing station;
   executing a set of manufacturing instructions at the subsequent manufacturing station in accordance with the manufacturing commands programmed into the subsequent manufacturing station and the subsequent part definition record to transport material to the subsequent manufacturing station and to machine the material while maintaining a known orientation between the specified location on the material and the axes; and
   repeatedly performing the immediately preceding two steps while maintaining a known orientation between the specified location on the material and the axes until manufacturing and transport operations corresponding to all part definition data records in the set have been executed.

2. A method as recited in claim 1 wherein the step of executing a set of manufacturing instructions comprises the substeps of converting the part description data into dimensional parameters, combining the dimensional parameters with the manufacturing commands stored in the manufacturing station to form electrical signals for driving actuators and cutting tools of the manufacturing station, and supplying the electrical signals to corresponding actuators and cutting tools of the manufacturing stations to machine a part to a configuration designated by the part description data.

3. A method as recited in claim 2 wherein the step of executing a set of manufacturing instructions comprises the additional substep of storing a set of predetermined sensor states corresponding to the manufacturing instructions, periodically monitoring the states of sensors at the manufacturing station, comparing the monitored sensor states with the predetermined states, and generating an alarm signal when the monitored sensor states do not correspond to the predetermined states.

4. A method as recited in claim 3 comprising the additional steps of:
   identifying a sensor whose state differs from a predetermined state and a manufacturing operation being performed during detection of the differing sensor state;
   displaying the identified sensor and operation;
   generating a program sequence to be followed to search for a source of a fault related to the identified sensor and operation;
   performing diagnostic action specified by the program sequence to identify a source of a fault; and
   performing, in response to the diagnostic action, a maintenance procedure for the identified fault.

5. A method as recited in claim 2, wherein the manufacturing stations include a machining station and a vision station, the method including the steps of:
   processing parts at the machining station to obtain structural features having coordinates related to the reference point;
   determining the coordinates of the structural features of a part processed by the machining station;
   comparing the coordinates to a predetermined set of coordinates specified by the part definition data records to obtain difference information;
   transferring the difference information to the machining station; and
   modifying data from part definition data records in the machining station to provide offsetting corrections on subsequently processed parts.

6. A method for fabricating parts on a unified design and manufacturing system including a computer-aided design terminal having an input, and a plurality of manufacturing stations programmed with a set of manufacturing commands to execute manufacturing and transport operations in accordance with part definition data records, the method comprising the steps of:
   entering at the input of the computer-aided design terminal the configuration of a part desired to be fabricated;
   entering manufacturing process planning data into the system;
   generating from the configuration and the manufacturing process planning data a set of part definition data records corresponding to a part desired to be fabricated, each of the part definition data records corresponding to one of the manufacturing stations;
   transmitting to the first one of the manufacturing stations, in response to a command to fabricate a part, a first part definition data record from the set of part definition data records corresponding to a part desired to be fabricated, the first part definition data record corresponding to the first manufacturing station;
   executing a set of manufacturing instructions at the first manufacturing station in accordance with the manufacturing commands programmed into the first manufacturing station and the first part definition data record to transport the material to the first manufacturing station and to machine the material;
   transmitting to a subsequent manufacturing station a subsequent part definition data record from the set of part definition data records corresponding to the part desired to be fabricated, the subsequent part definition data record corresponding to the subsequent manufacturing station;
   executing a set of manufacturing instructions at the subsequent manufacturing station in accordance with the manufacturing commands programmed into the subsequent manufacturing station and the subsequent part definition data record to transport material to the subsequent manufacturing station and to machine the material; and
   repeatedly performing the immediately preceding two steps until manufacturing and transport operations corresponding to all part definition data records in the set have been executed;
   each of the steps of executing a set of manufacturing instructions comprising the substeps of converting the part description data into dimensional parameters, combining the dimensional parameters with the manufacturing commands stored in the manufacturing station to form electrical signals for driving actuators and cutting tools of the manufacturing station, and supplying the electrical signals to corresponding actuators and cutting tools of the manufacturing stations to machine a part to a configuration designated by the part description data.

7. A method as recited in claim 6 wherein the step of transmitting a subsequent part definition data record includes the substep of sending a request for the subsequent part definition data record from a computer associated with the subsequent manufacturing station to a master computer when the subsequent manufacturing station is able to perform manufacturing operations on a new workpiece.

8. Apparatus for fabricating parts, comprising:
   a computer-aided design station for generating a set of CAD data in response to entered inputs, the set of CAD data corresponding to the configuration of a part to be fabricated and being expressed with respect to an operator-entered reference point;
   a plurality of manufacturing stations oriented with respect to at least one common axis for performing operations on a workpiece to produce the fabricated part and for transferring the workpiece between the stations;
   manufacturing process planning means coupled to the computer-aided design station for receiving the CAD data for the part to be fabricated, for receiving manufacturing process planning data for the part to be fabricated, and for generating a set of part definition data records corresponding to the part to be fabricated, each of the part definition data records corresponding to one of the manufacturing stations and containing quantitative data for the corresponding manufacturing station to perform manufacturing operations required to fabricate the part;
   master computer means coupled to the manufacturing process planning means for storing the part definition data record sets and for receiving commands to fabricate parts; and
   a plurality of machine computer means, each coupled to the master computer means and to one of the manufacturing stations and programmed with instructions to performing generic manufacturing procedures, for receiving one of the part definition data records, for assigning a fixed relationship between the reference point and a fixed location on the workpiece, and for combining the generic manufacturing procedures with the one part definition data record to generate electrical signals to drive actuators and machining tools of the associated manufacturing station to perform specific transport and fabrication operations on the workpiece while maintaining a predetermined relationship between the fixed location and the at least one common axis to manufacture the part to be fabricated.

9. Apparatus as recited in claim 8 wherein the machine computer means each comprise a command computer coupled to the master computer means and a slave computer coupled to one of the manufacturing stations.

10. Apparatus as recited in claim 9, wherein one of the manufacturing stations comprises a robot workpiece transfer mechanism connected to the slave computer of the one manufacturing station and to the slave computer of the manufacturing station downstream from the one manufacturing station, the robot workpiece transfer mechanism including means responsive to signals from the slave computer of the one manufacturing station to remove a workpiece from the one manufacturing station when machining operations are completed at the one station and to return to a home position, the robot workpiece transfer mechanism being further responsive to signals from the slave computer of the downstream manufacturing station to move the robot workpiece transfer mechanism from the home position to transport the workpiece to the downstream manufacturing station.

11. Apparatus as recited in claim 9, wherein the robot workpiece transfer mechanism comprises a failsafe brake actuated by the robot workpiece transfer mechanism upon return to the home position, and wherein the robot workpiece transfer mechanism is responsive to the signals from the downstream manufacturing station to deactuate the brake prior to movement from the home position.

12. Apparatus for fabricating parts, comprising:
a computer-aided design station for generating a set of CAD data in response to entered inputs, the set of CAD data corresponding to the configuration of a part to be fabricated;
a plurality of manufacturing stations for performing operations on a workpiece to produce a fabricated part and for transferring the workpiece between the stations;
manufacturing process planning means for receiving the CAD data for the part to be fabricated, for receiving manufacturing process planning data for the part to be fabricated, and for generating a set of part definition data records corresponding to the part to be fabricated, each of the part definition data records corresponding to one of the manufacturing stations;
master computer means coupled to manufacturing process planning means for storing the part definition data record sets and for receiving commands to fabricate parts; and
a plurality of machine computer means each coupled to the master computer means and to one of the manufacturing stations and programmed with instructions for performing generic manufacturing procedures, for receiving the part definition data records, and for combining the generic manufacturing procedures with the part definition data records to generate electrical signals from the part definition data record to drive actuators and machining tools of the associated manufacturing station to perform specific transport and fabrication operations on a workpiece to manufacture the part to be fabricated.

13. Apparatus as recited in claim 12, wherein each of the machine computer means comprises a slave computer connected to actuators of the associated manufacturing station, and a command computer connected to the slave computer and the master computer means.

* * * * *